(12) United States Patent
Pope et al.

(10) Patent No.: US 8,645,558 B2
(45) Date of Patent: Feb. 4, 2014

(54) RECEPTION ACCORDING TO A DATA TRANSFER PROTOCOL OF DATA DIRECTED TO ANY OF A PLURALITY OF DESTINATION ENTITIES FOR DATA EXTRACTION

(75) Inventors: Steven Leslie Pope, Cambridge (GB); Derek Edward Roberts, Cambridge (GB); David James Riddoch, Cambridge (GB); Greg Law, Cambridge (GB); Steve Grantham, Huntingdon (GB); Matthew Slattery, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 1191 days.

(21) Appl. No.: 11/916,973

(22) PCT Filed: Jun. 15, 2006

(86) PCT No.: PCT/GB2006/002202
§ 371 (c)(1),
(2), (4) Date: Nov. 14, 2008

(87) PCT Pub. No.: WO2006/134373
PCT Pub. Date: Dec. 21, 2006

(65) Prior Publication Data
US 2012/0124121 A1    May 17, 2012

(30) Foreign Application Priority Data

| | | | |
|---|---|---|---|
| Jun. 15, 2005 | (GB) | ................................... | 0512219.7 |
| Jun. 17, 2005 | (GB) | ................................... | 0512425.0 |
| Jun. 20, 2005 | (GB) | ................................... | 0512532.3 |
| Jun. 20, 2005 | (GB) | ................................... | 0512533.1 |
| Jun. 20, 2005 | (GB) | ................................... | 0512534.9 |
| Jun. 20, 2005 | (GB) | ................................... | 0512535.6 |
| Jun. 20, 2005 | (GB) | ................................... | 0512536.4 |
| Jun. 20, 2005 | (GB) | ................................... | 0512537.2 |

(51) Int. Cl.
*G06F 15/16* (2006.01)
*G06F 3/00* (2006.01)
*H04J 3/16* (2006.01)

(52) U.S. Cl.
USPC ............................ 709/230; 719/328; 370/466

(58) Field of Classification Search
USPC .......................... 709/230; 711/111; 719/328; 370/466–467
See application file for complete search history.

(56) References Cited

U.S. PATENT DOCUMENTS

| | | |
|---|---|---|
| 5,272,599 A | 12/1993 | Koenen |
| 5,325,532 A | 6/1994 | Crosswy et al. |
| 5,946,189 A | 8/1999 | Koenen et al. |
| 5,951,645 A * | 9/1999 | Goto ............................. 709/230 |
| 6,021,445 A * | 2/2000 | Chapa ........................... 719/328 |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,901,594 B1 * | 5/2005 | Cain et al. ...................... 719/310 |
| 6,904,534 B2 | 6/2005 | Koenen |
| 6,950,961 B2 | 9/2005 | Krause et al. |
| 6,978,331 B1 | 12/2005 | Kagan et al. |
| 6,988,262 B1 * | 1/2006 | Mallory et al. ................ 717/127 |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,178,062 B1 | 2/2007 | Dice |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |

| | | |
|---|---|---|
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,509,491 B1 | 3/2009 | Wainner et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2002/0183864 A1* | 12/2002 | Apel et al. ............... 700/14 |
| 2003/0007165 A1 | 1/2003 | Hudson |
| 2003/0055866 A1 | 3/2003 | Leclair et al. |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0114949 A1 | 6/2003 | Armstrong et al. |
| 2003/0163589 A1 | 8/2003 | Bunce et al. |
| 2003/0172330 A1 | 9/2003 | Barron et al. |
| 2003/0191786 A1 | 10/2003 | Matson |
| 2003/0202043 A1 | 10/2003 | Zeng et al. |
| 2003/0202536 A1 | 10/2003 | Foster et al. |
| 2003/0214677 A1 | 11/2003 | Bhaskar et al. |
| 2004/0071250 A1 | 4/2004 | Bunton |
| 2004/0117793 A1 | 6/2004 | Shaylor |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees |
| 2005/0039187 A1 | 2/2005 | Bloom et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0226250 A1 | 10/2005 | Makayama et al. |
| 2005/0231751 A1 | 10/2005 | Wu et al. |
| 2006/0026443 A1 | 2/2006 | McMahan et al. |
| 2006/0031525 A1* | 2/2006 | Reeves et al. ............... 709/227 |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0168400 A1* | 7/2006 | Ronciak et al. ............ 711/118 |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| EP | 620521 | 3/1994 |
| EP | 2272214 | 1/2011 |
| WO | WO01/48972 | 7/2001 |
| WO | WO02/35838 | 5/2002 |
| WO | WO 03/107611 | 12/2003 |
| WO | WO2008/127672 | 10/2008 |
| WO | WO2009/136933 | 11/2009 |
| WO | WO2010/020907 | 2/2010 |
| WO | WO2010087826 | 8/2010 |
| WO | WO2011/043768 | 4/2011 |
| WO | WO2011/053305 | 5/2011 |
| WO | WO2011/053330 | 5/2011 |

OTHER PUBLICATIONS

Adiga, NR. et al. *An Overview of the BlueGene/L Supercomputer.* Proceedings of the 2002 ACM/IEEE conference on Supercomputing, Baltimore. pp. 1-22.

Aggarwal, Vinay et al. *Workshop on Network-I/O Convergence: Experience, Lessons, Implications (Niceli).* ACM Computer Communication Review, vol. 33, No. 5, 2003. pp. 75-80.

Allman, Mark. *TCP Byte Counting Refinements.* ACM Computer Communication Review, vol. 29, No. 3, 1999. pp. 14-22.

Anderson, Ed et al. *Performance of the CRAY T3E Multiprocessor.* Proceedings of the 1997 ACM/IEEE conference on Supercomputing, San Jose, California. pp. 1-17.

Angin, Oguz et al. *Report on the 5th IFIP Internation Workshop on Quality of Service (IWQOS 97).* ACM Computer Communication Review, vol. 27, No. 3, 1997. pp. 100-117.

(56) References Cited

OTHER PUBLICATIONS

Balaji, P. et al. *Head-to-Toe Evaluation of High-Performance Sockets Over Protocol Offload. Engines.* Proceedings of the IEEE International Conference on Cluster Computing, 2005. pp. 1-10.
Barham, Paul Ronald. *Devices in a Multi-Service Operating System.* PhD Thesis, University of Cambridge, 1996. 131 pages.
Bhandarkar, Sumitha et al. *LTCP: Improving the Performance of TCP in Highspeed Networks.* ACM Computer Communication Review, vol. 36, No. 1, 2006. pp. 41-50.
Birrell, Andrew D. et al. *Grapevine: An Exercise in Distributed Computing.* Communications of the ACM, vol. 25, Issue 4, 1982. pp. 260-274.
Black, Richard et al. *Experiences of Building an ATM Switch for the Local Area.* ACM Computer Communication Review, vol. 24, No. 4, 1994. pp. 158-167.
Blanton, Ethan et al. *On Making TCP More Robust to Packet Reordering.* ACM Computer Communication Review, vol. 32, No. 1, 2002. pp. 20-30.
Boden, Nanette J. et al. *Myrinet: A Gigabit-per-Second Local-Area Network.* Draft of paper published in IEEE Micro, vol. 15, No. 1, 1995. pp. 29-36.
Boggs, David R. et al. *Measured Capacity of an Ethernet: Myths and Reality.* ACM Computer Communication Review, vol. 18, No. 4, 1988. pp. 222-234.
Borman, David A. *Implementing TCP/IP on a Cray computer.* ACM Computer Communication Review, vol. 19, No. 2, 1989. pp. 11-15.
Braden, R. et al. *Computing the Internet Checksum.* ACM Computer Communication Review, vol. 19, No. 2, 1989. pp. 86-94.
Brakmo, Lawrence S. et al. *TCP Vegas: New Techniques for Congestion Detection and Avoidance.* ACM Computer Communication Review, vol. 24, No. 4, 1994. pp. 24-35.
Brandriff, Robert M. et al. *Development of a TCP/IP for the IBM/370.* ACM Computer Communication Review, vol. 15, No. 4, 1985. pp. 2-8.
Buonadonna, Philip et al. *An Implementation and Analysis of the Virtual Interface Architecture.* Proceedings of the 1998 ACM/IEEE conference on Supercomputing, Orlando, Florida. pp. 1-15.
Calvert, Ken. *Reflections on Network Architecture: an Active Networking Perspective.* ACM Computer Communication Review, vol. 36, No. 2, 2006. pp. 27-30.
Cerf, V. et al. *Proposal for an International End-to-End Protocol.* ACM Computer Communication Review, vol. 6 No. 1, 1976. pp. 1-18.
Cerf, V. et al. *A Protocol for Packet Network Intercommunication.* IEEE Transactions on Communications, vol. COM-22, No. 5, 1974. pp. 637-648.
Chang, Chi-Chao et al. *Low-Latency Communication on the IBM RISC System/6000 SP.* Proceedings of the 1996 ACM/IEEE conference on Supercomputing, Pittsburgh. pp. 1-17.
Cheriton, David R. *Sirpent: A High-Performance Internetworking Approach.* ACM Computer Communication Review, vol. 19, No. 4, 1989. pp. 158-169.
Chesson, Dr. Gregory L. *Declaration of Dr Gregory L Chesson in Alacritech v. Microsoft.* United States District Court, Northern District California, San Francisco Division. Feb. 4, 2005. 289 pages.
Chesson, Dr. Gregory L. *The Evolution of XTP.* Proceedings of the Third International Conference on High Speed Networking, 1991. pp. 1-10.
Chiou, Derek et al. *StarT-Voyager: A Flexible Platform for Exploring Scalable SMP Issues.* Proceedings of the 1998 ACM/IEEE conference on Supercomputing, Orlando, Florida. 20 pages.
Chu, H. K. Jerry. *Zero-Copy TCP in Solaris.* Proceedings of the USENIX Annual Technical Conference 1996. 13 pages.
Clark, David D. et al. *An Analysis of TCP Processing Overhead.* IEEE Communications Magazine, vol. 27, No. 6, 1989. pp. 23-29.
Clark, David D. et al. *Architectural Considerations for a New Generation of Protocols.* ACM Computer Communication Review, vol. 20, No. 4, 1990. pp. 200-208.
Clark, David. D. *The Design Philosophy of the DARPA Internet Protocols.* ACM Computer Communication Review, vol. 18, No. 4, 1988. pp. 106-114.
Cohen, Danny et al. *Use of message-based multicomputer components to construct gigabit networks.* ACM Computer Communication Review, vol. 23, No. 4, 1993. p. 32-44.
Cohen, Gregory et al. *ATOMIC: A High-Speed Local Communication Architechture.* Journal of High Speed Networks. Jan. 3, 1994. pp. 1-21.
Cohen, Gregory et al. *ATOMIC: A Local Communication Network Created Through Repeated Application of Multicomputing Components.* Made available by authors. Jan. 10, 1992. 11 pages.
Cooper, Eric C. et al. *Protocol Implementation on the Nectar Communication Processor.* ACM Computer Communication Review, vol. 20, No. 4, 1990. pp. 135-144.
Crowcroft, John. *10 Networking Papers: Recommended Reading.* ACM Computer Communication Review, vol. 36, No. 2, 2006. pp. 51-52.
Crowcroft, John et al. *ATM: A Retrospective on Systems Legacy.* ACM Computer Communication Review, vol. 32, No. 5, 2002. pp. 11-12.
Crowley, Patrick et al. *Characterizing Processor Architectures for Programmable Network Interfaces.* Proceedings of the 14th international conference on Supercomputing, Santa Fe, New Mexico. May 8, 2000. pp. 54-65.
Currid, Andy. *TCP Offload to the Rescue.* ACM Queue, vol. 2, No. 3, 2004. pp. 60-65.
Davie, Bruce S. *A Host-Network Interface Architecture for ATM.* ACM Computer Communication Review, vol. 21, No. 4, 1991. pp. 307-315.
Delp, Gary S. et al. *An Analysis of Memnet: An Experiment in High-Speed Shared-Memory Local Networking.* ACM Computer Communication Review, vol. 18, No. 4, 1988. pp. 165-174.
Dennis, Jack B. et al. *Programming Semantics for Multiprogrammed Computations.* Communications of the ACM, vol. 9, No. 3, 1966. pp. 143-155.
De Vivo, M. et al. *Internet Vulnerabilities Related to TCP/IP and T/TCP.* ACM Computer Communication Review, vol. 29, No. 1, 1999. pp. 81-85.
Dickman, Lloyd. Presentation: *Protocol Offloading vs Onloading in High Performance Networks.* Hot Interconnects Panel, Aug. 23, 2006. 7 pages.
Druschel, Peter et al. *Experiences with a High-Speed Network Adaptor: A Software Perspective.* ACM Computer Communication Review, vol. 24, No. 4, 1994. pp. 2-13.
Druschel, Peter et al. *Fbufs: A High-Bandwidth Cross-Domain Transfer Facility.* ACM Operating Systems Review, vol. 27, Issue 5, 1993. pp. 189-202.
Edwards, A. et al. *Experiences Implementing a High-Performance TCP in User-Space.* ACM Computer Communication Review, vol. 25, No. 4, 1995. pp. 196-205.
Edwards, A. et al. *User-Space Protocols Deliver High Performance to Applications on a Low-Cost Gb/s LAN.* ACM Computer Communication Review, vol. 24, No. 4, 1994. pp. 14-23.
von Eicken, Thorsten et al. *U-Net: A User-Level Network Interface for Parallel and Distributed Computing.* ACM Operating Systems Review, vol. 29, Issue 5, 1995. pp. 109-126.
Evans, Joseph B. et al. *The End of History.* IEEE TCGN Gigabit Networking Workshop, 2001. 10 pages.
Falsafi, Babak et al. *Application-Specific Protocols for User-Level Shared Memory.* Proceedings of the 1994 conference on Supercomputing, Washington D.C. pp. 380-389.
Feng, Wu-chun, et al. *Optimizing 10-Gigabit Ethernet for Networks of Workstations, Clusters, and Grids: A Case Study.* Proceedings of the 2003 ACM/IEEE conference on Supercomputing, Phoenix, Arizona. 13 pages.
Feng, Wu-chun, et al. *The Failure of TCP in High-Performance Computational Grids.* Proceedings of the 2000 ACM/IEEE conference on Supercomputing, Dallas, Texas. 11 pages.
Finn, Gregory G. *An Integration of Network Communication with Workstation Architecture.* ACM Computer Communication Review, vol. 21, No. 5, 1991. pp. 18-29.

(56) References Cited

OTHER PUBLICATIONS

Finn, Gregory G. et al. *Netstation Architecture Multi-Gigabit Workstation Network Fabric.* Proceedings of InterOp '94, Las Vegas, Nevada. pp. 1-9.

Floyd, Sally. *TCP and Explicit Congestion Notification.* ACM Computer Communication Review, vol. 24, No. 5, 1994. pp. 8-23.

Geoffray, Patrick. *A Critique of RDMA.* HPCWire article: http://www.hpcwire.com/features/17886984.html. Aug. 18, 2006. 7 pages.

Geoffray, Patrick. From Presentation: Protocol off-loading vs onloading in high-performance networks. Hot Interconnects 2006 at http://www.myri.com. 5 pages.

Hayter, Mark David. *A Workstation Architecture to Support Multimedia.* PhD Thesis, University of Cambridge, 1993. 111 pages.

Hayter, Mark David et al. *The Desk Area Network.* ACM Operating Systems Review, vol. 25, Issue 4, 1991. pp. 14-21.

Hill, J. Carver. *Synchronizing Processors with Memory-Content-Generated Interrupts.* Communications of the ACM, vol. 16, No. 6, 1973. pp. 350-351.

Hsieh, Jenwei et al. *Architectural and Performance Evaluation of GigaNet and Myrinet Interconnects on Clusters of Small-Scale SMP Servers.* Proceedings of the 2000 ACM/IEEE conference on Supercomputing, Dallas, Texas. pp. 1-9.

Husbands, Parry et al. *MPI-StarT: Delivering Network Performance to Numerical Applications.* Proceedings of the 1998 ACM/IEEE conference on Supercomputing, Orlando, Florida. pp. 1-15.

Jacobson, Van. *Congestion Avoidance and Control.* ACM Computer Communication Review, vol. 18, No. 4, 1988. pp. 314-329.

Jin, Cheng et al. *FAST TCP: Motivation, Architecture, Algorithms, Performance.* Proceedings of IEEE Infocom 2004, pp. 1246-1259.

Kaiserswerth, Matthias. *The Parallel Protocol Engine.* IEEE/ACM Transactions on Networking, vol. 1, No. 6, 1993. pp. 650-663.

Kalmanek, Charles. *A Retrospective View of ATM.* ACM Computer Communication Review, vol. 32, No. 5, 2002. pp. 13-19.

Kamal, Humaira et al. *SCTP versus TCP for MPI.* Proceedings of the 2005 ACM/IEEE conference on Supercomputing, Seattle, Washington. 14 pages.

Kanakia, Hemant et al. *The VMP Network Adapter Board (NAB): High-Performance Network Communication for Multiprocessors.* ACM Computer Communication Review, vol. 18, No. 4, 1988. pp. 175-187.

Kay, Jonathan et al. *The Importance of Non-Data Touching Processing Overheads in TCP/IP.* ACM Computer Communication Review, vol. 23, No. 4, 1993. pp. 259-268.

Kelly, Tom. *Scalable TCP: Improving Performance in Highspeed Wide Area Networks.* ACM Computer Communication Review, vol. 33, No. 2, 2003. pp. 83-91.

Kent, Christopher A. et al. *Fragmentation Considered Harmful.* ACM Computer Communication Review, vol. 17, No. 5, 1987. pp. 390-401.

Kermani, Parviz et al. *Virtual cut-through: A new computer communication switching technique.* Computer Networks, vol. 3, No. 4, 1979. pp. 267-286.

Kleinpaste, Karl et al. *Software Support for Outboard Buffering and Checksumming.* ACM Computer Communication Review, vol. 25, No. 4, 1995. pp. 87-98.

Kline, Charley. *Supercomputers on the Internet: A Case Study.* ACM Computer Communication Review, vol. 17, No. 5, 1987. pp. 27-33.

Kuo, F.F. *The Aloha System.* ACM Computer Communication Review, vol. 4 No. 1, 1974. pp. 5-8.

Lazowska, Edward D. *Computing Research: A Looming Crisis.* ACM Computer Communication Review, vol. 35, No. 2, 2005. pp. 65-68.

Leland, Will E. et al. *On the Self-Similar Nature of Ethernet Traffic.* ACM Computer Communication Review, vol. 23, No. 4, 1993. pp. 85-95.

Leslie, Ian et al. *Fairisle: An ATM Network for the Local Area.* ACM Computer Communication Review, vol. 21, No. 4, 1991. pp. 327-336.

Leslie, Ian M. et al. *The Architecture of the Universe Network.* ACM Computer Communication Review, vol. 14, No. 2, 1984. pp. 2-9.

Leslie, Ben et al. *User-level device drivers: Achieved performance.* J. Comput. Sci. & Technol., vol. 20, Sep. 2005. pp. 1-17.

Lin, Mengjou et al. *Performance of High-Speed Network I/0 Subsystems: Case Study of A Fibre Channel Network.* Proceedings of the 1994 conference on Supercomputing, Washington D.C. pp. 174-183.

Liu, Jiuxing et al. *Performance Comparison of MPI Implementations over InfiniBand, Myrinet and Quadrics.* Proceedings of the 2003 ACM/IEEE conference on Supercomputing, Phoenix, Arizona. pp. 1-14.

Lowekamp, Bruce et al. *Topology Discovery for Large Ethernet Networks.* ACM Computer Communication Review, vol. 31, No. 4, 2001. pp. 237-248.

Maeda, Chris et al. *Protocol Service Decomposition for High-Performance Networking.* ACM Operating Systems Review, vol. 27, Issue 5, 1993. pp. 244-255.

Mansley, Kieran et al. *Getting 10 Gb/s from Xen: Safe and Fast Device Access from Unprivileged Domains.* Euro-Par Conference 2007, Rennes, France. pp. 224-233.

McAuley, Derek. *A case for Virtual Channel Processors.* Proceedings at the ACM SIGCOMM 2003 Workshops. pp. 237-242.

McAuley, Derek Robert. *Protocol Design for High Speed Networks.* PhD Thesis, University of Cambridge, 1989. 104 pages.

McKenney, Paul E. et al. *Efficient Demultiplexing of Incoming TCP Packets.* ACM Computer Communication Review, vol. 22, No. 4, 1992. pp. 269-279.

McQuillan, John M. et al. *An Overview of the New Routing Algorithm for the ARPANET.* Proceedings of the 6th Data Communications Symposium, 1979. pp. 54-60.

Metcalfe, Robert M. *Ethernet: distributed packet switching for local computer networks.* Communications of the ACM, vol. 19, Issue 7, 1976. pp. 395-404.

Michel, Jeffrey R. *The Design and Evaluation of an Off-Host Communications Protocol Architecture.* MSci Thesis, University of Virginia, 1993. 139 pages.

Minshall, Greg et al. *Flow labelled IP over ATM: design and rationale.* ACM Computer Communication Review, vol. 36, No. 3, 2006. pp. 79-92.

Mockapetris, Paul V. et al. *Development of the Domain Name System.* ACM Computer Communication Review, vol. 18, No. 4, 1988. pp. 123-133

Mogul, Jeffrey C. *The Case for Persistent-Connection HTTP.* ACM Computer Communication Review, vol. 25, No. 4, 1995. pp. 299-313.

Mogul, Jeff. Presentation: *Thoughts about TCP Offloading; May 2003 HotOS paper title: TCP offload is a dumb idea whose time has come.* Aug. 2006. 3 pages.

Moore, Gordon E. *Cramming more components onto integrated circuits.* Electronics, vol. 38, No. 8, 1965. pp. 114-117.

*MPI: A Message-Passing Interface Standard.* Message-Passing Interface Forum, University of Tennessee, Knoxville, 1994. 236 pages.

Muir, Steve et al. *Piglet: A Low-Intrusion Vertical Operating System.* Technical Report MS-CIS-00-04, University of Pennsylvania, 2000. pp. 1-15.

Nagle, John. *Congestion Control in IP/TCP Internetworks.* ACM Computer Communication Review, vol. 14, No. 4, 1984. pp. 11-17.

Partridge, Craig et al. *Performance of Checksums and CRCS over Real Data.* ACM Computer Communication Review, vol. 25, No. 4, 1995. pp. 68-76.

Pope, Steven et al. *10Gb/s Ethernet Performance and Retrospective.* ACM Computer Communication Review, vol. 37, No. 2, 2007. pp. 89-92.

Pope, S.L. et al. *Enhancing Distributed Systems with Low-Latency Networking.* Parallel and Distributed Computing and Networks, Brisbane, Australia, 1998. pp. 1-12.

Pratt, Ian et al. *Arsenic: A User-Accessible Gigabit Ethernet Interface.* Proceedings of IEEE Infocom 2001, pp. 67-76.

Rangarajan, Murali et al. *TCP Servers: Offloading TCP Processing in Internet Servers. Design, Implementation, and Performance.* Technical Report DCR-TR-481, Computer Science Department, Rutgers University, 2002. pp. 1-14.

(56) References Cited

OTHER PUBLICATIONS

Regnier, Greg et al. *ETA: Experience with an Intel Xeon Processor as a packet Processing Engine.* IEEE Micro, vol. 24, No. 1, 1994. pp. 24-31.
Regnier, Greg et al. *TCP Onloading for Data Center Servers.* Computer, IEEE Computer Society, vol. 37, No. 11, 2004. pp. 48-58.
Romanow, A. et al. *The Dynamics of TCP Traffic over ATM Networks.* ACM Computer Communication Review, vol. 24, No. 4, 1994. pp. 79-88.
Ross, Robert et al. *A Case Study in Application I/O on Linux Clusters.* Proceedings of the 2001 ACM/IEEE conference on Supercomputing, Denver. pp. 1-17.
Rutsche, Erich. *The Architecture of Gb/s Multimedia Protocol Adapter.* ACM Computer Communication Review, vol. 23, No. 3, 1993. pp. 59-68.
Salmon, John et al. *Scaling of Beowulf-class Distributed Systems.* Proceedings of the 1998 ACM/IEEE conference on Supercomputing, Orlando, Florida. pp. 1-18.
Sancho, Jose Carlos et al.. *Quantifying the Potential Benefit of Overlapping Communication and Computation in Large-Scale Scientific Applications.* Proceedings of the 2006 ACM/IEEE conference on Supercomputing, Tampa, Florida. 16 pages.
Sarolahti, Pasi et al. *F-RTO: An Enhanced Recovery Algorithm for TCP Retransmission Timeouts.* CM Computer Communication Review, vol. 33, No. 2, 2003. pp. 51-63.
Shivam, Piyush et al. *EMP: Zero-copy OS-bypass NIC-driven Gigabit Ethernet Message Passing.* Proceedings of the 2001 ACM/IEEE conference on Supercomputing, Denver. pp. 1-8.
Simmons, Margaret L. et al. *Performance Comparison of the Cray-2 and Cray X-MP/416 Supercomputers.* Proceedings of the 1988 ACM/IEEE conference on Supercomputing, Orlando, Florida. pp. 288-295.
Singh, Raj K. et al. *A Programmable HIPPI Interface for a Graphics Supercomputer.* Proceedings of the 1993 ACM/IEEE conference on Supercomputing, Portland, Oregon. pp. 124-132.
Singh, Raj K. et al. *A Programmable Network Interface for a Message-Based Multicomputer.* ACM Computer Communication Review, vol. 24, No. 3, p. 8-17, 1994.
Sistare, Steven J. et al. *Ultra-High Performance Communication with MPI and the Sun Fire™ Link Interconnect.* Proceedings of the 2002 ACM/IEEE conference on Supercomputing, Baltimore. pp. 1-15.
Smith, Jonathan M. et al. *Giving Applications Access to Gb/s Networking.* IEEE Network, vol. 7, Issue 4, 1993. pp. 44-52.
Smith, Jonathan. *The Influence of ATM on Operating Systems.* ACM Computer Communication Review, vol. 32, No. 5, 2002. pp. 29-37.
Steenkiste, Peter. *Analyzing Communication Latency using the Nectar Communication Processor.* ACM Computer Communication Review, vol. 22, No. 4, 1992. pp. 199-209.
Stone, Jonathan et al. *When the CRC and TCP Checksum Disagree.* ACM Computer Communication Review, vol. 30, No. 4, 2000. pp. 309-319.
Sayantan, Sur et al. *High-Performance and Scalable MPI over InfiniBand with Reduced Memory Usage: An In-Depth Performance Analysis.* Proceedings of the 2006 ACM/IEEE conference on Supercomputing, Tampa, Florida. 13 pages.
Tennenhouse, D. L. et al. *Towards an Active Network Architecture.* ACM Computer Communication Review, vol. 26, No. 2, 1996. pp. 15-20.
Thacker, Charles P. et al. *Firefly: a Multiprocessor Workstation.* ACM Operating Systems Review, vol. 21, Issue 4, 1987. pp. 164-172.
Thekkath, Chandramohan A. et al. *Implementing Network Protocols at User Level.* ACM Computer Communication Review, vol. 23, No. 4, 1993. pp. 64-73.
Touch, Joe et al. *Experiences with a Production Gigabit LAN.* Gigabit Networking Workshop '97 Meeting, Kobe, Japan. 10 pages.
Touch, Joe et al. *Host-based Routing Using Peer DMA.* Gigabit Networking Workshop '97 Meeting, Kobe, Japan. 2 pages.
Traw, C. Brendan S. et al. *A High-Performance Host Interface for ATM Networks.* ACM Computer Communication Review, vol. 21, No. 4, 1991. pp. 317-325.
Traw, C. Brendan S. et al. *Hardware/Software organization of a high performance ATM host interface.* IEEE Journal on Selected Areas in Communications, 1993. pp. 240-253.
Tsudik, Gene. *Message Authentication with One-Way Hash Functions.* ACM Computer Communication Review, vol. 22, No. 5, 1992. pp. 29-38.
Vis, Jan. *A Simple LAN Performance Measure.* ACM Computer Communication Review, vol. 24, No. 1, 1994. pp. 7-11.
Warren, Michael S. et al. *Avalon: An Alpha/Linux Cluster Achieves 10 Gflops for $150k.* Proceedings of the 1998 ACM/IEEE conference on Supercomputing, Orlando, Florida. pp. 1-10.
Wassermann, Harvey J. et al. *Performance Evaluation of the SGI Origin2000: A Memory-Centric Characterization of LANL ASCI Applications.* Proceedings of the 1997 ACM/IEEE conference on Supercomputing, San Jose, California. pp. 1-11.
Wetherall, David. *10 Networking Papers: Readings for Protocol Design.* ACM Computer Communication Review, vol. 36, No. 3, 2006. pp. 77-78.
Wilkes, Maurice v. et al. *The Cambridge Model Distributed System.* ACM SIGOPS Operating Systems Review, vol. 14, Issue 1, 1980. pp. 21-29.
Wray, Stuart et al. *The Medusa Applications Environment.* Proceedings of the International Conference on Multimedia Computing and Systems, Boston, 1994. pp. 265-273.
Zelkowitz, Marvin. *Interrupt Driven Programming.* Communications of the ACM, vol. 14, No. 6, 1971. pp. 417-418.
Bush, R. et al. *Some Internet Architectural Guidelines and Philosophy.* The Internet Society, Dec. 2002, pp. 1-28.
Dixon, Michael J. *System support for multi-service traffic.* University of Cambridge Computer Laboratory Technical Report No. 245, Jan. 1992, 113 pages.
Feng, Wu-chun, et al. *Performance Characterization of a 10-Gigabit Ethernet TOE.* Proceedings of the 13th Symposium on High Performance Interconnects, 2005, pp. 1-6.
Hrvoye, Bilic et al. *Deferred Segmentation for Wire-Speed Transmission of Large TCP Frames over Standard GbE Networks.* Proceedings of the 9th Symposium on High Performance Interconnects, 2001, 5 pages.
Hrvoye, Bilic et al. Presentation of: *Deferred Segmentation for Wire-Speed Transmission of Large TCP Frames over Standard GbE Network,* given at HOTI' 01 9th Symposium on High Performance Interconnects, 2001, 9 pages.
Hurwitz, Justin et al. *Initial End-to-End Performance Evaluation of 10-Gigabit Ethernet,* Proceedings of IEEE Hot Interconnects: 11th Symposium on High Performance Interconnects, Aug. 2003, 6 pages.
Makineni, Srihari et al. *Architectural Characterization of TCP/IP Packet Processing on the Pentium® M Processor.* Proceedings of the 10th International Symposium on High Performance Computer Architecture, 2004, 11 pages.
Mogul, Jeffrey C. *TCP offload is a dumb idea whose time has come.* Proceedings of HotOS IX: The 9th Workshop on Hot Topics in Operating Systems, May 18-21, 2003, pp. 25-30.
Montry, Gary. From Presentation: *The NE010 iWARP Adapter.* Open Fabrics Alliance at http://www.openfabrics.org, 2006, 8 pages.
Partridge, Craig. *How Slow Is One Gigabit Per Second?* ACM Computer Communication Review, vol. 20, No. 11990, Jun. 5, 1989, pp. 44-53.
Petrini, Fabrizio. Presentation of: *Protocol Off-loading vs On-loading in High-Performance Networks.* 14th IEEE Symposium on High-Performance Interconnects, Aug. 2006, 4 pages.
Regnier, Greg. Presentation: *Protocol Onload vs. Offload,* May 2006, Intel. 1 page.
Rutsche, Erich et al. *TCP/IP on the Parallel Protocol Engine.* Proceedings of the IFIP TC6/WG6.4 Fourth International Conference on High Performance Networking IV, 1993, pp. 119-134.
Sterling, Thomas et al. *Beowulf: A Parallel Workstation for Scientific Computation.* Proceedings of the 24th International Conference on Parallel Processing, 1995, 4 pages.

\* cited by examiner

*Primary Examiner* — Jeong S Park

(74) *Attorney, Agent, or Firm* — Fish & Richardson P.C.

(57) ABSTRACT

A data processing system arranged for receiving over a network, according to a data transfer protocol, data directed to any of a plurality of destination identities, the data processing system comprising: data storage (event queues 31-33) for storing data received over the network; and a first processing arrangement for performing processing in accordance with the data transfer protocol on received data in the data storage, for making the received data available to respective destination identities; and a response former arranged for: receiving a message (dashed line on FIG. 4) requesting a response indicating the availability of received data to each of a group of destination identities; and forming such a response; wherein the system is arranged to, in dependence on receiving the said message: identify received data that is directed to any destination identity that is both a member of the group and a member of a subset of the plurality of destination identities, and on which processing has not yet been performed; trigger processing by the first processing arrangement in accordance with the protocol on only the identified data; and subsequently form a response based at least partly on the result of the triggered processing, wherein the response (table 40-41) is formed so as to comprise a positive indication (41) of availability of data for a destination identity of the group if the triggered processing caused data to be made available to the respective destination identity.

12 Claims, 19 Drawing Sheets

Aperture Table

| Local aperture index | Local ownership | Remote aperture index | Buffer table indexes | Sequence number |
|---|---|---|---|---|
| 1 | 8 | 5 | 2 | 2031 |
| 2 | 7 | 2 | 3 | 1211 |
| 3 | 12 | 1 | 4,1 | 9832 |
| ... | ... | ... | ... | ... |

FIG. 10

Buffer Table

| Buffer index | ownership | Physical start address | Length |
|---|---|---|---|
| 1 | 12 | xA000 | x8FF |
| 2 | 8 | xB000 | xFFF |
| 3 | 7 | xC000 | xC1A |
| 4 | 12 | xD000 | xA10 |
| ... | ... | ... | ... |

FIG. 11

Queue Table

| Queue index | TX queue start address | TX queue length | Ownership |
|---|---|---|---|
| 1 | x1000 | x8FF | 12 |
| 2 | x2000 | x8FF | 8 |
| 3 | x3000 | x8FF | 7 |
| ... | ... | ... | ... |

Aperture Table

| Local aperture index | Local ownership | Remote aperture index | Buffer table indexes | Sequence number |
|---|---|---|---|---|
| 1 | 8 | 5 | 2 | 2031 |
| 2 | 7 | 2 | 3 | 1211 |
| 3 | 12 | 1 | 4,1 | 9832 |
| ... | ... | ... | ... | ... |

FIG. 15

Buffer Table

| Buffer index | ownership | Physical start address | Length |
|---|---|---|---|
| 1 | 12 | xA000 | x8FF |
| 2 | 8 | xB000 | xFFF |
| 3 | 7 | xC000 | xC1A |
| 4 | 12 | xD000 | xA10 |
| ... | ... | ... | ... |

FIG. 16

Queue Table

| Queue index | TX queue start address | TX queue length | Ownership |
|---|---|---|---|
| 1 | x1000 | x8FF | 12 |
| 2 | x2000 | x8FF | 8 |
| 3 | x3000 | x8FF | 7 |
| ... | ... | ... | ... |

Aperture Table

| Local aperture index | Local ownership | Remote aperture index | Buffer table indexes | Sequence number |
|---|---|---|---|---|
| 1 | 8 | 5 | 2 | 2031 |
| 2 | 7 | 2 | 3 | 1211 |
| 3 | 12 | 1 | 4,1 | 9832 |
| ... | ... | ... | ... | ... |

FIG. 30

Buffer Table

| Buffer index | ownership | Physical start address | Length |
|---|---|---|---|
| 1 | 12 | xA000 | x8FF |
| 2 | 8 | xB000 | xFFF |
| 3 | 7 | xC000 | xC1A |
| 4 | 12 | xD000 | xA10 |
| ... | ... | ... | ... |

FIG. 31

Queue Table

| Queue index | TX queue start address | TX queue length | Ownership |
|---|---|---|---|
| 1 | x1000 | x8FF | 12 |
| 2 | x2000 | x8FF | 8 |
| 3 | x3000 | x8FF | 7 |
| ... | ... | ... | ... |

RECEPTION ACCORDING TO A DATA TRANSFER PROTOCOL OF DATA DIRECTED TO ANY OF A PLURALITY OF DESTINATION ENTITIES FOR DATA EXTRACTION

The present application relates to data processing systems and discloses several distinct inventive concepts which are described below in Sections A to H of the description.

DESCRIPTION OF DRAWINGS

FIG. 10 shows examples of aperture and buffer tables.

FIG. 11 shows an example of a queue table.

FIG. 15 shows examples of aperture and buffer tables.

FIG. 16 shows an example of a queue table.

FIG. 30 shows examples of aperture and buffer tables.

FIG. 31 shows an example of a queue table.

In the appended drawings:

FIGS. 1 to 4 relate to the description in Section A;
FIGS. 5 to 7 relate to the description in Section B;
FIGS. 8 to 12b relate to the description in Section C;
FIGS. 13 to 17b relate to the description in Section D;
FIGS. 18 to 20 relate to the description in Section E;
FIGS. 21 and 22 relate to the description in Section F;
FIGS. 23 to 27 relate to the description in Section G; and
FIGS. 28 to 32b relate to the description in Section H.

Figure 1:
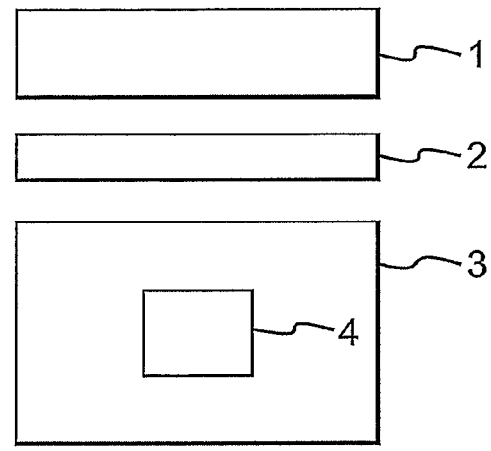
FIG. 1 shows a prior art computer system.

Embodiments of each of the inventions described herein may include any one or more of the features described in relation to the other inventions.

Where reference numerals are used in a Section of the description they refer only to the figures that relate to the description in that Section.

Section A
Processing Data

The present invention relates to the processing of data in a data processing system, and in particular to processing data that is transmitted within a network.

FIG. 1 represents equipment capable of implementing a prior art protocol stack, such as a transmission control protocol (TCP) stack in a computer connected to a network. The equipment includes an application 1, a socket 2 and an operating system 3 incorporating a kernel 4. The socket connects the application to remote entities by means of a network protocol, in this example TCP/IP. The application can send and receive TCP/IP messages by opening a socket and reading and writing data to and from the socket, and the operating system causes the messages to be transported across the network. For example, the application can invoke a system call (syscall) for transmission of data through the socket and then via the operating system to the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter.

Examples of syscalls are select( ) and poll( ). These can be used by an application for example to determine which descriptors in use by the application have data ready for reading or writing.

When a network related application program interface (API) call is made through the socket library this causes a system call to be made, which creates (or opens) a new file descriptor. For example the accept( ) system call takes as an input a pre-existing file descriptor which has been configured to await new connection requests, and returns as an output a newly created file descriptor which is bound to the connection state corresponding to a newly made connection. The system call when invoked causes the operating system to execute algorithms which are specific to the file descriptor. Typically there exists within the operating system a descriptor table which contains a list of file descriptors and, for each descriptor, pointers to a set of functions that can be carried out for that descriptor. Typically, the table is indexed by descriptor number and includes pointers to calls, state data, memory mapping capabilities and ownership bits for each descriptor. The operating system selects a suitable available descriptor for a requesting process and temporarily assigns it for use to that process.

Certain management functions of a computing device are conventionally managed entirely by the operating system.

These functions typically include basic control of hardware (e.g. networking hardware) attached to the device. When these functions are performed by the operating system the state of the computing device's interface with the hardware is managed by and is directly accessible to the operating system. An alternative architecture is a user-level architecture, as described in the applicant's copending PCT applications WO 2004/079981 and WO 2005/104475. In a user-level architecture at least some of the functions usually performed by the operating system are performed by code running at user level. In a user-level architecture at least some of the state of the function can be stored by the user-level code. This can cause difficulties when an application performs an operation that requires the operating system to interact with or have knowledge of that state.

Figure 2:
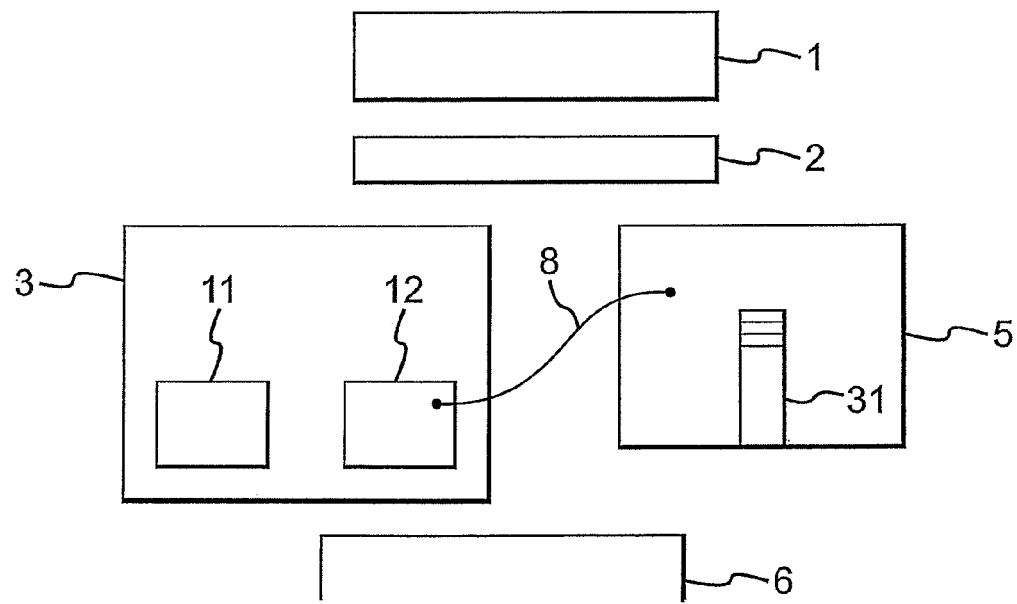
FIG. 2 shows a computer system in accordance with embodiments of the present invention.

FIG. 2 shows components implementing a TCP stack for use in accordance with embodiments of the present invention. Layers of the stack include an application 1 and a socket 2 provided by a socket library. The socket library is an application program interface (API) for building software applications. The socket library can carry out various functions, including creating descriptors and storing information. Additionally, there is an operating system 3 comprising a TCP kernel 4, and a proprietary TCP user-level stack 5. The user-level stack 5 will be referred to herein, by way of illustration only, as a Level 5, or L5, stack. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 2. The hardware could be a network interface card (NIC). It interfaces with a network so that data can be transferred between the system of FIG. 2 and other data processing systems.

Data received at the NIC or other hardware 6 is transmitted within the system of FIG. 2 according to the file descriptor with which it is associated. For example, L5 data will be transmitted onto a receive event queue 7 within the stack 5.

In a data processing system such as that of FIG. 2 (shown in more detail in FIG. 3), when new data is received from a NIC 6 it is passed to an incoming event queue 31-33 according to the user process to which the data relates. In the appropriate event queue the new data is processed and validated. For example, the stack 5 can process the new data in one of the event queues 31-33 using TCP/IP to render it compliant with the rules of TCP/IP, and the data can then be passed to a receive queue 34 corresponding to the respective event queue. In the exemplary system shown in FIG. 3, each event queue is associated with a plurality of receive queues. Prior to the protocol processing performed on the data in the event queue, the stack may not be able to determine whether or not a given file-descriptor endpoint has data available to receive, because although data may have been received for the endpoint, it is not available to the endpoint until it has been shown to be compliant with the rules of TCP/IP, for example in-order and checksummed.

In a prior art Linux NAPI system, incoming data is not separated into buffers on the basis of an indicated file descriptor prior to protocol processing. In this type of system, all new data in the event queues must be processed in order for the operating system to become aware that there may be new data relating to any particular user application.

When a select( ) or poll( ) call is triggered by an application, providing an up-to-date response requires that new data received at an event queue 31 has been validated. In the case of user-level stacks such as the stack 5 of FIG. 2, performing a poll( ) call on new data in a stack can give rise to a high processing overhead. This is due to lock contention (caused by the fact that the stack requires access to shared memory for the validation processing to be carried out) and the requirement for all of the new data in the event queues 31-33 to be processed before it can be recognised for the purpose of a response to a poll( ) call. Thus, in the example of a TCP stack, TCP processing must be carried out on all data in an incoming event queue which may be relevant to the set of file descriptors referenced by the poll( ) call, for a valid response to the poll( ) call to be returned.

According to a first aspect of the present invention there is provided a data processing system arranged for receiving over a network, according to a data transfer protocol, data directed to any of a plurality of destination identities, the data processing system comprising: data storage for storing data received over the network; a first processing arrangement for performing processing in accordance with the data transfer protocol on received data in the data storage, for making the received data available to respective destination identities; and a response former arranged for: receiving a message requesting a response indicating the availability of received data to each of a group of destination identities; and forming such a response; wherein the message former is arranged to, in dependence on receiving the said message: identify received data that is directed to any destination identity that is both a member of the group and a member of a subset of the plurality of destination identities, and on which processing has not yet been performed; trigger processing by the first processing arrangement in accordance with the protocol on only the identified data; and subsequently form a response based at least partly on the result of the triggered processing, wherein the response is formed so as to comprise a positive indication of availability of data for a destination identity of the group if the triggered processing caused data to be made available to the respective destination identity.

The first processing arrangement could suitably be at user level.

The data processing system could also comprise a second data processing arrangement for performing processing in accordance with the data transfer protocol on received data in the data storage other than the said identified data. The second processing arrangement may be a part of an operating system of the data processing system.

The data processing system could further comprise a data structure, associated with the processing of the received data other than the identified data, for storing an indication of: destination identities other than the subset of destination identities; and corresponding state data. The state data preferably comprises indications of availability of received data to respective destination identities. The indications of availability in the state data are formed based on the result of processing according to the protocol of received data other than data directed to any of the subset of destination identities.

The second processing arrangement may be dedicated to the processing of the received data other than data directed to any of the subset of destination identities.

The first and second processing arrangements could be implemented by means of respective threads. The processing arrangements could each be implemented in software or hardware.

The dedicated processing is performed by the second processing arrangement as a background processing operation such that other processing operations within the data processing system are not interrupted by the second processing arrangement.

The said subset preferably contains destination identities which relate to active network connections.

The said response could be based additionally on the state data in the data structure. The said response is preferably formed so as to comprise a positive indication of availability of data for a destination identity of the group other than a member of the subset if the state data indicates availability of received data to the destination identity. The response could be formed so as to comprise a positive indication of availability of data for a destination identity of the group if any processing other than the triggered processing causes data to be made available to the destination identity.

The data structure could suitably be stored in a cache. It could be stored in the operating system.

The data processing system could be further arranged to transmit a communication to a process running on the data processing system in the event that the said response comprises a positive indication of availability for a destination identity associated with the process.

Each destination identity could be associated with a socket.

The said making the received data available to respective destination identities could comprise passing the data from the data storage to one or more buffers associated with the respective destination identities.

The said message is preferably transmitted by means of a user process running on the data processing system.

According to a second aspect of the present invention there is provided a data processing system arranged for transmitting over a network, according to a data transfer protocol, data from any of a plurality of destination identities, the data processing system comprising: data storage for storing data to be transmitted over the network; a first processing arrangement for performing processing in accordance with the data transfer protocol on data in the data storage, for making the data available for transmission over the network; and a response former arranged for: receiving a message requesting a response indicating the availability of data from each of a group of destination identities for transmission over the network; and forming such a response; wherein the message former is arranged to, in dependence on receiving the said message: identify data in the data storage that is from any destination identity that is both a member of the group and a member of a subset of the plurality of destination identities, and on which processing has not yet been performed; trigger processing by the first processing arrangement in accordance with the protocol on only the identified data; and subsequently form a response based at least partly on the result of the triggered processing, wherein the response is formed so as to comprise a positive indication of availability of data for transmission for a destination identity of the group if the triggered processing caused data from the respective destination identity to be made available for transmission over the network.

According to a third aspect of the present invention there is provided a method for processing data received over a network wherein the data is transmitted over the network according to a data transfer protocol and is directed to any of a plurality of destination identities, the method comprising the steps of: storing data received over the network; receiving a message requesting a response indicating the availability of received data to each of a group of destination identities; and, in dependence on receiving the said message: identifying received data that is directed to any destination identity that is both a member of the group and a member of a subset of the plurality of destination identities, and on which processing has not yet been performed; triggering processing by the first processing arrangement in accordance with the data transfer protocol on only the identified data, the processing being for making the identified data available to respective destination identities; and subsequently forming the response based at least partly on the result of the triggered processing, wherein the response is formed so as to comprise a positive indication of availability of data for a destination identity of the group if the triggered processing caused data to be made available to the respective destination identity.

According to a fourth aspect of the present invention there is provided a method for processing data to be transmitted over a network wherein the network is such that data is transmitted according to a data transfer protocol from any of a plurality of destination identities, the method comprising the steps of: storing data to be transmitted over the network; receiving a message requesting a response indicating the availability of data from each of a group of destination identities for transmission over the network; and, in dependence on receiving the said message: identifying data in the data storage that is from any destination identity that is both a member of the group and a member of a subset of the plurality of destination identities, and on which processing has not yet been performed; triggering processing by the first processing arrangement in accordance with the data transfer protocol on only the identified data, the processing being for making the identified data available for transmission over the network; and subsequently forming the response based at least partly on the result of the triggered processing, wherein the response is formed so as to comprise a positive indication of availability of data for transmission for a destination identity of the group if the triggered processing caused data from the respective destination identity to be made available for transmission over the network.

According to a fifth aspect of the present invention there is provided a data processing system arranged for receiving over a network, according to a data transfer protocol, groups of data each directed to any of a plurality of destination identities, the data processing system comprising: a plurality of buffers for storing groups of data received over the network; a processing arrangement for performing processing in accordance with the data transfer protocol on received data in the buffers, for making the received data available to respective destination identities; and a controller arranged to, in dependence on the destination identity to which the group is directed, select for each received group of data, one of the plurality of buffers in which to store the group of data, and to store the group in the selected buffer prior to processing of the group by the processing arrangement in accordance with the data transfer protocol.

Figure 3:
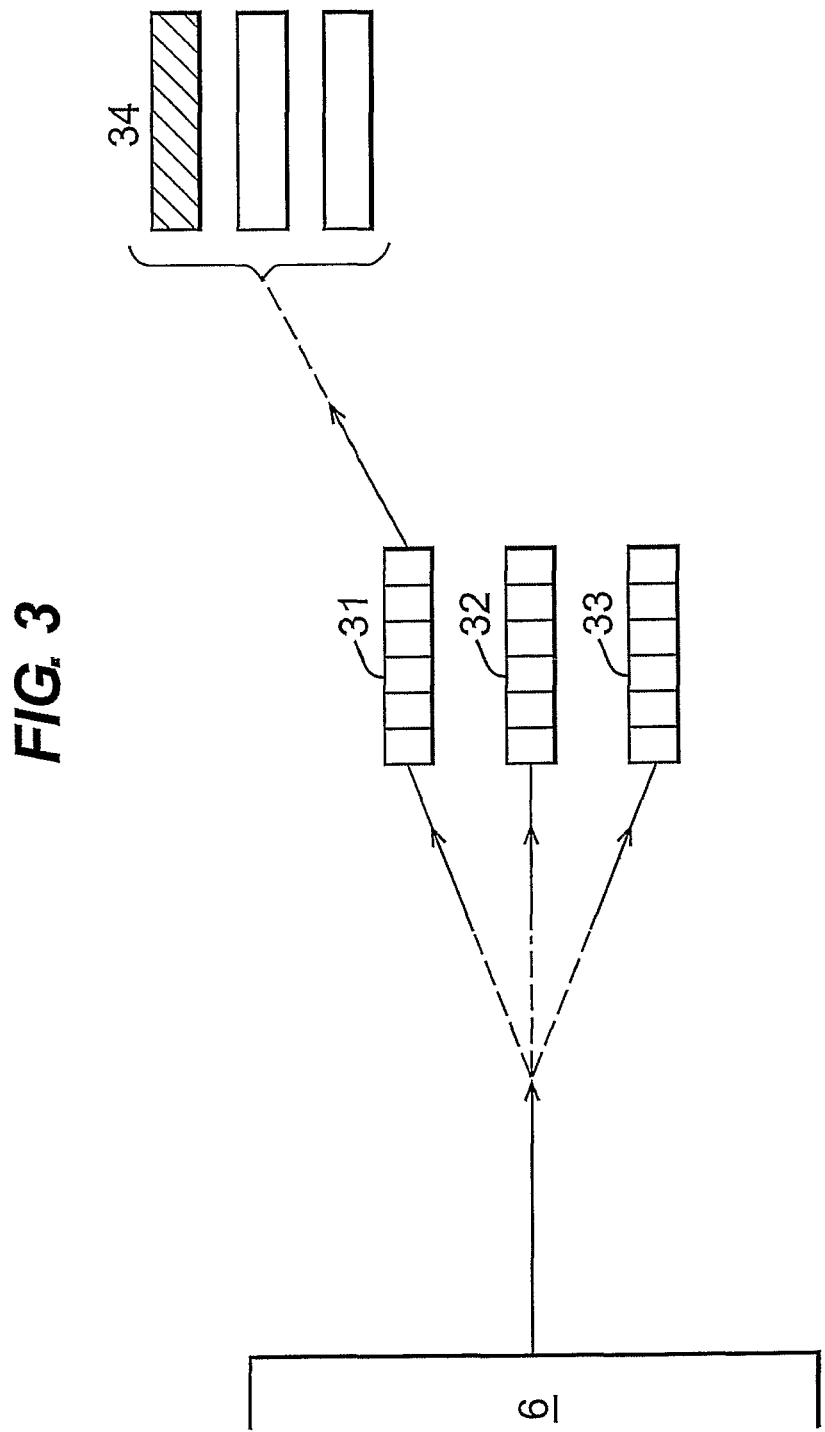
FIG. 3 shows the path of incoming data received at a computer system.

The present invention will now be described by way of example with reference to the accompanying drawings, in which:

FIG. 1 shows a prior art computer system;

FIG. 2 shows a computer system in accordance with embodiments of the present invention;

FIG. 3 shows the path of incoming data received at a computer system; and

Figure 4:
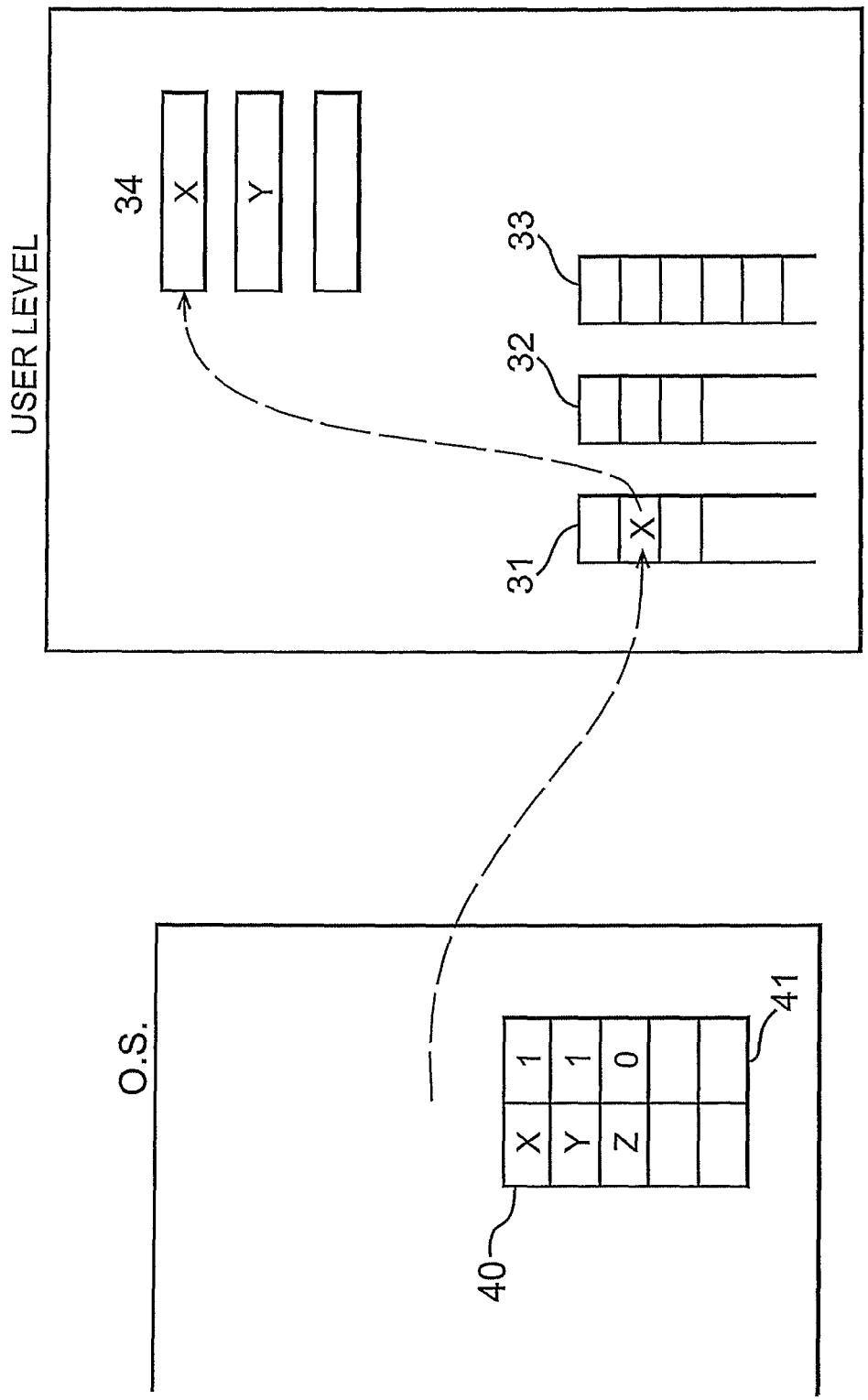
FIG. 4 shows a poll cache according to an embodiment of the invention.

FIG. 4 shows a poll cache according to an embodiment of the invention. In the system of FIG. 2, the operating system (OS) 3 incorporates a TCP driver or helper 12 for supporting the stack 5 and may incorporate a further a driver 11, for example to support a piece of hardware such as a disk. The TCP driver 12 is mapped onto the TCP stack 5 by means of a file descriptor. The mapping is shown in FIG. 2 as 8.

In this arrangement there can be one user-level TCP stack 5 for each application that requires one. This can provide better performance than if a stack is shared between applications. Each stack is located in the same address space as the application that it serves.

When L5 data is received at the NIC 6 it is passed to the relevant event queue 31 in the user-level stack. In general, the NIC will then send an event to the user-level stack if the stack is active. The stack can then poll its event queue and determine that data has been delivered. On the other hand, if the user-stack is inactive (for example because an application has blocked) then the TCP driver 12 would be informed by means of an interrupt from the NIC The driver 12 can thereby be informed when new L5 data is available, and can perform protocol processing on the new data or wake the relevant application. Preferably the memory mapping between the OS and the L5 stack is read only, to avoid corruption of data held in the OS by the stack 5.

Typically, a single event queue will be provided for a given transport library (or socket library) and there will usually be one instance of the transport library associated with each application. However it is possible for one library instance to manage a number of event queues. Since one transport library is capable of supporting a large number of sockets (i.e. application level connections), it can therefore occur that a single queue contains data relating to a number of network endpoints, and thus a single queue can contain data relating to a number of file descriptors.

When the application 1 wishes to determine whether any data intended for processing by the application has recently been received by the hardware, it initiates a select( ) or poll( ) call listing a set of file descriptors. The call is passed to the OS via the socket 2, and a response is returned to the application 1 to indicate, for each descriptor listed in the poll( ) call, whether any new data is available for that descriptor. In general, some of the descriptors will relate to queues run by the L5 stack, whereas some will relate to components in the OS (such as a driver 11 for a storage connection). In one example, each file descriptor identified in the poll( ) call could relate to a respective network endpoint from which the application expects to receive data. Each such endpoint could conveniently be associated with a socket created by the library 2. Thus, the result of the poll( ) call can inform the application of which endpoints have recently transmitted data that is waiting in a receive queue 34 to be read by the application.

The validation processing performed on data in incoming event queues can conveniently be performed at a transport library 2.

In order to handle new data efficiently, a first alternative in accordance with an embodiment of the invention is for the library 2 to intercept a select( ) call from the application 1, identify all L5 file descriptors identified in the call, and replace them all with a single descriptor denoting L5 descriptors. The single descriptor could suitably be the descriptor used to map the driver 12 onto the stack 5. The select( ) call, once modified by the library, is passed to the OS. A response is then created by the OS, having polled the TCP driver 12, to indicate whether any L5 descriptors have new data in the relevant receive queue 34. This response is based on the results of the TCP/IP validation processing carried out when incoming data is received at the event queue. Data from a given network endpoint can be identified within a receive queue by means of the associated file descriptor.

The response, once created by the OS, is intercepted by the library 2 and sent to the application, so that the application can establish whether any L5 data is waiting to be handled. If the response indicates that there is new L5 data, the application will need to process the receive queue 34 by checking the L5 file descriptors by means of the L5 helper 12. In this way, unnecessary accessing of the receive queue 34 can be avoided when the response indicates that there is no new L5 data.

Alternatively, the library could refrain from modifying the parameters of the select( ) call itself, but could instead modify the response to the select( ) call to replace any L5 descriptors mentioned in the response with a reference to a single descriptor denoting L5 descriptors.

A second alternative for efficiently handling new data is particularly appropriate when the TCP file descriptors are busy, in other words when a large amount of TCP data is being received at the hardware 6 and passed to the receive queue 34. This approach effectively assigns a high priority to the TCP descriptors, in preference to descriptors related to other components such as the storage connection driver 11. The approach involves directly accessing the queues 34 and ignoring new data intended for components of the system other than the TCP stack. This can be achieved by removing at the library any non-L5 descriptors from a select( ) call sent from the application, so that it appears to the application that no non-L5 data is available. In order to achieve this the library may have access to a data store that stores a record of which of the descriptors are L5 descriptors.

A check is made by the socket library directly with the receive queues 34 to identify new L5 data. If no data is found, the library can stay spinning (i.e. re-checking) for a certain period of time on a given select( ) call. However, because the library is not accessing the OS during this period of time, new data for the disk driver may be waiting in the OS to be handled and the application would be unaware of it. Thus, in one embodiment a timer is run to count the period of time for which the library is spinning on the queues 34, and the library is periodically triggered to access the OS to acquire any disk data waiting to be handled. The time period could for example be 100 µs. Alternatively or in addition, the socket library could be prompted by the receipt of a new select( ) call from the application to access the OS to collect new disk data.

Thus, according to this second alternative, the library may be able to respond to select( ) calls in one of two modes: by indicating for all descriptors specified in the select( ) call whether there is data waiting to be handled, or by indicating for only those descriptors that are specified in the select( ) call and that are also L5 descriptors whether there is data waiting to be handled. One convenient way to employ these modes is to respond to a select call using the first mode if more than a predetermined time has elapsed since the last response using the first mode, and otherwise to respond using the second mode. Another way is to respond to every n-th select( ) call using the first mode, and to all other select( ) calls with the second mode, where n is a predetermined integer.

Suitably, details of the data being written to the receive queues can be fed back to the application so that the application can determine whether the L5 descriptors are busy, and thus whether the second alternative, involving ignoring data intended for other parts of the system, is appropriate. If the L5 descriptors are not busy then the first alternative, involving accessing of the stack 5 only when L5 data is available, is likely to be more efficient.

Typically the file descriptors listed in a select( ) call from the application are in numerical order. This can improve efficiency since all L5 descriptors can be kept together in a block, away from other descriptors of the application. It is convenient to monitor the assignment of descriptors and reorder them if the L5 descriptors become mixed up with other descriptors of the application. This reordering can be achieved using Dup2( ) calls. A Dup2(a,b) call has the effect of duplicating the file or other resource represented by descriptor "a" and creating a new resource represented by descriptor "b" and having the same properties. One example of when such a call might be useful is when a descriptor that has a system-wide significance (for example the descriptor that maps on to error output—commonly descriptor #2) is to be redirected on to some other file or device. Accordingly, an element of the system (conveniently the socket library) can monitor the arrangement of the descriptors. For example, it could periodically analyse the arrangement of the descriptors. When the L5 descriptors are disaggregated beyond a predetermined level: for example when they are split by other descriptors into more than a predetermined number of groups, the element initiates a reordering of the descriptors using dup2( ) operations to reduce the disaggregation of the L5 descriptors, and most preferably bring them into a contiguous group.

A specific embodiment of the invention will now be described with reference to FIGS. 2 and 3.

A TCP user-level stack 5 is provided in a data processing system. A NIC receives incoming data intended for sockets within the data processing system. The incoming data is passed within the data processing system according to its intended destination. For example, data associated with the OS is sent to a receive queue in the OS, while TCP data is sent to a receive queue in the TCP stack 5. From these queues it can be read by the application for which it is intended.

Similarly, data to be transmitted from the data processing system to other components of a network is held in transmit queues in the OS or the TCP stack as appropriate, before being passed to the hardware for transmission.

Data is received and transmitted in the network via sockets in the data processing system. In a preferred embodiment, one socket is provided for each network endpoint with which an application running on the data processing system wishes to communicate. At a given time, some of the open sockets will typically be active—in other words, data associated with those sockets is being received at or transmitted from the data processing system—while others will be inactive. The definition of "active" and "inactive" can be modified within embodiments of the invention in order to customise a data processing system to a user's requirements. For example, a programmer or user could define that a connection will be considered "active" if data has been transmitted over the connection in the last, say, 5 minutes or 5 seconds, depending on the type of use of the network. It will be understood that the status of a connection (or socket) as active or inactive can change frequently, for example as usage of a network endpoint changes.

If a socket is inactive, data associated with that socket may nevertheless still be held in an incoming event queue, awaiting processing. For example, the data may have been received towards the end of a communication session with a network endpoint such that no further data is due to be received, and if the associated application has not yet read the last received data from the queue then it will remain on the queue. Another cause for a socket being inactive is if it is blocking for some reason, for example while waiting for data. In this case, new data could be being written to the event queue while the socket is blocking.

When a poll( ) call is sent from an application to discover whether there is any new data on a TCP event queue for a list of file descriptors, the new data must be processed in the queue before a true response to the poll( ) call can be returned, as explained in the introduction above. In the specific embodiment, when a poll( ) call is issued in respect of an inactive socket, the file descriptor associated with the inactive socket is entered into a cache 40 in the OS, shown in FIG. 4. This cache will be referred to herein as a "poll cache". The operating system preferably maintains an indication of which file descriptors are currently being held in the poll cache 40.

Once a socket (or, more precisely, a file descriptor representing the socket, which is typically itself associated with a network endpoint) enters the poll cache 40, it is monitored by means of a thread (a process or a part of a process) dedicated to the poll cache. The thread runs on the OS. The monitoring involves checking periodically for each descriptor within the poll cache whether there is any data on the corresponding event queue 31-33 which is awaiting processing. If there is data on an event queue, then the dedicated thread will perform TCP processing on the data such that the data becomes available to be read by the associated application. In the example shown in FIG. 4, descriptors X, Y and Z are being held in the poll cache. When the thread in the OS monitors for new data relating to descriptor X it identifies a block of data in event queue 31. The thread proceeds to perform protocol processing on this block of data, and the processed data is passed to a receive queue 34. The data is then available be read from the receive queue by the application for which it is intended.

In a preferred embodiment, protocol processing by means of the thread in the OS is in general slower than conventional protocol processing by means of the user-level stack, since the thread only deals with each socket once per period, and a relatively small proportion of the operating system's processing resource can be made available for the protocol processing so that this background processing does not impact significantly on the overall performance of the OS. The OS path for processing can thus be seen as a slow path, or low priority path, in comparison to the fast processing of active socket data. It will be understood by the skilled person that the fast and slow processing paths need not be carried out by the user-level stack and the OS, as in the present example. Any processing means which result in a relatively fast and a relatively slow path would be suitable, whether external or internal to a conventional data processing system.

When data relating to a descriptor stored in the poll cache is identified and processed, the associated descriptor (identifying a socket) is then marked, for example by means of a flag stored in the operating system, as having new data available to be read. It can be seen from the example of FIG. 4 that data for descriptors X and Y is available in the respective receive queues 34. In FIG. 4, column 41 of the poll cache contains an indication of whether new data is available to be read: a 1 in the column indicates data and a 0 indicates no data. In this way, when a subsequent poll( ) call is issued for a file descriptor held in the poll cache, the OS can directly determine that there is new data for the file descriptor without the overhead of accessing the event queue and protocol processing the data from that queue, and without the overhead of acquiring the TCP state locks for each item of received data. The determination could be made from a table such as that illustrated in FIG. 4, but it will be clear to a skilled person that other forms of data structure would be suitable for maintaining records of the descriptors in the poll cache. In general, the contention for accessing the state data maintained in the poll cache will be significantly less than the contention for polling the inactive connections directly.

It can thus be seen that in embodiments of the invention the returned response to a poll( ) call can be based on data from the operating system alone, and the TCP stack need not be accessed. The latency associated with returning a response to a poll call is thereby reduced.

It is possible that in embodiments of the present invention a response to a poll call returned from the OS based on poll cache data may contain information that is not up-to-date, because it may occur that a polled file descriptor has new data waiting on an event queue which has not yet been protocol processed by the thread running in the OS. The presence of such data would not be evident from the poll cache. However, the descriptors in the poll cache relate only to inactive sockets, and the possible inaccuracies resulting from the fact that the responses may not reflect the latest changes in the computer system are less significant than the efficiency benefits that can be achieved by implementing the invention.

The dedicated thread is preferably asynchronous. Locking contention is unlikely since the thread is only operating on inactive sockets. In the specific embodiment, the thread cycles around the inactive sockets held in the poll cache, checking each in turn for new data and performing any necessary processing. The thread could conveniently be arranged to process the inactive socket data, say, every 1 second or every 0.5 seconds. The monitoring and processing performed by the thread is preferably carried out as a background task, thereby permitting the data processing system to operate as usual without interference from the thread. The amount of the operating system's resources dedicated to protocol processing the data for inactive sockets could be arranged to be variable, to deal with differing levels of activity of the data processing system. For example, the period with which the thread accesses the inactive socket data could be modified. The modification could be triggered automatically in response to a change in the amount of unprocessed data in the event queues, or it could triggered by a user.

The poll cache could be arranged to contain file descriptors relating to any of a plurality of protocol stacks such as stack 5.

Poll( ) calls relating to active TCP sockets are handled in the same way as in prior art systems: the user-level stack is accessed. Protocol processing of received data directed to active sockets could be triggered by receipt of the data at the NIC or the event queues. Alternatively, protocol processing of data directed to an active socket could be triggered by the receipt at the message former of a poll( ) call requesting a response for that socket.

It will be understood that the example described above could be applied to queues for outgoing as well as incoming data. In an embodiment of the invention in this situation, data waits in buffers to be protocol processed, after which it is passed to one or more transmit queues from where it can be transmitted over the network. A socket related to an application may have further data which it wished to pass to the buffers in order that it can be sent over the network, but such further data cannot efficiently be sent unless there is sufficient capacity in the transmit queues for the data to enter when it has been processed. The application therefore causes a poll( ) call to be sent to the operating system, identifying one or more file descriptors, associated with sockets in use by the application, and the response indicates whether there is data in the transmit queues relating to those file descriptors. If not, the further data can be sent by the application for processing. In accordance with this embodiment of the invention, data in the buffers which relates to inactive sockets is treated as a lower priority than data which relates to active sockets, and is processed as a background task by a dedicated thread in the OS.

In the specific embodiment, descriptors can be deleted from the poll cache when the associated socket becomes active. For example, if a send( ) or receive( ) instruction is run in relation to a socket, or if a socket stops blocking, it will be deleted from the poll cache and treated as normal, and the indication in the OS that the associated file descriptor is held in the poll cache will be deleted. Alternatively or in addition entries for sockets in the poll cache can time out, so that for example if no protocol processing has been required for a predetermined time for data associated with an inactive socket, the associated file descriptor can be deleted from the poll cache. The efficiency of the poll cache can thereby be improved, since the amount of processing required to check event queues for new data relating to sockets in the poll cache will be reduced if fewer descriptors are held in the cache.

The poll cache could be arranged to wake up an application in the data processing system in the event that data relating to a socket of the application is recovered by means of processing by the thread in the poll cache. The woken application could then read the data from the receive queue in which it is being held.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section B

Forwarding Instructions

The present invention relates to the processing of data in a data processing system, and in particular to a method and apparatus for forwarding instructions within a data processing system.

Figure 5:
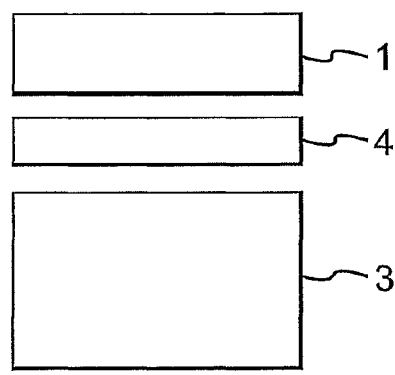
FIG. 5 shows a prior art computer system.

FIG. 5 represents equipment capable of implementing a prior art protocol stack, such as a transmission control protocol (TCP) stack in a computer connected to a network. The equipment includes an application 1, a socket 4 and an operating system 3 incorporating a kernel (not shown). The socket connects the application to remote entities by means of a network protocol, in this example TCP/IP. The application can send and receive TCP/IP messages by opening a socket and reading and writing data to and from the socket, and the operating system causes the messages to be transported across the network. For example, the application can invoke a system call (syscall) for transmission of data through the socket and then via the operating system to the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter.

Examples of syscalls are select( ) and poll( ). These can be used by an application for example to determine which descriptors in use by the application have data ready for reading or writing.

When a network related application program interface (API) call is made through the socket library this causes a system call to be made, which creates (or opens) a new file descriptor. For example the accept( ) system call takes as an input a pre-existing file descriptor which has been configured to await new connection requests, and returns as an output a newly created file descriptor which is bound to the connection state corresponding to a newly made connection. The system call when invoked causes the operating system to execute algorithms which are specific to the file descriptor. Typically there exists within the operating system a descriptor table which contains a list of file descriptors and, for each descriptor, pointers to a set of functions that can be carried out for that descriptor. Typically, the table is indexed by descriptor number and includes pointers to calls, state data, memory mapping capabilities and ownership bits for each descriptor. The operating system selects a suitable available descriptor for a requesting process and temporarily assigns it for use to that process.

Certain management functions of a computing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. A further typical function of the operating system is processing data that is either received at or to be transmitted from the device. Such data typically requires processing in accordance with a data transfer protocol, such as TCP. An alternative architecture involves performing at user-level certain functions which would conventionally be performed by the operating system. Such a user-level architecture is described in the applicant's copending PCT applications WO 2004/079981 and WO 2005/104475. In a user-level architecture at least some of the functions usually performed by the operating system are performed by code running at user level, and at least some of the state of the function can be stored by the user-level code. This can cause difficulties when an application performs an operation that requires the operating system to interact with or have knowledge of that state.

Figure 6:
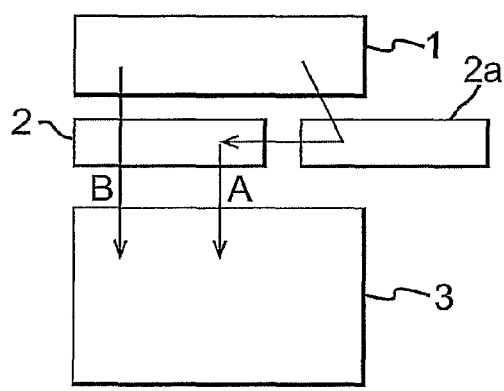
FIG. 6 shows a computer system with an interposing library.

FIG. 6 shows components implementing a TCP stack that could be used in accordance with embodiments of the present invention. Layers of the stack include an application 1 and a library 2. The library is an application program interface (API) for building software applications. The library can carry out various functions, including creating file descriptors and storing information. Additionally, there is an operating system 3 comprising a kernel (not shown), and a proprietary TCP library 2a for supporting TCP communications over a network. The library 2a will be referred to herein, by way of example only, as a Level 5, or L5, library. A user-level stack (not shown) would typically be provided for enabling the TCP communications over the network. It will be understood by the skilled person that although TCP is referred to in the present description by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet or non-Internet protocols could be used. In systems according to embodiments of the invention, the user-level stack is typically connected to hardware, which could be a network interface card (NIC). The NIC interfaces with the network so that data can be transferred between the system of FIG. 6 and other data processing systems.

The L5 library 2a is an example of an add-on library, provided in addition to the basic components of a data processing system. The L5 library is intended to intercept messages sent between user-level applications and the operating system. This can enable it to take control of certain operations within the data processing system. For example, it could be intended to intercept all system calls of a certain type, such as those relating to the transmission and reception of data over the network.

In general, in a data processing system such as that shown in FIG. 6, interposing libraries such as the library 2a are configured to capture calls that originate from the application 1 and are sent to the library 2. The library 2 could be a C library, which stores a collection of programs and routines for interpreting the programming language C. When a user-level application issues a call intended for the operating system, the C library, referred to herein as libc, receives the call and issues a corresponding syscall to the operating system. The L5 library 2a is configured to intercept the function call originating from the application, as shown in scheme A in FIG. 6. In this way, the L5 library can be informed of interactions between the application and the operating system which are related to the operations in which the L5 library is interested; in this example, networking syscalls.

A specific example of a syscall interception will now be considered in the context of a Linux system, with reference to scheme A shown in FIG. 6. A function call is issued by the application 1 indicating that the application wishes to read data which has been received at the data processing system over the network and which is intended for a process running in the application 1. The interposing library 2a is configured to recognise the call as relating to the application 1 and relating to a networking operation, and is configured to intercept such a call. The library 2a subsequently passes the call to the libc 2, which then sends a read( ) syscall towards the operating system 3.

Some operating systems provide "hooks" to permit the addition of components such as add-on libraries for intercepting messages between user-level applications and operating systems. In general terms, a hook is a feature of software or hardware that enables expansion of the original computer system. At present, hooks that are provided by operating systems tend to be unreliable. This unreliability can cause problems for interposing software such as the library 2a, which relies on its ability to intercept all system calls which it requires. In particular, problems can occur when expected system calls are missed by the library 2a. This can arise when the application 1 sends a call directly to the operating system, bypassing the libc 2 as shown in scheme B in FIG. 6, such that the interposing library is unaware of the call. This situation can occur if the application constructs a call which is expressed in in-line assembly rather than calling a libc entry-point (i.e. a function call). For instance, a close( ) call may be sent directly from the application to the operating system, requesting that a particular resource, identified in the call by a file descriptor, that was previously in use by the application is closed. If this call is missed by the L5 library 2a, then the L5 library will be unaware of the application's request, and will consequently not close down the resource which it has allocated for the file descriptor. Thus, as far as the L5 library is aware, the resource is still allocated to the application, but the application considers that the resource is no longer allocated to it. The application and the library are therefore no longer synchronised.

Another situation in which an interposing routine can miss a syscall is when a libc generates its own syscall and sends it to the operating system. Synchronisation between the application and the interposing library can also be compromised in this scenario, since the interposing library is not configured to intercept calls originating at the libc. In general, the problem of maintaining synchronisation between components of a data processing system can arise in all cases in which a library is being dynamically hooked into a data processing system.

According to a first aspect of the present invention there is provided an operating system for use in a data processing system comprising an application and a library for supporting one or more functions; wherein the operating system is arranged for: receiving from the application an instruction to perform an operation; determining whether both of conditions (a) and (b) are true, where: (a) is that the operation relates to any of the said functions; and (b) is that the route by which the instruction reached the operating system does not include the library; and if both of the conditions are determined to be true, passing an indication of the instruction to the library.

The operating system could be arranged not to perform the said operation in response to receiving the instruction if both of the conditions are determined to be true. The operating system could be arranged to perform the operation in response to receiving a trigger from the library if both of the conditions are determined to be true.

The said determining preferably comprises identifying a file descriptor included in the instruction. The said determining could further comprise determining whether the identified file descriptor relates to any of the said functions.

The operating system could be further arranged for storing a first data structure comprising indications of file descriptors and state data for each indicated file descriptor. The state data could comprise for each indicated file descriptor an indication of whether the file descriptor is in use by the library. The said determining could further comprise accessing the first data structure.

The operating system may be further arranged for storing a second data structure comprising indications of types of operation and, for each type, an indication of whether the type relates to any of the said functions.

The said determining could comprise identifying the type of the operation. The said determining may further comprise accessing the second data structure.

The said functions could relate to the transfer of data over a network.

The said determining preferably comprises determining whether one of conditions (a) and (b) is true and, only if that condition is true, determining whether the other of the conditions is true.

According to a second aspect of the present invention there is provided a data processing system comprising an operating system as set out above.

According to a third aspect of the present invention there is provided a method for forwarding instructions in a data processing system comprising an operating system, an application and a library for supporting one or more functions, the method comprising the steps of: receiving at the operating system an instruction from the application to perform an operation; determining whether both of conditions (a) and (b) are true, where: (a) is that the operation relates to any of the said functions; and (b) is that the route by which the instruction reached the operating system does not include the library; and if both of the conditions are determined to be true, passing an indication of the instruction to the library.

The present invention will now be described by way of example with reference to the accompanying drawings, in which:

FIG. 5 shows a prior art computer system;

FIG. 6 shows a computer system with an interposing library; and

Figure 7:
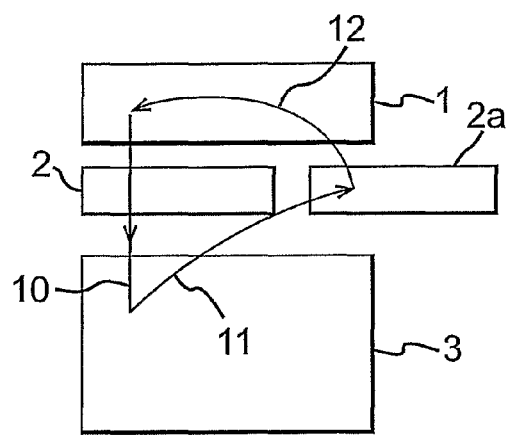
FIG. 7 shows a computer system in accordance with an embodiment of the present invention.

FIG. 7 shows a computer system in accordance with an embodiment of the present invention.

FIG. 7 shows a scheme in accordance with an embodiment of the invention, in which a call 10 transmitted directly from the application 1 to the operating system 3 is subsequently passed from the operating system to an interposing library 2a according to a set of predefined rules. The library 2a can thus be made aware of calls which it would not have been able to intercept by a conventional interception as shown in scheme A in FIG. 6. In the specific example shown in FIG. 7, a kernel (not shown) within the operating system passes the call to a user-level routine 2a which is interposed in the data processing system. The act of passing or forwarding the call from the operating system to the interposing library is referred to herein as "trampolining".

The trampolining mechanism is implemented by installing a special call handling routine in the operating system. This routine can be customised for particular purposes and it defines a set of rules for handling system calls received at the operating system. In the present example, the routine specifies that all system calls received at the operating system should be analysed to determine whether they should be trampolined to the L5 library 2a. Specifically, the answer to one or both of the following questions is determined at the operating system for each received system call: (a) does the call relate to an operation which involves the L5 library?; and (b) has the call arrived via the L5 library? If the answer to (a) is yes, then it is a call of which the L5 library needs to be aware for synchronisation purposes as discussed above. However, if the answer to (b) is yes, then the L5 library should already have intercepted the call on its path from the application to the operating system. Thus, if the answer to (a) is no or if the answer to (b) is yes, then there is no need for the operating system to treat the call differently from the conventional manner, and the operating system will call the standard system call handler. However, if the answer to (a) is yes and the answer to (b) is no, then the operating system is configured to trampoline the call to the L5 library.

It will be understood that short-circuit processing could be used in the above-described analysis: if the answer to one of the questions is determined to indicate that no trampolining is necessary, then the operating system can halt the customised call handling and proceed as normal without determining an answer to the other question.

In general, the rules incorporated in the custom system call handler can be defined according to the desired role of the trampolining mechanism. For example, the handler could be configured to identify the type of the syscall, with certain types being identified in a data structure within the operating system as requiring trampolining while others do not require trampolining. The handler could also be configured to identify one or more file descriptors or other arguments in the syscall. A look-up table or other type of data structure could be used by the operating system for identifying whether syscalls having the identified arguments are to be passed to the interposing library. The current mode of the system could also be taken as a factor when the operating system decides whether or not to trampoline a received syscall to the interposing library. The conditions for trampolining a call could be dependent on the type of the call.

The custom system call handler of the preferred embodiment of the invention is configured to trampoline calls required by the user-level L5 library 2a to a preregistered entry point within the library. This entry point is referred to herein as the "trampoline handler function". The custom system call handler is configured such that the return address for calls to be trampolined is the user-level trampoline handler function instead of the application which sent the syscall. The trampoline handler function is thus called whenever the operating system determines that a system call received at the operating system should be passed to the L5 library. This is shown as 11 in FIG. 7. This results in control being passed to the trampoline handler function at the interposing library 2a, instead of to the code (the application) that issued the system call. The library 2a can then call the operating system in order to cause execution of the function requested by the application.

In a preferred arrangement there is one user-level stack for each application that requires one, with each stack preferably comprising an interposing library 2a. This can provide better performance than if a stack is shared between applications. Each stack is located in the same address space as the application that it serves. The writing of the return address in the custom system call handler is preferably performed on a per-user-process basis, such that the interposing library associated with each user process can receive trampolined calls.

When the custom system call handler of the preferred embodiment receives a system call which it identifies as requiring trampolining, it modifies the user-level stack associated with the thread that issued the system call and pushes on to it any parameters that were passed to the system call, together with the return address which points at the code that issued the system call. The trampoline handler routine, on receiving a trampolined call from the operating system, arranges the stack and processor state as necessary before calling the routine which would conventionally have been provided for intercepting the system call. The code that originally issued the system call is finally called by the library 2a in a step 12, so that control is again passed to the application.

It should be noted that although the preferred embodiment involves returning control from the library 2a directly back to the application, the library could instead be arranged to return its response to the trampolined call to the operating system, which could subsequently call the application.

Instead of modifying the user-level stack to accommodate the custom system call handler, the operating system could be configured to set state (for example in the operating system) in response to receiving a call to be trampolined to indicate a function which the interposing library is to perform. A generic handler in the library could then be called, which can interpret the state and jump to the appropriate point in the stack to perform the indicated function.

The trampolining mechanism described above is in general slower than a conventional interception of a syscall because it involves passing the syscall to the operating system before the interposing library becomes aware of the syscall, but it can be implemented such that it is functionally equivalent to interception techniques and it is a more reliable arrangement.

In preferred embodiments, the trampolining is performed in a transparent manner by the operating system such that components of the data processing system may be aware of the procedure. However, the operating system could instead be arranged to perform the trampolining while other components of the system remain unaware that the call is being handled in an unconventional manner.

Custom system call handlers in accordance with embodiments of the invention can be implemented to handle system calls in systems in which a hook is provided for supporting an interposing routine such that only calls that were transmitted from the application directly to the operating system are analysed as candidates for trampolining. Alternatively, they could be implemented in systems which do not provide hooks for supporting interposing routines, such that all calls transmitted from the application towards the operating system are candidates for trampolining. Or they could be implemented in systems in which hooks are provided for supporting an interposing routine but in which the interception is not reliable, so that in the event of a system call passing to the operating system undetected by the interposing routine, the operating system's custom system call handling routine could act as a safety net to ensure that the call is passed to the interposing routine.

Embodiments of the invention can also be implemented such that on an assertion failure in kernel mode control is trampolined to a user mode component such as the library 2a. This can improve efficiency while kernel mode code is being developed for an application, since in a conventional system such an assertion failure would cause the entire data processing system to shut down (or crash), requiring a hard re-boot to re-start the system. Instead, an application detected as containing a bug can be identified to the interposing library by means of the operating system using the trampolining mechanism described above, and the interposing library can then be enabled to record diagnostic information relating to the application and can cause the application itself to crash or close.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section C

Data Transfer

This invention relates to a system suitable for use in passing data over a network or other data channel.

When data is to be transferred between two devices over a network, each of the devices must have a suitable network interface to allow them to communicate across the channel. The devices and their network interfaces use a protocol to form the data that is transmitted over the channel, so that it can be decoded at the receiver. The data channel may be considered to be or to form part of a network, and additional devices may be connected to the network.

The Ethernet system is used for many networking applications. Gigabit Ethernet is a high-speed version of the Ethernet protocol, which is especially suitable for links that require a large amount of bandwidth, such as links between servers or between data processors in the same or different enclosures. Devices that are to communicate over the Ethernet system are equipped with network interfaces that are capable of supporting the physical and logical requirements of the Ethernet system. The physical hardware component of network interfaces are referred to as network interface cards (NICs), although they need not be in the form of cards: for instance they could be in the form of integrated circuits (ICs) and connectors fitted directly on to a motherboard.

Where data is to be transferred between cooperating processors in a network, it is common to implement a memory-mapped system. In a memory-mapped system communication between the applications is achieved by virtue of a portion of one application's virtual address space being mapped over the network on to another application or on to a region of real memory. The "holes" in the address space which form the mapping are termed apertures.

When data is to be transmitted or received in blocks of a certain size, it is normally necessary for the memory from which it is being read or to which it is being written to store that data contiguously. Otherwise, the data would have to be reassembled by the NIC, which would require the NIC to be provided with instructions on how to do that. This is inconvenient when the data blocks are larger than the page size of the system in question, because memory allocation must be managed accordingly.

According to one aspect of the present invention there is provided a data processing system comprising: a data processor for executing instructions to support one or more processes; memory for storing data; an interface whereby the data processor can transmit data to a remote receiver; and a configuration store storing definitions of a plurality of areas in the memory, each such area comprising a set of contiguous memory locations in the memory and the configuration store storing an order for each area; the interface being responsive to receiving an instruction of a predetermined form from the data processor specifying a starting memory location and a length to, if the specified starting memory location is in one of the areas defined in the configuration store and the specified length exceeds the length of the area starting from the specified location to automatically transmit data from the next area in order as defined in the configuration store.

According to a second aspect of the invention there is provided a method for transmitting data by means of a data processing system comprising: a data processor for executing instructions to support one or more processes; memory for storing data; an interface whereby the data processor can transmit data to a remote receiver; and a configuration store storing definitions of a plurality of areas in the memory, each such area comprising a set of contiguous memory locations in the memory and the configuration store storing an order for each area; the method comprising: receiving an instruction of a predetermined form from the data processor specifying a starting memory location and a length; in response to receiving the instruction, if the specified starting memory location is in one of the areas defined in the configuration store and the specified length exceeds the length of the area starting from the specified location automatically transmitting data from the next area in order as defined in the configuration store.

According to a third aspect of the present invention there is provided a data processing system comprising: a data processor for executing instructions to support one or more processes; memory for storing data; an interface whereby the data processor can receive data from a remote transmitter; and a configuration store storing definitions of a plurality of areas in the memory, each such area comprising a set of contiguous memory locations in the memory and the configuration store storing an order for each area; the interface being responsive to receiving a block of data from a remote transmitter for writing to a starting location in one of the areas to, if the length of the received data exceeds the length of the area starting from the specified location to automatically write some of the received data to the next area in order as defined in the configuration store.

Preferably the configuration store is local to the interface. It may be stored in memory that is physically located on the data processor, but it is then preferably accessible only to the interface and optionally the operating system of the data processor. In this way the integrity of the configuration store can be trusted by the interface.

Preferably the configuration store stores, for each area and identification of an entity as being associated with that area and the controller is responsive to the instruction of the predetermined form to verify that an entity that has sent the instruction of the second type is associated with the indicated location, and is arranged to transmit data from the area responsive to the instruction only if that verification is successful.

Preferably the interface is responsive to the said instruction to transmit data from the area in which the starting location is located starting from the specified location.

Preferably the interface is arranged to read data for transmission from the memory by direct memory access.

Preferably the configuration store indicates the physical addresses of the areas in the memory.

Preferably the interface has access to mapping data defining a mapping between a physical address space of the memory and a virtual address space and wherein the configuration store indicates the addresses of the areas in the virtual address space. The mapping data may be local to the interface.

Preferably the interface is a network interface and is arranged to transmit the data to the receiver by means of a network protocol.

Preferably the network protocol is TCP/IP.

Preferably the interface is arranged to transmit the data over Ethernet.

The method may comprise in order, the steps prior to the said receiving step of: identifying a block of data in the memory for transmission; storing in the configuration store a definition of an area that encompasses the said block of data; and transmitting to the interface an instruction of the predetermined form specifying a starting memory location in that area.

In the case of receiving data it will be appreciated that references to transmitting and reading can be replaced by references to receiving and writing.

The present invention will now be described by way of example with reference to the accompanying drawings.

Figure 8:
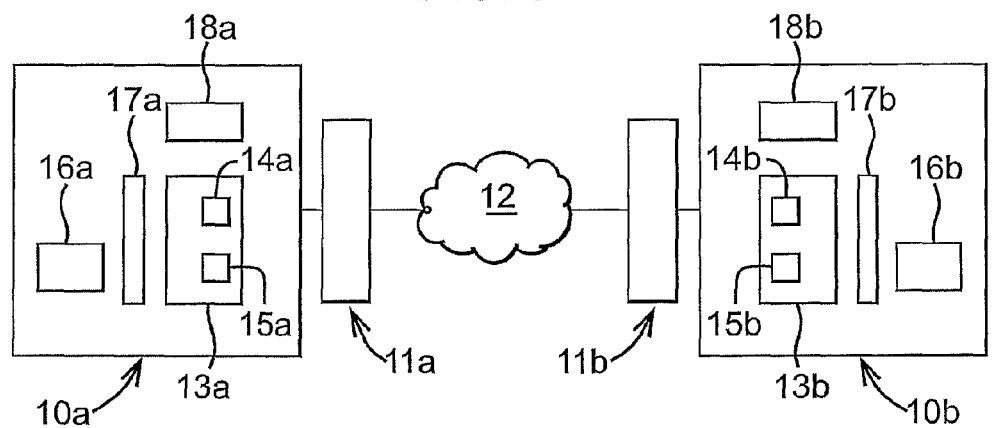
FIG. 8 shows schematically the architecture of a networked system.
Figure 9:
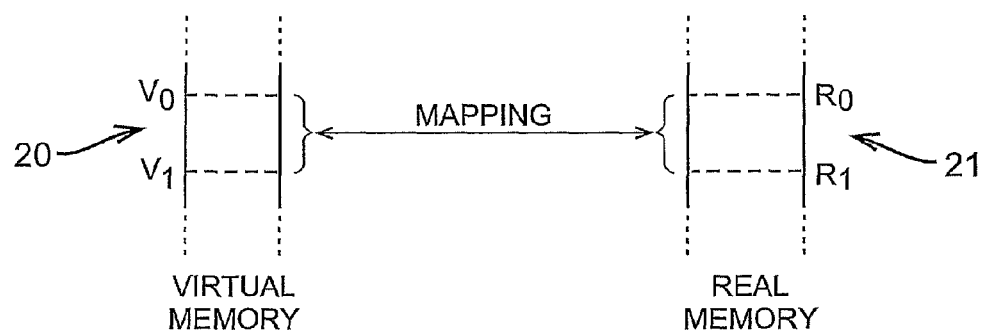
FIG. 9 illustrates mapping apertures.

In the drawings:

FIG. 8 shows schematically the architecture of a networked system;

FIG. 9 illustrates mapping apertures;

FIG. 10 shows examples of aperture and buffer tables;

FIG. 11 shows an example of a queue table; and

FIG. 12 illustrates reassignment of buffers.

FIG. 8 shows schematically the architecture of a networked system. The system comprises two data processors 10a, 10b (such as personal computers or servers), each of which has a network interface 11a, 11b (such as a NIC). The network interfaces are linked together over a data network 12. The data network could be an Ethernet network (e.g. using Gigabit Ethernet) or could employ any other suitable protocols. Each data processor has an operating system 13a, 13b which includes a kernel 14a, 14b and a device driver 15a, 15b for controlling communications between the data processor and its network interface. The operating system supports applications or processes 16a, 16b running on the data processor. A transport library 17a, 17b provides the applications/processes with routines that can be used for controlling communications over the network, and supervises communications between the applications/processes and the operating system. Each data processor has a memory 18a, 18b.

The network interfaces, the device drivers and the transport library cooperate to allow applications to map blocks of virtual memory of one of the data processors on to physical memory of the other of the data processors. The general principles behind such operation are described in WO 2004/025477 and WO2004/080005, which should be read in conjunction with the present application. When such a mapping has been established, one of the data processors can write to or read from a part of the area of virtual memory and this will have the effect of writing to or reading from the corresponding part of the area of physical memory. Such an arrangement is illustrated in FIG. 9, where a region of virtual memory 20 in a first data processing system, running from virtual memory location $V_0$ to virtual memory location $V_1$, is mapped on to a region of real memory 21 in another data processing system, running from real memory location $R_0$ to real memory location $R_1$. If the first data processing system reads from or writes to a location $V_n$ in the range from $V_0$ to $V_1$ that has the effect of reading from or writing to the corresponding location $R_n$ in the range from $R_0$ to $R_1$.

The operation of the system to support these mappings will now be described in more detail.

As is normal, the operating system of each data processor allocates a unique identifying number to each process running on that data processor. These numbers are used to secure the operation of the system, ensuring that data of one process is not read or altered by another process. The means of achieving this in the context of memory mappings will be discussed below.

If a process running on one data processor wishes to send data or read data using a mapping on to memory of the other data processor it first establishes the mapping, defining the environment in which that transfer can take place. The establishment of the mapping involves setting up entries in tables held by the data processors. Each data processor holds two tables: an aperture table and a buffer table, which are managed by its device driver 15. Together the tables define the mappings that are currently established. Examples of such tables are shown in FIG. 10.

The aperture table includes the following data for each mapping:
1. Local aperture index. This is an identifying number for the local aperture, which is allocated by the local device driver to be unique for the local data processor.
2. Local ownership. This indicates the identity of the process running on the local data processor that is entitled to access the mapping. This will typically be the process that created the mapping, but the right to access the mapping could be passed from one process to another provided preferably that that handover is performed in an authenticated manner (i.e. with the authorization of the process passing the right) so as to maintain security.
3. Remote aperture index: This is an identifying number for the aperture, which is allocated by the remote device driver to be unique for the remote data processor, and is transmitted by the remote data processor to the local data processor when the mapping is established.
4. Local buffer index(es). This indicates which of the buffers in the local buffer table are associated with the aperture. It should be noted that more than one local buffer can be associated with an aperture. Where more than one buffer is associated with an aperture, the associated buffers are listed in the entry in the aperture table strictly in the order in which they map on to the memory space represented by the aperture. Instead of explicitly listing all the buffers in an aperture a more compact encoding scheme can be used by indicating a starting buffer and a size, it being implied that the aperture is composed of the indicated buffer and subsequent buffers in order up to the total indicated size.
5. Sequence number. This indicates the serial number of the next packet to be processed locally for the aperture.

The buffer table maps which of the processes is allocated to each buffer and holds the following information for each buffer:
1. Buffer index. This is an identifying number for the buffer, which is unique for the local data processor. The buffer is identified by this number in the buffer table index field of the local aperture table.
2. Ownership. This indicates which local process owns the buffer.
3. Physical memory address. The buffer occupies a contiguous block of physical memory, and this number indicates where that block starts.
4. Length. This indicates the length of the buffer in memory.

The size of each buffer table entry is most preferably chosen to match the page size of the host system: typically 4 kb. In that way a contiguous region of the application's virtual address space which is mapped onto a non-contiguous region of physical memory can be represented by a sequence of buffer table entries.

In the example of FIG. 10, local aperture 1 is owned by process 8 and maps on to remote aperture number 5. The local physical memory corresponding to that aperture consists of xFFF bytes starting from physical address xB000. Local aperture number 3 is owned by process number 12 and maps on to remote aperture number 1. The local physical memory corresponding to that aperture consists of xA10 bytes starting at xD000 followed by x8FF bytes starting at xA000. Thus a single aperture can be mapped on to two or more discontiguous blocks of physical memory. This provides great flexibility in the transfer of data. For example, if a contiguous block of data at the transmitting end has to be transmitted to discontiguous locations at the receiver, instead of the transmitter having to issue multiple transmit instructions to transmit each block separately, the aperture can be mapped on to discontiguous blocks at the receiver and then a single transmit instruction for the whole block of data can be issued by the transmitting process. One specific example of a situation in which this would be useful is when cooperating applications on the data processors have differently arranged memory allocations.

The entries in the tables are set up when mappings are established. The buffers allocated to an aperture can be reassigned at one end or the other without re-establishing the mapping.

The aperture and buffer tables (indicated at 19a, 19b in FIG. 8) are held in memory 18 local to the device driver that manages them. The tables are stored in a region of the memory that cannot be accessed directly by processes running on the local data processor. This is preferably achieved by using built-in access control capabilities of the operating system. The operating system is preferably capable of allocating areas of the memory 18 to processes running on the data processing system, and preventing other processes running on the same system from accessing that allocated memory. In this way direct access to the area of memory that stores the tables is preferably reserved to the local device driver 15a, 15b (although since the operating system is in overall control it can also access the areas if required).

It will be appreciated that the tables can be set up in any suitable way, but the following is an example of a process for setting up a mapping between a process (Pa) running on a first data processor (DPa) to a process (Pb) running on a second data processor (DPb).

1. Process Pa initiates the establishment of the mapping by signalling its local device driver with details of the locations in local physical memory of the buffer(s) that are to be used for the mapping. The device driver checks that those locations are owned by Pa. If they are it sets up a row in the local buffer table for each of those buffers, and returns to the application the index allocated to each buffer. The device driver also sets up a transmit queue in local memory that can be used by the process for storing instructions defining the data it wants to transmit. The device driver informs the network interface belonging to DPa of the location of the queue and the identity of the process that owns the queue. That information is stored in a table in memory on the network interface. An example of such a table is illustrated in FIG. 11. It should be noted that since the device driver (as part of the operating system) is trusted, the ownership of the transmit queue by the appropriate process, and the ownership data passed to the network interface in step 2 below can be trusted.
2. Process Pa signals the device driver with the buffer index (es) of the buffers that it wants to map over the aperture, and details of the remote aperture on to which it want to map those buffers. The device driver passes that data to the local network interface, which signals with the remote aperture to establish the mapping. To allow this to be done, the process provides the following information: network address (e.g. MAC address) of the data processor providing the other side of the aperture (DPb), initial sequence number for serially numbering packets sent over the link, index number of the aperture on DPb, length of the aperture, ownership data identifying the process on DPa that is to use the aperture. The network interface on DPa then contacts DPb via the supplied network address to attempt to set up the mapping. DPb checks that it has an aperture with the supplied index number and that its length matches that supplied by DPa. DPb also receives data identifying the process initiating the connection and checks with the local process identified in the ownership bits for the local aperture that it will permit that process on DPa to access the aperture. If that is permitted the network interface of DPb signals its device driver to set up the appropriate row in its aperture table by storing the initial sequence number, remote aperture and remote ownership against that aperture. The network interface of DPb then returns a success message to the network interface of DPa. The network interface of DPa informs its device driver, which sets up its aperture table by storing the initial sequence number, remote aperture and remote ownership, and signals the initiating process that the aperture has been set up successfully.

In order for process Pa to transmit data to DPa using the mapping, it can either use PIO (programmed input-output) or DMA (direct memory access). In PIO the CPU (central processing unit) of DPa executes commands to retrieve data from its local memory and supplies that data to the local network interface for transmission. The network interface receives the data pushed to it by the CPU and transmits it in due course. In DMA the local network interface accesses the local memory directly to pull data from the memory for transmission. To achieve this the CPU transmits an instruction to the network interface which identifies an area in memory that contains data to be transmitted. In due course the network interface actions that instruction by reading the data directly from the memory and transmitting it. It then returns a message to the CPU to indicate that the transmission is complete. PIO is advantageous for the transmission of small amounts of data, since it involves simpler communication between the CPU and the NIC. DMA is advantageous for transmission of larger amounts of data since it reduces the load on the CPU that would otherwise be involved in passing the data to the NIC. It should be noted that, both these routes can be available simultaneously to a process for transmissions over a single mapping. This means that when a process wants to write to a remote location over the network it can select the most efficient means in each situation: for instance selecting PIO for transmissions of short blocks of data, and selecting DMA for transmission of longer blocks of data. It is convenient to arrange the system so that for some or all apertures not all parts of those apertures are accessible by PIO. The rest of the aperture can then be accessed by the NIC only via DMA. This economises on IO bus space since bus space only needs to be allocated for those parts that are accessible by PIO. A preferable arrangement is for all apertures greater than a predetermined size to be treated in this way. A preferably arrangement is for apertures that are being treated in this way to have only their first page-sized region accessible by PIO.

For PIO, process Pa causes the processor of data processor DPa to pass the data for transmission from local memory to the network interface hardware. Such transferring can be implemented using conventional PIO and will not be described in more detail here. However, on receiving data by PIO the network interface makes certain checks before sending the data to the remote data processor DPb. The data is sent by the process together with an indication of the aperture to which it is to be applied and the offset in that aperture at which it is to be applied. Using that data the network interface checks:

a. that the process that has sent the data is identified in the aperture table as owning the aperture to which the data is to be applied;

b. that the length of the data is not so great as to overrun the end of the aperture starting from the offset point in the aperture at which it is to be written.

If those checks are satisfied then it transmits the data to the remote terminal. At the remote terminal the remote NIC looks up the address to issue on its IO bus in order to store the received data from its buffer table.

For DMA the process adds a transmit command to its transmit queue. The transmit command specifies the intended destination of the data and could also include the data itself or could include a pointer to the data in memory (e.g. if DMA (direct memory access) by the network interface is to be used to transfer the data to the interface). Here the pointer would refer to a buffer table entry and offset, and the transmitter's DMA logic can check that the process sending the transmit instruction "owns" the buffer table entry to which the instruction refers. The latter option provides an efficient way for the process to transmit large quantities of data that is stored contiguously in physical memory. An example of the transmission and reception process will now be described.

1. Pa adds a transmit command to its transmit queue. The transmit command specifies:
   a. Destination device. The identity of the network device (DPb) to which the data is to be transmitted.
   b. Destination aperture index. The index of the aperture on DPb to which the data is to be applied.
   c. Destination offset. The offset within that aperture at which the data is to be applied.
   d. Source buffer. The index of the local buffer from which the data is to be transmitted.
   e. Source offset. The offset within that buffer from which the data is to be taken.
   f. Length. The length of data to be take from that offset point.

2. The command is taken from the transmit queue by the network interface of DPa. It could poll the queue periodically, or could be signalled with an interrupt when there is data on the queue. The network interface of DPa validates the command by checking the following data using the local buffer table:
   a. that the ownership data for the specified buffer (as stored in the local buffer table) indicate that the buffer is owned by the same process as owns the transmit queue from which the command was taken;
   b. that the source offset point lies within the buffer (i.e. source offset is not greater than the length of the buffer); and
   c. that the full length of the data to be transmitted lies within the buffer (i.e. source offset plus length is not greater than the length of the buffer.
   If these tests are satisfied then at this point the network interface can start retrieving data from the buffer and preparing it for transmission.
3. The network interface checks that the ownership data for the specified aperture as stored in the local aperture table indicate that the aperture is owned by the same process as owns the transmit queue from which the command was taken.
4. If all the tests are satisfied the network interface forms one or more packets to transmit the data to the destination. In addition to the usual packet contents each packet includes fields indicating:
   a. the identity of the process that owns the transmit queue from which the command was taken;
   b. the identity of the remote aperture to which the data is to be applied; and
   c. a sequence number specific to the aperture mapping, allotted in numerical order and incremented in the local aperture table after each packet has been transmitted.

The packet may also indicate the location in the aperture at which the data is to be applied. Alternatively the first packet in the set indicates the offset and the length of data to be sent and the payloads of the subsequent packets in the set are applied consecutively to the remote aperture following on from the payload of the first packet; and each packet in the set has a field indicating which set it belongs to.

5. At the receiver DPb the network interface looks up using its local aperture and buffer tables the physical address of the destination offset point. This might not lie in the first buffer allocated to the aperture if the destination offset is greater than the length of the first allocated buffer. Then each packet is processed in order of its sequence number, irrespective of the order in which the packets arrived. If a packet is lost then the subsequent packets in the set are held for a period of time pending retransmission of the lost packet. For each packet the following checks are made:
   a. that if the data from the packet were written to its destination point in the aperture it would not extend beyond the end of the aperture and/or the buffers allocated to it;
   b. that the ownership data in the packet matches the remote ownership data for the mapping.

Those checks are intended to ensure that the data from the packet will not be written into memory at a location that is not authorised: they verify that the ownership data in question is correct for the whole of the region where the data is to be written. If those checks are satisfied then the network interface of DPb writes the data to the memory at the locations as determined from the tables.

The buffer table could be split into two: one for use in resolving incoming data, and one for use in validating the security of outgoing data.

On transmission of data by DMA or PIO the transmitting NIC can add to the transmitted packet an indication of the process (e.g. thread or application) that has caused the data to be transmitted. That can then be verified at the receiver against data in its aperture table to check that the transmitting process corresponds to the receiving aperture.

If there is a block of data in the memory which a process wants to transmit to a remote data processor then the process could copy that data into a previously allocated buffer and then issue a command to transmit that data from the buffer. However, if the block of data is large then it may be more efficient to reallocate the process's buffer(s) so that one of the buffers encompasses the block of data that is to be transmitted. This involves an overhead of reallocating the buffers by causing the device driver to remap the relevant rows of the buffer table and/or the aperture table, but it omits the step of copying the data from one part of memory to another. The use of separate buffer and aperture tables allows this to be done in an efficient way, since the other parts of the aperture can be left mapped on to the same parts of memory as before the reallocation. On reallocation of the buffers for an active aperture the data is synchronised by the network interface under the control of the device driver between the two ends. This is illustrated in FIG. 12.

Figure 12A:
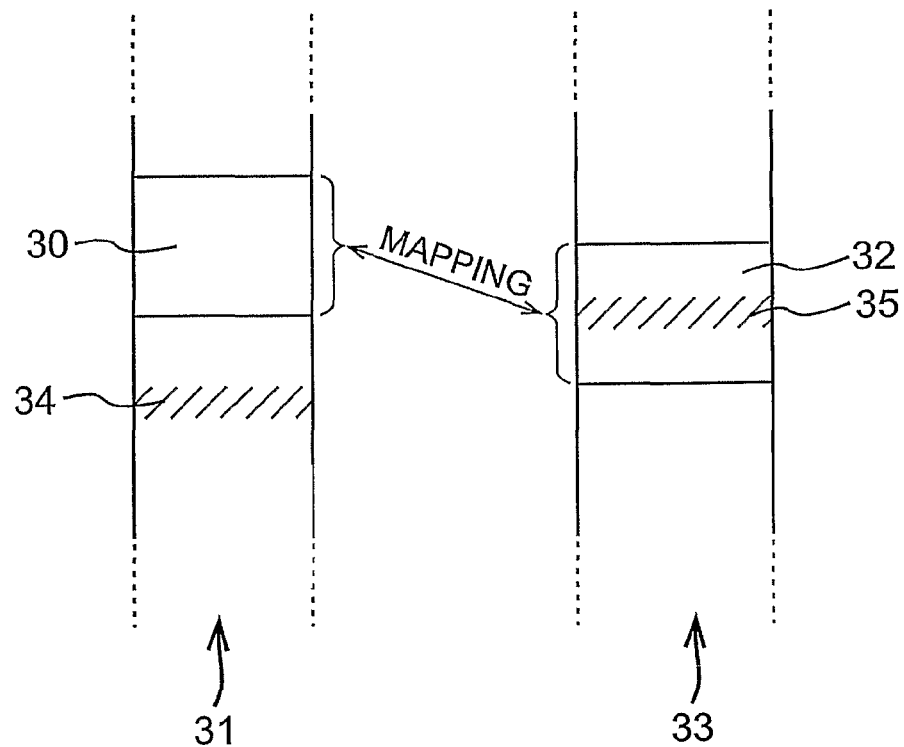
FIGS. 12a and 12b illustrate reassignment of buffers.
Figure 12B:
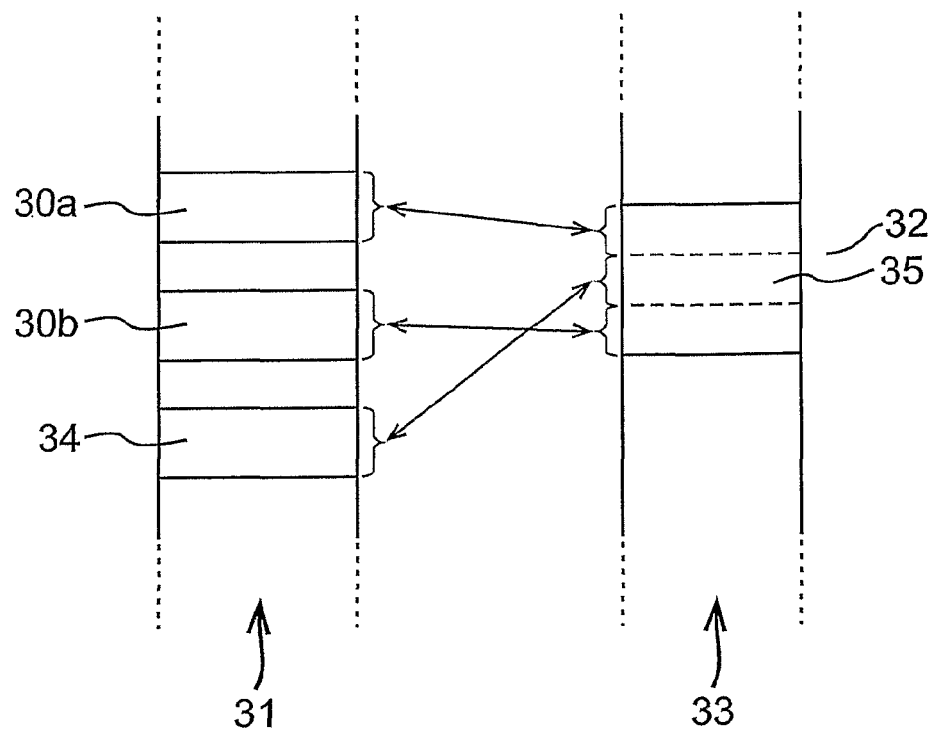

FIG. 12a shows an initial situation, before reallocation of buffers. In FIG. 12a a buffer 30 in memory space 31 is mapped on to an aperture 32 in memory space 33. Suppose it is desired to transfer a block of data at a location indicated by shading at 34 in memory 31 to a location 35 in memory 33. This could be done by copying that data into buffer 30. Alternatively, it could be done by reallocating the beers as shown in FIG. 12b. In FIG. 12b the buffers in memory space 31 have been reassigned so that the aperture 32 excluding space 35 maps on to the same parts of memory 31 as before, but space 35 now maps on to a buffer at location 34. This involves mapping aperture 32 on to three separate buffers 30a, 30b and 34 in memory space 31.

The buffer tables are valuable when used in a non-memory-mapped system (i.e. one in which local memory and remote memory are not mapped on to each other via apertures).

First, the buffer tables can be used to allow data to be transmitted without being copied from one memory location to another to allow transmission to take place. If data that is to be transmitted is stored at a set of contiguous locations in memory then instead of copying that data to the region of memory that is occupied by a pre-existing buffer table, one or more buffer tables can be defined that encompass the locations where the data is currently stored. Then the NIC can be commanded to transmit the data from those buffer tables. This makes the transmission of data more efficient.

Second, buffer tables are useful when data is received in the form of packets of a data length greater than the page size of the system that is in use. Usually, contiguous memory must be allocated to the receiving process in order for such packets to be written to memory. However, such packets can be written to two or more consecutive buffer tables, avoiding the need for the receiving process to be allocated contiguous blocks of memory larger than the page size. This is especially useful in situations when the receiver might not know in advance that such large packets will be received.

Third, buffer tables are useful for permissions validation on transmission of data. When a buffer table is allocated, the NIC can store a record of which process, application or thread that buffer table is allocated to. Then when the NIC receives an instruction to transmit from that buffer table it can verify that the instruction has come from the same entity as that to which the table is allocated. Since the buffer table was set up by the driver, rather than the application, it can be trusted. The identity of the process, application or thread can be identified from, for instance, the DMA queue that it uses to command transmission. In contrast, if a NIC is commanded to transmit data from a memory region that has not previously been defined to the NIC the NIC cannot check that the process commanding the transmission is authorised to access that region.

On DMA transmission a command can be sent to the NIC to transmit data of a certain length starting from a certain location in a buffer. If that length would go beyond the extend of the buffer then the NIC could ignore that subsequent data. However, instead it preferably continues from the next buffer in sequence that is allocated to the same process, thread or application as the buffer in which the start point is located. In that way the DMA command can be simplified and blocks of data greater than the buffer size can readily be transmitted in single packets. Two routes can be used to transfer the data in the reassigned buffer(s) to the destination. After the reallocation has been made the process responsible for the reallocation can issue a command to cause data from the newly assigned buffer (34 in FIG. 12a) to be transmitted to the remote data processor. Alternatively, the device driver could be arranged to automatically synchronise the aperture after a reassignment has been made, with one end of the aperture taking priority so that its data overwrites that at the corresponding locations at the other end of the mapping.

The present invention can be implemented in data processing systems such as personal computers and servers, and also in other equipment that need to transmit and/or receive data such as dedicated network appliances and multimedia terminals.

The techniques described above are not limited to use with network interfaces. For example, the above technique of reassigning buffers using a buffer table could be used to facilitate transferring data to other devices such as video or sound cards.

The tables could be stored in the same or in different physical memory as each other and as other user-level data in the system. One or more, of the tables could be held in physical memory on the network interface hardware.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section D

Data Transfer

This invention relates to a system suitable for use in passing data over a network or other data channel.

When data is to be transferred between two devices over a network, each of the devices must have a suitable network interface to allow them to communicate across the channel. The devices and their network interfaces use a protocol to form the data that is transmitted over the channel, so that it can be decoded at the receiver. The data channel may be considered to be or to form part of a network, and additional devices may be connected to the network.

The Ethernet system is used for many networking applications. Gigabit Ethernet is a high-speed version of the Ethernet protocol, which is especially suitable for links that require a large amount of bandwidth, such as links between servers or between data processors in the same or different enclosures. Devices that are to communicate over the Ethernet system are equipped with network interfaces that are capable of supporting the physical and logical requirements of the Ethernet system. The physical hardware component of network interfaces are referred to as network interface cards (NICs), although they need not be in the form of cards: for instance they could be in the form of integrated circuits (ICs) and connectors fitted directly on to a motherboard.

Where data is to be transferred between cooperating processors in a network, it is common to implement a memory-mapped system. In a memory-mapped system communication between the applications is achieved by virtue of a portion of one application's virtual address space being mapped over the network on to another application or on to a region of real memory. The "holes" in the address space which form the mapping are termed apertures.

When data is being transmitted from an aperture of one data processing system to an aperture of another data processing system it is highly preferable to check that the write of data is secure. It would therefore be desirable for the systems to cooperate to enable checking of the integrity of the write operation.

According to one aspect of the present invention there is provided a data processing system comprising: a data processor for executing instructions to support two or more processes; memory for storing data; an interface whereby the data processor can transmit data to a remote receiver; and a configuration store storing definitions of a plurality of areas in the memory, and for each one an identification of a process associated therewith; the interface being responsive to receiving an instruction of a predetermined form from a process supported by the data processor specifying data in one of the areas to read the specified data from the area and transmit that data to a remote receiver together with the identification of a process stored for that area in the configuration store.

According to another aspect of the present invention there is provided8. A data processing system comprising: a data processor for executing instructions to support two or more processes; memory for storing data; an interface whereby the data processor can receive data from a remote receiver; and a configuration store storing definitions of a plurality of areas in the memory, and for each one an identification of a process on a remote receiver associated therewith; the interface being responsive to receiving from the remote receiver data directed to one of the areas together with an identification of a process to check whether that identified process matches the identification of a process stored for that one of the areas in the configuration store and only if it does match to write that data to that configuration store.

Preferably the configuration store is local to the interface.

Preferably the data processor implements a plurality of queues for communication between the processes and the interface, each queue being associated with a respective process, and the interface is arranged to identify which process an instruction is from by the queue on which it has received the instruction.

Preferably the interface is arranged to read the data from the area by direct memory access.

Preferably the interface is a network interface and is arranged to transmit the data to the receiver by means of a network protocol.

Preferably the network protocol is TCP/IP.

Preferably the interface is arranged to transmit the data over Ethernet.

In the case of data reception references to transmitting and reading can be substituted for references to receiving and writing.

The present invention will now be described by way of example with reference to the accompanying drawings.

Figure 13:
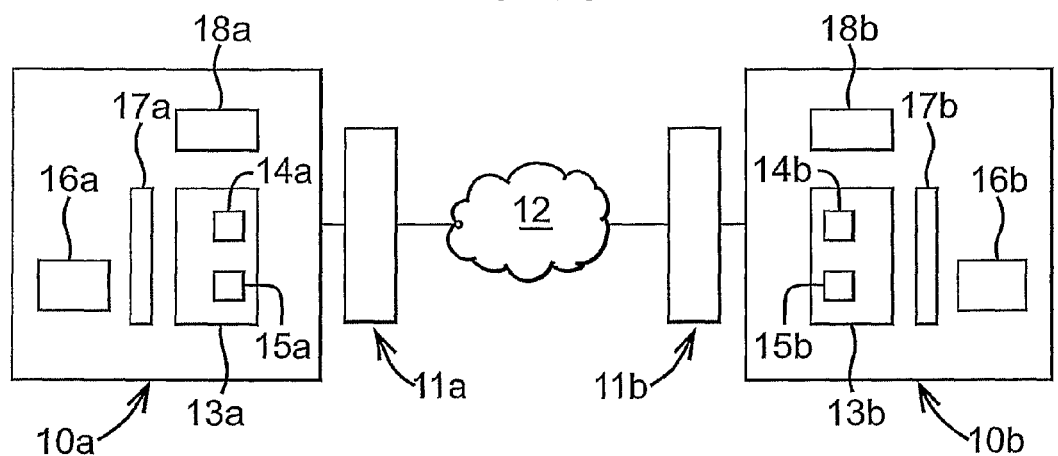
FIG. 13 shows schematically the architecture of a networked system.
Figure 14:
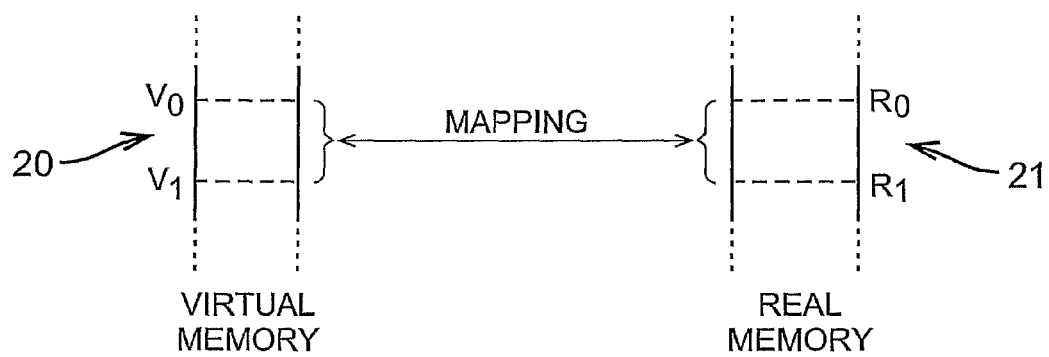
FIG. 14 illustrates mapping apertures.

In the drawings:

FIG. 13 shows schematically the architecture of a networked system;

FIG. 14 illustrates mapping apertures;

FIG. 15 shows examples of aperture and buffer tables;

FIG. 16 shows an example of a queue table; and

FIG. 17 illustrates reassignment of buffers.

FIG. 13 shows schematically the architecture of a networked system. The system comprises two data processors 10a, 10b (such as personal computers or servers), each of which has a network interface 11a, 11b (such as NIC). The network interfaces are linked together over a data network 12. The data network could be an Ethernet network (e.g. using Gigabit Ethernet) or could employ any other suitable protocols. Each data processor has an operating system 13a, 13b which includes a kernel 14a, 14b and a device driver 15a, 15b for controlling communications between the data processor and its network interface. The operating system supports applications or processes 16a, 16b running on the data processor. A transport library 17a, 17b provides the applications/processes with routines that can be used for controlling communications over the network, and supervises communications between the applications/processes and the operating system. Each data processor has a memory 18a, 18b.

The network interfaces, the device drivers and the transport library cooperate to allow applications to map blocks of virtual memory of one of the data processors on to physical memory of the other of the data processors. The general principles behind such operation are described in WO 2004/025477 and WO2004/080005, which should be read in conjunction with the present application. When such a mapping has been established, one of the data processors can write to or read from a part of the area of virtual memory and this will have the effect of writing to or reading from the corresponding part of the area of physical memory. Such an arrangement is illustrated in FIG. 14, where a region of virtual memory 20 in a first data processing system, running from virtual memory location $V_0$ to virtual memory location $V_1$, is mapped on to a region of real memory 21 in another data processing system, running from real memory location $R_0$ to real memory location $R_1$. If the first data processing system reads from or writes to a location $V_n$ in the range from $V_0$ to $V_1$ that has the effect of reading from or writing to the corresponding location $R_n$ in the range from $R_0$ to $R_1$.

The operation of the system to support these mappings will now be described in more detail.

As is normal, the operating system of each data processor allocates a unique identifying number to each process running on that data processor. These numbers are used to secure the operation of the system, ensuring that data of one process is not read or altered by another process. The means of achieving this in the context of memory mappings will be discussed below.

If a process running on one data processor wishes to send data or read data using a mapping on to memory of the other data processor it first establishes the mapping, defining the environment in which that transfer can take place. The establishment of the mapping involves setting up entries in tables held by the data processors. Each data processor holds two tables: an aperture table and a buffer table, which are managed by its device driver 15. Together the tables define the mappings that are currently established. Examples of such tables are shown in FIG. 15.

The aperture table includes the following data for each mapping:

1. Local aperture index. This is an identifying number for the local aperture, which is allocated by the local device driver to be unique for the local data processor.
2. Local ownership. This indicates the identity of the process running on the local data processor that is entitled to access the mapping. This will typically be the process that created the mapping, but the right to access the mapping could be passed from one process to another provided preferably that that handover is performed in an authenticated manner (i.e. with the authorization of the process passing the right) so as to maintain security.
3. Remote aperture index: This is an identifying number for the aperture, which is allocated by the remote device driver to be unique for the remote data processor, and is transmitted by the remote data processor to the local data processor when the mapping is established.
4. Local buffer index(es). This indicates which of the buffers in the local buffer table are associated with the aperture. It should be noted that more than one local buffer can be associated with an aperture. Where more than one buffer is associated with an aperture, the associated buffers are listed in the entry in the aperture table strictly in the order in which they map on to the memory space represented by the aperture. Instead of explicitly listing all the buffers in an aperture a more compact encoding scheme can be used by indicating a starting buffer and a size, it being implied that the aperture is composed of the indicated buffer and subsequent buffers in order up to the total indicated size.
5. Sequence number. This indicates the serial number of the next packet to be processed locally for the aperture.

The buffer table maps which of the processes is allocated to each buffer and holds the following information for each buffer:

1. Buffer index. This is an identifying number for the buffer, which is unique for the local data processor. The buffer is identified by this number in the buffer table index field of the local aperture table.
2. Ownership. This indicates which local process owns the buffer.
3. Physical memory address. The buffer occupies a contiguous block of physical memory, and this number indicates where that block starts.
4. Length. This indicates the length of the buffer in memory.

The size of each buffer table entry is most preferably chosen to match the page size of the host system: typically 4 kb. In that way a contiguous region of the application's virtual address space which is mapped onto a non-contiguous region of physical memory can be represented by a sequence of buffer table entries.

In the example of FIG. 15, local aperture 1 is owned by process 8 and maps on to remote aperture number 5. The local physical memory corresponding to that aperture consists of xFFF bytes starting from physical address xB000. Local aperture number 3 is owned by process number 12 and maps on to remote aperture number 1. The local physical memory corresponding to that aperture consists of xA10 bytes starting at xD000 followed by x8FF bytes starting at xA000. Thus a single aperture can be mapped on to two or more discontiguous blocks of physical memory. This provides great flexibility in the transfer of data. For example, if a contiguous block of data at the transmitting end has to be transmitted to discontiguous locations at the receiver, instead of the transmitter having to issue multiple transmit instructions to transmit each block separately, the aperture can be mapped on to discontiguous blocks at the receiver and then a single transmit instruction for the whole block of data can be issued by the transmitting process. One specific example of a situation in which this would be useful is when cooperating applications on the data processors have differently arranged memory allocations.

The entries in the tables are set up when mappings are established. The buffers allocated to an aperture can be reassigned at one end or the other without re-establishing the mapping.

The aperture and buffer tables (indicated at 19a, 19b in FIG. 13) are held in memory 18 local to the device driver that manages them. The tables are stored in a region of the memory that cannot be accessed directly by processes running on the local data processor. This is preferably achieved by using built-in access control capabilities of the operating system. The operating system is preferably capable of allocating areas of the memory 18 to processes running on the data processing system, and preventing other processes running on the same system from accessing that allocated memory. In this way direct access to the area of memory that stores the tables is preferably reserved to the local device driver 15a, 15b (although since the operating system is in overall control it can also access the areas if required).

It will be appreciated that the tables can be set up in any suitable way, but the following is an example of a process for setting up a mapping between a process (Pa) running on a first data processor (DPa) to a process (Pb) running on a second data processor (DPb).

1. Process Pa initiates the establishment of the mapping by signalling its local device driver with details of the locations in local physical memory of the buffer(s) that are to be used for the mapping. The device driver checks that those locations are owned by Pa. If they are it sets up a row in the local buffer table for each of those buffers, and returns to the application the index allocated to each buffer. The device driver also sets up a transmit queue in local memory that can be used by the process for storing instructions defining the data it wants to transmit. The device driver informs the network interface belonging to DPa of the location of the queue and the identity of the process that owns the queue. That information is stored in a table in memory on the network interface. An example of such a table is illustrated in FIG. 16. It should be noted that since the device driver (as part of the operating system) is trusted, the ownership of the transmit queue by the appropriate process, and the ownership data passed to the network interface in step 2 below can be trusted.

2. Process Pa signals the device driver with the buffer index(es) of the buffers that it wants to map over the aperture, and details of the remote aperture on to which it want to map those buffers. The device driver passes that data to the local network interface, which signals with the remote aperture to establish the mapping. To allow this to be done, the process provides the following information: network address (e.g. MAC address) of the data processor providing the other side of the aperture (DPb), initial sequence number for serially numbering packets sent over the link, index number of the aperture on DPb, length of the aperture, ownership data identifying the process on DPa that is to use the aperture. The network interface on DPa then contacts DPb via the supplied network address to attempt to set up the mapping. DPb checks that it has an aperture with the supplied index number and that its length matches that supplied by DPa. DPb also receives data identifying the process initiating the connection and checks with the local process identified in the ownership bits for the local aperture that it will permit that process on DPa to access the aperture. If that is permitted the network interface of DPb signals its device driver to set up the appropriate row in its aperture table by storing the initial sequence number, remote aperture and remote ownership against that aperture. The network interface of DPb then returns a success message to the network interface of DPa. The network interface of DPa informs its device driver, which sets up its aperture table by storing the initial sequence number, remote aperture and remote ownership, and signals the initiating process that the aperture has been-set up successfully.

In order for process Pa to transmit data to DPa using the mapping, it can either use PIO (programmed input-output) or DMA (direct memory access). In PIO the CPU (central processing unit) of DPa executes commands to retrieve data from its local memory and supplies that data to the local network interface for transmission. The network interface receives the data pushed to it by the CPU and transmits it in due course. In DMA the local network interface accesses the local memory directly to pull data from the memory for transmission. To achieve this the CPU transmits an instruction to the network interface which identifies an area in memory that contains data to be transmitted. In due course the network interface actions that instruction by reading the data directly from the memory and transmitting it. It then returns a message to the CPU to indicate that the transmission is complete. PIO is advantageous for the transmission of small amounts of data, since it involves simpler communication between the CPU and the NIC. DMA is advantageous for transmission of larger amounts of data since it reduces the load on the CPU that would otherwise be involved in passing the data to the NIC. It should be noted that both these routes can be available simultaneously to a process for transmissions over a single mapping. This means that when a process wants to write to a remote location over the network it can select the most efficient means in each situation: for instance selecting PIO for transmissions of short blocks of data, and selecting DMA for transmission of longer blocks of data. It is convenient to arrange the system so that for some or all apertures not all parts of those apertures are accessible by PIO. The rest of the aperture can then be accessed by the NIC only via DMA. This economises on IO bus space since bus space only needs to be allocated for those parts that are accessible by PIO. A preferable arrangement is for all apertures greater than a predetermined size to be treated in this way. A preferably arrangement is for apertures that are being treated in this way to have only their first page-sized region accessible by PIO.

For PIO, process Pa causes the processor of data processor DPa to pass the data for transmission from local memory to the network interface hardware. Such transferring can be implemented using conventional PIO and will not be described in more detail here. However, on receiving data by PIO the network interface makes certain checks before sending the data to the remote data processor DPb. The data is sent by the process together with an indication of the aperture to which it is to be applied and the offset in that aperture at which it is to be applied. Using that data the network interface checks:

a. that the process that has sent the data is identified in the aperture table as owning the aperture to which the data is to be applied;

b. that the length of the data is not so great as to overrun the end of the aperture starting from the offset point in the aperture at which it is to be written.

If those checks are satisfied then it transmits the data to the remote terminal. At the remote terminal the remote NIC looks up the address to issue on its IO bus in order to store the received data from its buffer table.

For DMA the process adds a transmit command to its transmit queue. The transmit command specifies the intended destination of the data and could also include the data itself or could include a pointer to the data in memory (e.g. if DMA (direct memory access) by the network interface is to be used to transfer the data to the interface). Here the pointer would refer to a buffer table entry and offset, and the transmitter's DMA logic can check that the process sending the transmit instruction "owns" the buffer table entry to which the instruction refers. The latter option provides an efficient way for the process to transmit large quantities of data that is stored contiguously in physical memory. An example of the transmission and reception process will now be described.

1. Pa adds a transmit command to its transmit queue. The transmit command specifies:
   a. Destination device. The identity of the network device (DPb) to which the data is to be transmitted.
   b. Destination aperture index. The index of the aperture on DPb to which the data is to be applied.
   c. Destination offset. The offset within that aperture at which the data is to be applied.
   d. Source buffer. The index of the local buffer from which the data is to be transmitted.
   e. Source offset. The offset within that buffer from which the data is to be taken.
   f. Length. The length of data to be take from that offset point.

2. The command is taken from the transmit queue by the network interface of DPa. It could poll the queue periodically, or could be signalled with an interrupt when there is data on the queue. The network interface of DPa validates the command by checking the following data using the local buffer table:
   a. that the ownership data for the specified buffer (as stored in the local buffer table) indicate that the buffer is owned by the same process as owns the transmit queue from which the command was taken;
   b. that the source offset point lies within the buffer (i.e. source offset is not greater than the length of the buffer); and
   c. that the full length of the data to be transmitted lies within the buffer (i.e. source offset plus length is not greater than the length of the buffer.
   If these tests are satisfied then at this point the network interface can start retrieving data from the buffer and preparing it for transmission.

3. The network interface checks that the ownership data for the specified aperture as stored in the local aperture table indicate that the aperture is owned by the same process as owns the transmit queue from which the command was taken.

4. If all the tests are satisfied the network interface forms one or more packets to transmit the data to the destination. In addition to the usual packet contents each packet includes fields indicating:
   a. the identity of the process that owns the transmit queue from which the command was taken;
   b. the identity of the remote aperture to which the data is to be applied; and
   c. a sequence number specific to the aperture mapping, allotted in numerical order and incremented in the local aperture table after each packet has been transmitted.

The packet may also indicate the location in the aperture at which the data is to be applied. Alternatively the first packet in the set indicates the offset and the length of data to be sent and the payloads of the subsequent packets in the set are applied consecutively to the remote aperture following on from the payload of the first packet; and each packet in the set has a field indicating which set it belongs to.

5. At the receiver. DPb the network interface looks up using its local aperture and buffer tables the physical address of the destination offset point. This might not lie in the first buffer allocated to the aperture if the destination offset is greater than the length of the first allocated buffer. Then each packet is processed in order of its sequence number, irrespective of the order in which the packets arrived. If a packet is lost then the subsequent packets in the set are held for a period of time pending retransmission of the lost packet. For each packet the following checks are made:
   a. that if the data from the packet were written to its destination point in the aperture it would not extend beyond the end of the aperture and/or the buffers allocated to it;
   b. that the ownership data in the packet matches the remote ownership data for the mapping.

Those checks are intended to ensure that the data from the packet will not be written into memory at a location that is not authorised: they verify that the ownership data in question is correct for the whole of the region where the data is to be written. If those checks are satisfied then the network interface of DPb writes the data to the memory at the locations as determined from the tables.

The buffer table could be split into two: one for use in resolving incoming data, and one for use in validating the security of outgoing data.

On transmission of data by DMA or PIO the transmitting NIC can add to the transmitted packet an indication of the process (e.g. thread or application) that has caused the data to be transmitted. That can then be verified at the receiver against data in its aperture table to check that the transmitting process corresponds to the receiving aperture.

If there is a block of data in the memory which a process wants to transmit to a remote data processor then the process could copy that data into a previously allocated buffer and then issue a command to transmit that data from the buffer. However, if the block of data is large then it may be more efficient to reallocate the process's buffer(s) so that one of the buffers encompasses the block of data that is to be transmitted. This involves an overhead of reallocating the buffers by causing the device driver to remap the relevant rows of the buffer table and/or the aperture table, but it omits the step of copying the data from one part of memory to another. The use of separate buffer and aperture tables allows this to be done in an efficient way, since the other parts of the aperture can be left mapped on to the same parts of memory as before the reallocation. On reallocation of the buffers for an active aperture the data is synchronised by the network interface under the control of the device driver between the two ends. This is illustrated in FIG. 17.

Figure 17A:
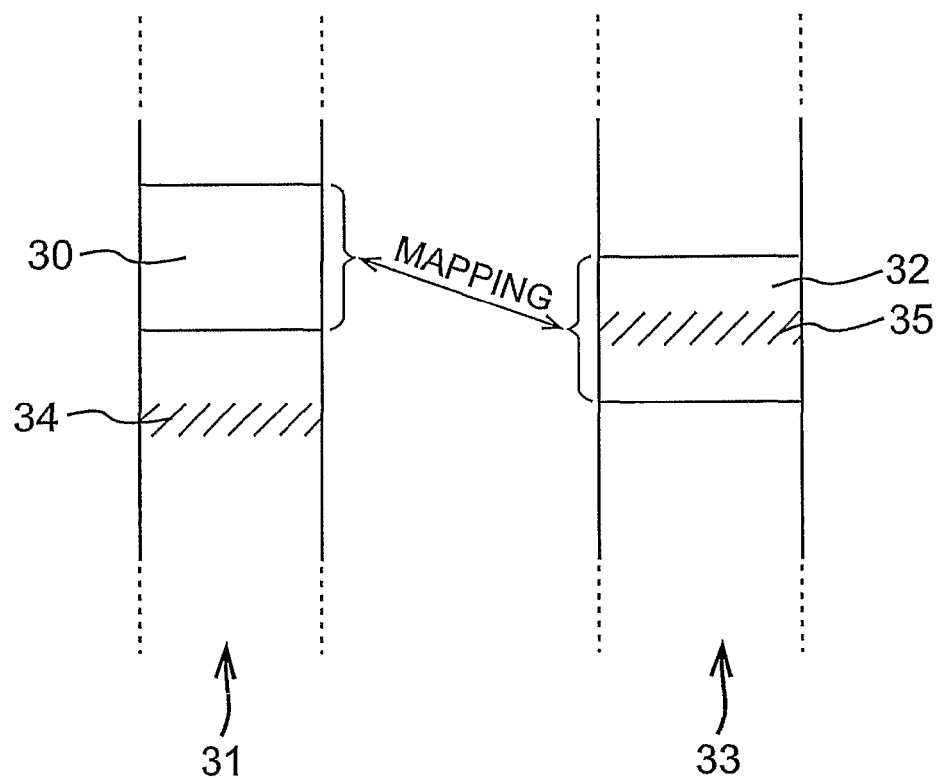
FIGS. 17a and 17b illustrate reassignment of buffers.
Figure 17B:
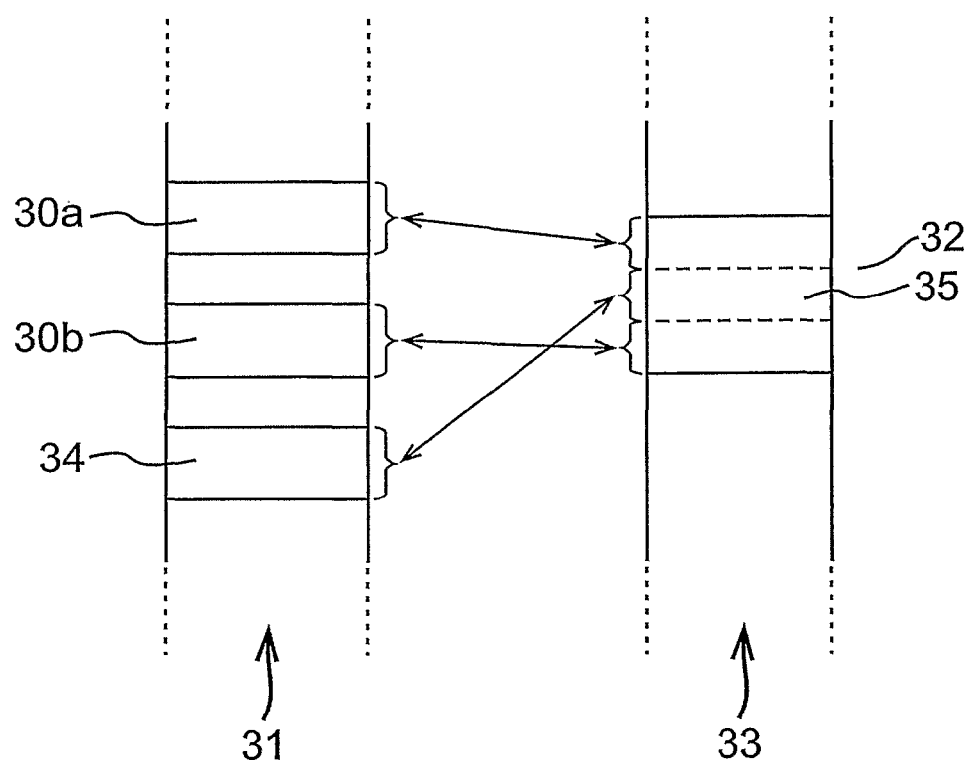

FIG. 17a shows an initial situation, before reallocation of buffers. In FIG. 17a a buffer 30 in memory space 31 is mapped on to an aperture 32 in memory space 33. Suppose it is desired to transfer a block of data at a location indicated by shading at 34 in memory 31 to a location 35 in memory 33. This could be done by copying that data into buffer 30. Alternatively, it could be done by reallocating the buffers as shown in FIG. 17b. In FIG. 17b the buffers in memory space 31 have been reassigned so that the aperture 32 excluding space 35 maps on to the same parts of memory 31 as before, but space 35 now maps on to a buffer at location 34. This involves mapping aperture 32 on to three separate buffers 30a, 30b and 34 in memory space 31.

The buffer tables are valuable when used in a non-memory-mapped system (i.e. one in which local memory and remote memory are not mapped on to each other via apertures).

First, the buffer tables can be used to allow data to be transmitted without being copied from one memory location to another to allow transmission to take place. If data that is to be transmitted is stored at a set of contiguous locations in memory then instead of copying that data to the region of memory that is occupied by a pre-existing buffer table, one or more buffer tables can be defined that encompass the locations where the data is currently stored. Then the NIC can be commanded to transmit the data from those buffer tables. This makes the transmission of data more efficient.

Second, buffer tables are useful when data is received in the form of packets of a data length greater than the page size of the system that is in use. Usually, contiguous memory must be allocated to the receiving process in order for such packets to be written to memory. However, such packets can be written to two or more consecutive buffer tables, avoiding the need for the receiving process to be allocated contiguous blocks of memory larger than the page size. This is especially useful in situations when the receiver might not know in advance that such large packets will be received.

Third, buffer tables are useful for permissions validation on transmission of data. When a buffer table is allocated, the NIC can store a record of which process, application or thread that buffer table is allocated to. Then when the NIC receives an instruction to transmit from that buffer table it can verify that the instruction has come from the same entity as that to which the table is allocated. Since the buffer table was set up by the driver, rather than the application, it can be trusted. The identity of the process, application or thread can be identified from, for instance, the DMA queue that it uses to command transmission. In contrast, if a NIC is commanded to transmit data from a memory region that has not previously been defined to the NIC the NIC cannot check that the process commanding the transmission is authorised to access that region.

On DMA transmission a command can be sent to the NIC to transmit data of a certain length starting from a certain location in a buffer. If that length would og beyond the extend of the buffer then the NIC could ignore that subsequent data. However, instead it preferably continues from the next buffer in sequence that is allocated to the same process, thread or application as the buffer in which the start point is located. In that way the DMA command can be simplified and blocks of data greater than the buffer size can readily be transmitted in single packets. Two routes can be used to transfer the data in the reassigned buffer(s) to the destination. After the reallocation has been made the process responsible for the reallocation can issue a command to cause data from the newly assigned buffer (34 in FIG. 17a) to be transmitted to the remote data processor. Alternatively, the device driver could be arranged to automatically synchronise the aperture after a reassignment has been made, with one end of the aperture taking priority so that its data overwrites that at the corresponding locations at the other end of the mapping.

The present invention can be implemented in data processing systems such as personal computers and servers, and also in other equipment that need to transmit and/or receive data such as dedicated network appliances and multimedia terminals.

The techniques described above are not limited to use with network interfaces. For example, the above technique of reassigning buffers using a buffer table could be used to facilitate transferring data to other devices such as video or sound cards.

The tables could be stored in the same or in different physical memory as each other and as other user-level data in the system. One or more of the tables could be held in physical memory on the network interface hardware.

The applicant hereby discloses in isolation each individual feature described herein and any combination of two or more such features, to the extent that such features or combinations are capable of being carried out based on the present specification as a whole in the light of the common general, knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section E
Signal Handling

Figure 18:
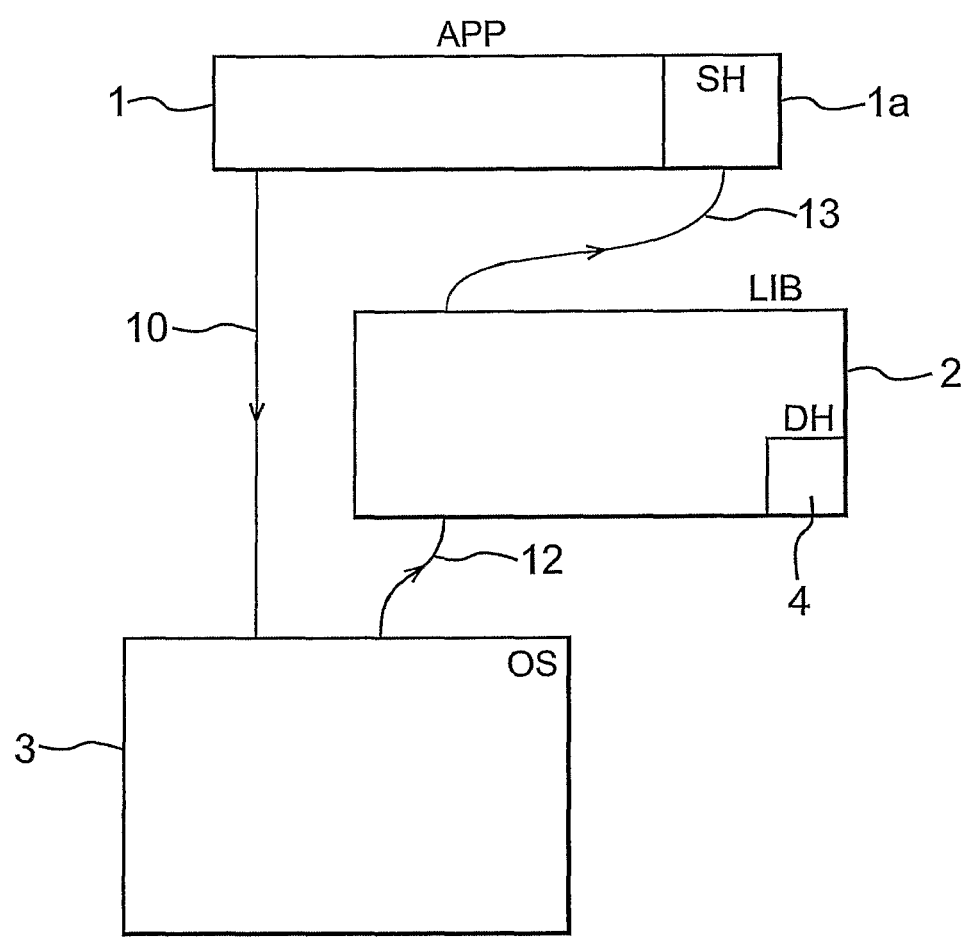
FIG. 18 shows a data processing system.

The present invention relates to a signal handling arrangement for a data processing system, and in particular to delaying signals within a data processing system under certain system conditions:

FIG. 18 shows components of a data processing system. The system comprises an application 1, an operating system 3 and a library 2 in communication with each other. The data processing system is suitable for connection to other data processing systems by means of a network. A network protocol such as transmission control protocol (TCP), or any other Ethernet protocols including User Datagram Protocol (UDP), Internet Control Message Protocol (ICMP) or Real-Time Transport Protocol (RTP) could be used. Alternatively, non-Ethernet protocols could be used.

Certain management functions of a computing device are conventionally managed entirely by the operating system. These functions typically, include basic control of hardware (e.g. networking hardware) attached to the device. When these functions are performed by the operating system the state of the computing device's interface with the hardware is managed by and is directly accessible to the operating system. A further typical function of the operating system is processing data that is either received at or to be transmitted from the device. Such data typically requires processing in accordance with a data transfer protocol, such as TCP. An alternative architecture involves performing at user-level certain functions which would conventionally be performed by the operating system. Such a user-level architecture is described in the applicant's copending PCT applications WO 2004/079981 and WO 2005/104475. In a user-level architecture at least some of the functions usually performed by the operating system are performed by code running at user level, and at least some of the state of the function can be stored by the user-level code. This can cause difficulties when an application performs an operation that requires the operating system to interact with or have knowledge of that state.

Many operating system kernels (including Linux and other UNIX variants) can be configured to act in accordance with instructions from an application to automatically pass asynchronous signals to the application on the occurrence of certain events. The signals thus represent notifications to the application of such events. For example, an application may wish to receive regular signals, for example every 1 second, to update a user display, or it may wish to receive signals each time a specified event occurs to update the user display. The requirements of an application can be registered with the operating system so that the operating system becomes configured to send the signals as requested. The registration process generally involves an instruction being sent from the application to the operating system, followed by an acknowledgement from the operating system to the application to confirm that the request has been registered. In a UNIX system the request/acknowledgement handshake may take the form of a signal( ) system call.

Once the registration has been performed, the operating system will cause a corresponding routine to be executed each time the application receives a signal from the operating system. Such a routine is generally known as a signal handler. Continuing the above example, when a signal is received at the application the signal handler routine will access the necessary resource (such as a lock on shared memory in the operating system) so that the user display can be updated.

Other types of signalling handling routines can be registered with the operating system by an application, such as routines which perform read and write operations when executed. An application may register with the operating system to receive signals from the operating system each time new data arrives for the application over a data network, and the application could be configured so that receipt of such signals invokes a routine for reading the new data.

Receipt of an asynchronous signal at the application can cause operations that are being carried out by the application to be interrupted. The signal can automatically cause execution of the signal handler such that other operations in progress will temporarily be halted until the signal handler has been successfully executed.

A problem can arise with the use of asynchronous signal handlers in a system having a user-level architecture as described above. The asynchronous signals may arrive at the application at a time when the user-level library such as a transport library is accessing a shared resource, such as shared memory requiring a lock for access, on behalf of the application. In this case, a deadlock can occur because the receipt of the asynchronous signal triggers execution of the associated signal handler routine, which could involve accessing the same resource. However, since the library is controlling the access to the resource, the application may not be aware that the resource is already in use. For example, the library could be reading data from shared memory in response to an instruction from the application, and would thus have a lock on the shared memory. If the application had previously registered a signal handler with the operating system for triggering read operations, then receipt of an asynchronous signal at this time would cause the signal handler to attempt to gain access to the lock by means of an instruction to the library. The processing being carried out by the library would be interrupted as a result of the arrival of the signal, causing the library to retain the lock until execution of the signal handler is completed. However, the signal handler would be unable to execute until the library released the lock; operation of the signal handler and the library would therefore stall.

In order to limit the occurrence of such deadlocks, the use of signal handlers tends to be restricted for triggering only certain operations which would not cause resource conflicts such as that described above. The signal handler can be written to be reentrant in order to deal with the possibility of receiving signals from the operating system at unpredictable times, and the signal handler can also be written such that it can call only reentrant code.

However, this can lead to a situation in which the use of asynchronous signal handlers is severely limited, which may be inconvenient. It can be particularly inconvenient for libraries which can be linked against arbitrary applications, since it effectively means that most libraries are unable to make use of asynchronous signals.

Also, in general there are some operations which are normally disallowed by a signal handler in order to prevent such deadlock issues. If a library shared between applications changes the behaviour of a previously allowed operation into a disallowed operation then a previously functional signal handler could be then be caused to deadlock. Because such signal handlers are generally part of an application and not modifiable by the application there is a need to prevent deadlock in such circumstances.

It is therefore desirable to provide a means for handling signals in data processing systems which overcomes the above disadvantages.

According to a first aspect of the present invention there is provided a signal handling arrangement for a data processing system that has an application, a first routine, and an operating system capable of being configured to automatically send signals to routines external to the operating system for initiating execution of the said routines, wherein the first routine is such that execution thereof requires access to a resource, the signal handling arrangement being arranged to: determine whether the resource is available; and if such determination is negative, delay signals from the operating system for initiating execution of the first routine.

Embodiments of the invention can thus defer the execution of signal handlers until a non-reentrant routine has been completed.

The signals from the operating system for initiating execution of the first routine could be asynchronous.

The said determining preferably comprises determining whether the resource is in use by an application.

The operating system could be capable of being configured by means of instructions to send signals for initiating execution of the first routine in response to conditions specified in the instructions. The signal handling arrangement could be further arranged to intercept such instructions sent from an application, modify the instructions, and pass the modified instructions to the operating system so as to configure the operating system to send to the signal handling arrangement signals for initiating execution of the first routine in response to the conditions specified in the instructions.

The signal handling arrangement could also be arranged to, if the determination is negative, signal the first routine to cause execution thereof when the resource becomes available.

The signal handling arrangement is preferably arranged to maintain a memory location for indicating the availability of the resource, and the said determining preferably comprises accessing the memory location.

The signal handling arrangement could be further arranged to, when a second routine begins, the second routine being such that execution thereof requires access to the resource, store in the memory location an indicator of a position in a stack indicating the address to which processing control is to return when the second routine is completed. The signal handling arrangement could be arranged to, when the second routine begins, store at the said position in the stack an indicator of an address of a routine for signalling the first routine to initiate execution thereof, whereby the first routine may be automatically signalled to initiate execution thereof in response to completion of the second routine.

The signal handling arrangement may be further arranged to, in response to completion of the second routine, store in the memory location an indication that the resource is available.

The data processing system preferably implements a user-level networking stack. The data processing system also preferably comprises a library. The user-level stack may be implemented by means of the library.

The signal handling arrangement cold be implemented at least partly by the library, and/or at least partly by the application.

The resource may be non-reentrant.

The application could include the first routine.

According to a second aspect of the present invention there is provided a data processing system having an application, a first routine, an operating system, and a signal handling arrangement, wherein the operating system if capable of being configured to automatically send signals to routines external to the operating system for initiating execution of the said routines, and wherein the first routine is such that execution thereof requires access to a resource, the signal handling arrangement being arranged to: determine whether the resource is available; and if such determination is negative, delay signals from the operating system for initiating execution of the first routine.

According to a third aspect of the present invention there is provided a data carrier carrying a signal handling arrangement for a data processing system that has an application, a first routine, and an operating system capable of being configured to automatically send signals to routines external to the operating system for initiating execution of the said routines, wherein the first routine is such that execution thereof requires access to a resource, the signal handling arrangement being arranged to: determine whether the resource is available; and if such determination is negative, delay signals from the operating system for initiating execution of the first routine.

Figure 19A:
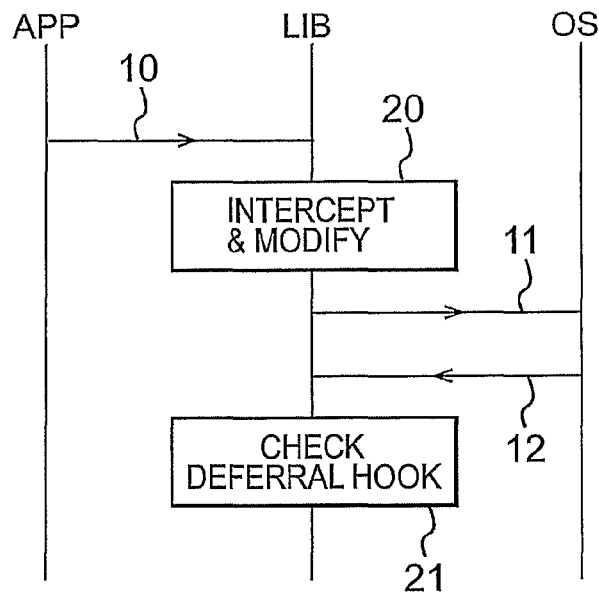
FIGS. 19a and 19b show schematically a series of events in a data processing system.
Figure 19B:
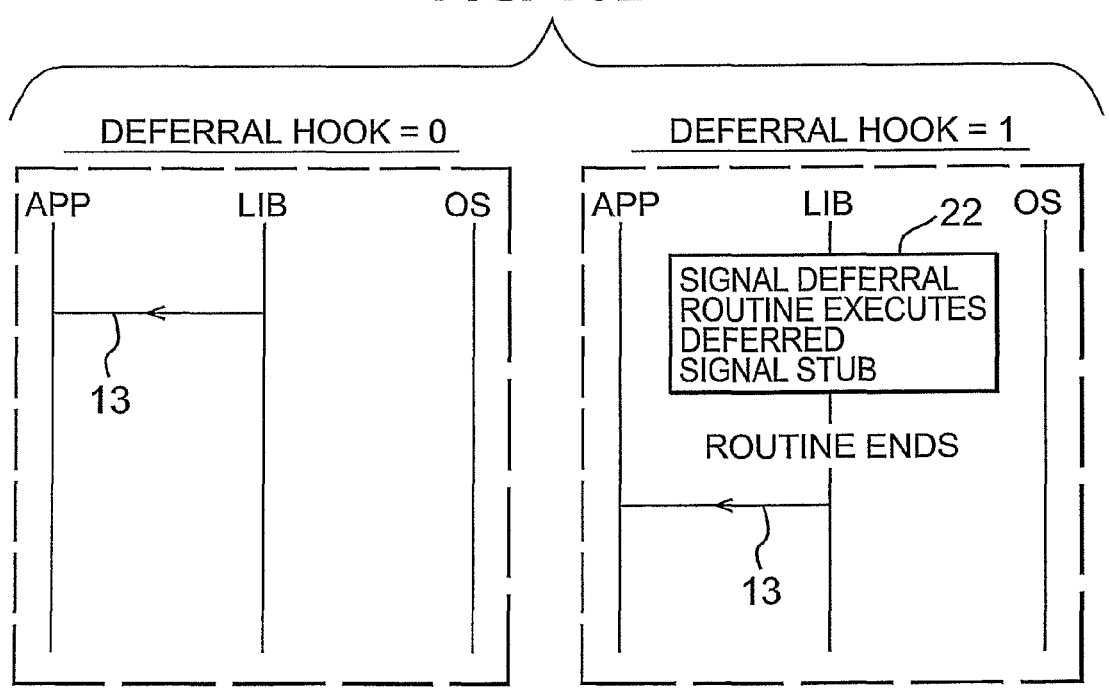

The present invention will now be described by way of example with reference to the accompanying drawings, in which:

FIG. 18 shows a data processing system;

FIG. 19 shows schematically a series of events in a data processing system; and

Figure 20:
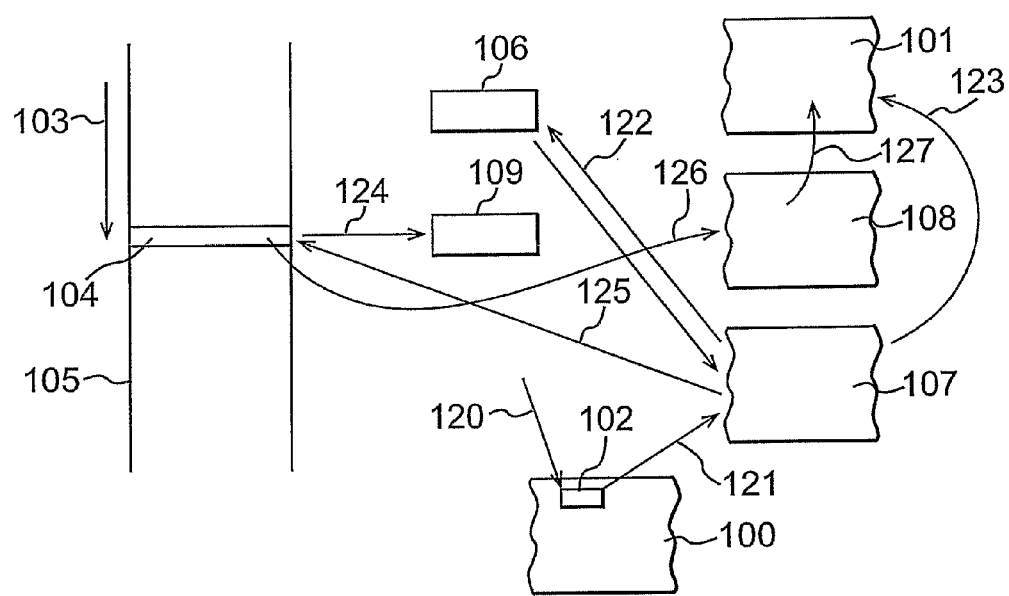
FIG. 20 is a detailed illustration of events for deferring execution of a signal handling routine.

FIG. 20 is a detailed illustration of events for deferring execution of a signal handling routine.

An exemplary delay mechanism in accordance with an embodiment of the present invention is illustrated in FIG. 18. First, an instruction 10 is sent from the application 1 to the operating system 3 to register at the operating system a signal handler 1a within the application, to which asynchronous signals are to be sent at certain time intervals defined in the instruction, or on the occurrence of events defined in the instruction. This instruction could then be acknowledged by the operating system.

FIG. 19 shows in more detail a series of events associated with the sending of an asynchronous signal in an embodiment of the invention. The instruction 10 from the application to the operating system is intercepted 20 by the library 2. The library may be configured to intercept all signals sent from the application, or it may be configured to recognise indicators, such as file descriptors, incorporated in signals sent from the application to identify those it wishes to capture. By intercepting the flow of signals between the application and the operating system the library is enabled to exert some control over the interaction between the application and the operating system. In the present example, the library modifies the intercepted instruction 10 so as to cause it to instruct the operating system to send asynchronous signals to the library itself, rather than to the application, at the specified instances. In this way, the library may prevent the automatic execution of the signal handler 1a in response to passing an asynchronous signal from the operating system and instead defer the execution of the signal handler until any potential resource conflict has been removed.

In the preferred embodiment, the modification 20 of the instruction includes causing a signal deferral routine 11 to be registered at the operating system instead of the signal handler 1a requested by the application. The signal deferral routine will then be executed when an asynchronous signal triggered by the instruction 11 is received at the library.

The library is configured to make a check, each time it receives an asynchronous signal 12, as to whether a routine is currently being executed which requires access to the same non-reentrant resource which would be required for execution of the signal handler. In other words, it checks whether a deadlock situation could arise if the signal handler were immediately executed. In the event that the resource is not available the signal 12 is delayed until the resource becomes available, and then passed to the signal handler 1a to trigger execution of the signal handler routine. The resource may be dedicated to the application 1, so that it is usable only by the library and the application itself.

A non-reentrant resource will generally be non-reentrant in the sense that the system cannot safely permit multiple threads to access the resource at once. For example, the resource could be a data store that stores a data value that needs to be read and whose value then needs to be relied upon during a subsequent operation. One example is where the resource is data that has been received or that represents data that has been received over a network. A process that is to utilise that data may need to be able to rely on the data not being utilised by another process. In general, the term non-reentrant resource may be applied to a resource that is treated such that it cannot be accessed simultaneously by more than one process or routine. A resource could be memory space, processing capacity, a network connection, or in general anything that may be required for a function to be performed in a data processing system. The term routine could be applied to any series of instructions within a data processing system.

A simple flag could be maintained to indicate the availability of the resource: for example, a bit set to 1 could indicate that the resource is in use while a 0 indicates that it is not in use. However, in the preferred embodiment, the library maintains a deferral hook 4 to show the availability of the resource. The deferral hook is a memory location, which could be in the operating system or in any other location, providing that it is accessible to the signal deferral routine so that when the signal deferral routine is called by the operating system by means of an asynchronous signal 12 it can access the deferral hook to determine the availability of the resource. The deferral hook is written to at the start and end of any routine which uses the required resource, to indicate whether or not the resource is in use.

When the resource is available, the deferral hook is set to zero; in this case, the asynchronous signal 12 received at the library will be passed immediately to the signal handler 1a. The signal handler will then execute as normal. However, when the resource is in use, the user-level stack is modified so as to cause a deferral routine. At the start of any routine requiring access to the resource, the deferral hook is set to contain a pointer to a position in the user-level stack. The address that was previously stored at that position (i.e. the return address for the currently executing routine) is moved to a new location, the "deferred return address", and is replaced by a pointer to another routine, the "deferred signal stub". In this way, when the currently executing routine completes, the deferred signal stub will be called. Execution of the deferred signal stub effects the sending of the signal 12 to the signal handler 1a when the resource becomes available, and subsequently causes the processor to jump to the deferred return address containing the proper return address.

The steps of the preferred deferral routine are summarised in FIG. 19 as follows: starting from the top of the figure, a registration request 10 is sent from the application. The library then intercepts the request and modifies it (20) before passing it to the operating system (11). In this way, the library has ensured that asynchronous signals will be sent directly to it.

Next, when an asynchronous signal 12 is received at the library, the library inspects the deferral hook 21.

The lower left portion of FIG. 19 illustrates the scenario in which the deferral hook is set to zero. In this case, the asynchronous signal is passed directly to the signal handler (13) so that the signal handler executes as normal.

The lower right portion of FIG. 19 illustrates the scenario in which the deferral hook is set to contain the address of a position in the stack which points to the deferred signal stub (denoted simply as "1" in FIG. 19). This stub then executes so that when the current routine ends the asynchronous signal is caused to be passed to the signal handler in the application (13).

FIG. 20 shows the process of registering and deferring asynchronous signal handling in more detail.

First, when an asynchronous signal handler is registered with the operating system 100, rather than the address of the signal handler 101 that is being registered being written to the signal handler record 102 in the operating system, the address of a signal deferral routine 107 is written to that location instead. This has the effect that when an asynchronous signal is transmitted from the operating system the signal deferral routine will be executed instead of the asynchronous signal handler. The request to register the asynchronous signal handler is intercepted by the library and in addition to configuring the signal handler record 102 as described above it configures the signal deferral routine 107 and a deferred signal stub 108 for addressing the signal handler 101 identified in the request.

Second, when a non-reentrant routine that is to cause the signal handler to be deferred is executed it writes the address 103 of the location 104 on the stack 105 of its return address to a deferral hook memory location 106. When the routine completes it writes zero to location 106. The deferral hook acts as a marker showing whether execution of the asynchronous signal handler is to be deferred or not.

Once the system has been configured in this way the signal deferral routine and a deferred signal stub 108 automatically handle the execution and if necessary deferral of the execution of the asynchronous signal handler. When the asynchronous signal handler is called (step 120) the location 102 points to the signal deferral routine 107, which is then executed. (Step 121). The signal deferral routine checks the content of the deferral hook 106. (Step 122). If the content is zero then the non-reentrant routine is not in use and so the signal deferral routine calls the asynchronous signal handler 101 (step 123), thus satisfying the call to the asynchronous signal handler. If the content is not zero then the execution of the asynchronous signal handler must be deferred. The signal deferral routine reads the content of the stack at the location 104 indicated by the deferral hook and writes it to a deferred return address memory location 109. (Step 124). The signal deferral routine then stores the location of the deferred signal stub 108 at that location 104 on the stack. (Step 125). As a result, when the non-reentrant routine exits the deferred signal stub 108 will be executed. (Step 126). The deferred signal stub calls the asynchronous signal handler (step 127) and then passes execution to the address stored in the deferred return address 109. In this way the asynchronous signal handler is executed automatically when the non-reentrant routine exits, and control is subsequently passed automatically as if the routine had exited normally.

At the start and end of routines using the resource, writing to the deferral hook may be performed by the operating system, in accordance with prior instructions from the library.

It will be understood by the skilled person that the sequence of events described in relation to the preferred embodiment need not be implemented as described in order to achieve advantages. Any means for recording whether or not a contentious resource is available could enable embodiments of the invention to delay asynchronous signals when the resource is busy while permitting them to pass to the signal handler when it is free. In one embodiment, when an attempt is made to execute a signal handler routine but the necessary resource is unavailable, an indication could be stored to indicate that the signal handler is awaiting a call to initiate its execution. When the current routine exits, the signal handling arrangement of this embodiment could check whether there are any signal handler routines waiting and, if so, call one of the waiting signal handlers to trigger its execution. It will be understood that signal handling arrangements of embodiments of the invention could be implemented in software or in hardware, at the application or at the library, or at any other suitable location.

It can be seen that embodiments of the invention can permit less restricted use of asynchronous signals in a data processing system. In addition, in the preferred embodiment deferred signals are guaranteed to run in the thread in which they execute since a new thread need not be created to run the deferred signal handler because it is run in the context of and at the time as the function which is holding the contended resource.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section F

Processing Network Traffic

This invention relates to processing network traffic in a data processing system.

Figure 21:
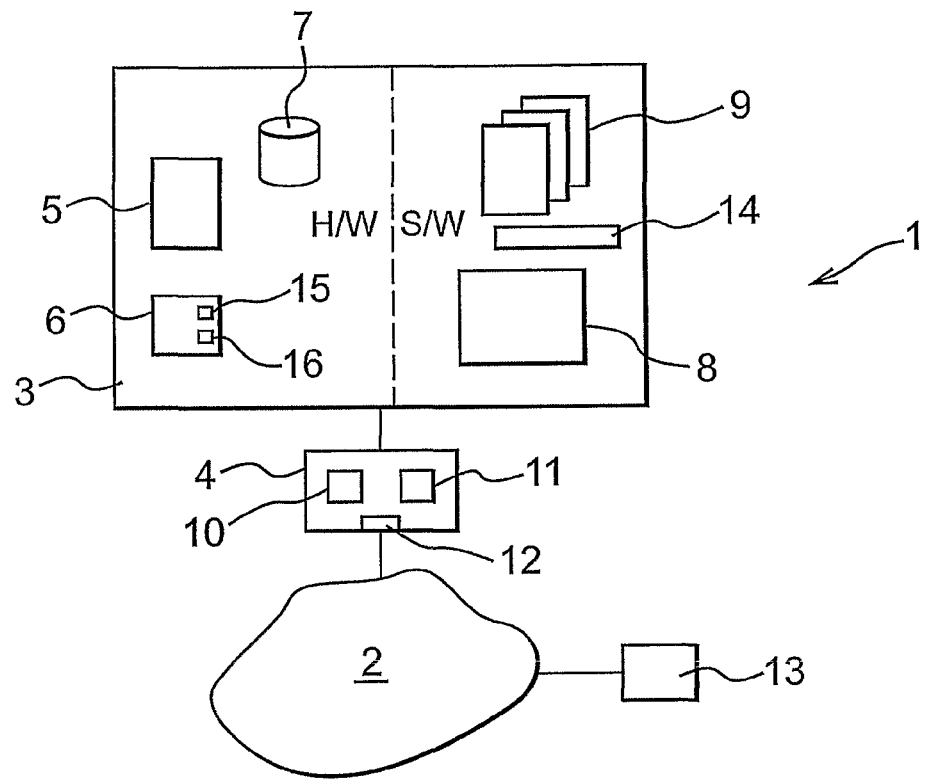
FIG. 21 illustrates the architecture of a data processing system.

FIG. 21 shows a data processing system 1 for sending and receiving data over a network 2. The data processing system comprises a base processing section 3 and a network interface device 4.

In the hardware domain the base processing section comprises a central processing unit (CPU) 5, a working memory 6 and a non-volatile program store 7. The non-volatile store stores program code which can be loaded into the memory 6 and executed by the CPU. The memory 6 can also be used as working memory for storing data that is being processed by the program code.

In the software domain the base processing section supports an operating system 8 and one or more application programs 9. The operating system operates in the normal way to support the application programs, and control access by the applications to hardware resources such as the memory 6 and the network interface device 4.

The network interface device 4 comprises a processor 10 and a memory 11 which are arranged for processing network traffic being transmitted or received over the network 2. The network interface device also has a physical interface 12 for converting to the physical specifications of the network. The network device enables the data processing system 1 to communicate over the network with remote hosts such as host 13. The network interface device could be implemented in any convenient way: for instance as a stand-alone unit, as a plug-in card or directly on a motherboard of the data processing system 1. However it is implemented, the network device may conveniently be termed a network interface card (NIC).

There is typically a protocol specified for communications over the network. The protocol conventionally includes a specification of how traffic data is to be carried, and also how control functions are to be implemented. Control functions typically include error checking, retransmission requests and responses, flow control and basic network messages such as those for identifying whether a host is active or reachable. When traffic data is to be transmitted from a host that must be done in accordance with the protocol. That typically includes encapsulating the traffic data according to the protocol, for example in packets of a specified format having suitable error checking data; transmitting the data in accordance with any flow control messages from the receiver, and performing any retransmissions of lost or corrupted data as required in accordance with the protocol. Similarly, when traffic data into be received the raw data received from the network must first be processed in accordance with the protocol to check its integrity, request retransmission if necessary, and to reassemble the traffic data in the correct order for presentation to the entity in the receiver that is to handle the traffic data. The processing of data in accordance with the protocol for transmission or reception is termed protocol processing.

Unit 14 is not present in a conventional system and will not be described here.

A number of routes have been proposed for protocol processing in a system of the type illustrated in FIG. 21.

The normal route is for protocol processing to be performed by the operating system 8. On data transmission an application calls the operating system with a command that specifies traffic data to be transmitted. In response to that command the operating system performs protocol processing of the traffic data and causes it to be transmitted via the NIC. Any necessary retransmissions are handled automatically by the operating system once transmission has been initiated by the command from the application. On data reception the NIC receives data, writes it to a pre-defined location in memory 6 and then sets an interrupt on the base processing section 3. In response to the interrupt the operating system performs protocol processing of the received data. The received data might not contain traffic data, but if it does the operating system reassembles the traffic data and makes it available to the appropriate application.

The normal route has a number of disadvantages. One significant disadvantage is the need for context switching whenever data is received from the NIC. When the data is received the processor 5 may be executing a program thread. That thread must be temporarily suspended and a new thread executed in order to allow the operating system to process the received data. Then the original thread is resumed. This switching of threads significantly reduces the performance of the data processing system. Another issue is that the use of interrupts and system calls for signalling the operating system uses up system resources.

Another known route which addresses these problems is to perform protocol processing on the NIC instead of by the operating system. This reduces the load on the operating system and avoids the need for context switching when data is to be protocol processed. However, this route introduces other disadvantages, most significantly that applications that are to send and receive data by this route cannot use the standard API (application programming interface); instead they must use a specific API that enables them to communicate specially with the NIC. Also new protocols (such as Infiniband and iWARP/SDP) are generally required which add significant complexity to the control and data plane protocols over and above the standard Internet and Ethernet protocols. Information on Infiniband is available from infinibandta.org. Information on iWARP is available from rdmaconsortium.org.

There is therefore a need for an improved means of performing protocol processing.

According to the present invention there is provided a data processing system for receiving data from a network, and processing that data in accordance with a network protocol to extract traffic data therefrom, the data processing system having: a memory; a network interface for receiving the data from the network and storing it in the memory; an operating system for supporting one or more applications; and a protocol processing entity, the protocol processing entity being arranged to perform protocol processing of data in the memory in response to signalling from an application supported by the operating system.

Preferably the protocol processing entity is a software entity that runs at a higher level than the operating system, most preferably at user level.

The protocol proceeding entity is conveniently constituted by a function library, most preferably a library activated through a dynamic runtime linkage.

Preferably the protocol proceeding entity provides an application programming interface (API).

Preferably the memory comprises a plurality of buffers each associated with a respective endpoint of the data processing system.

Preferably the memory comprises a buffer for storing data indicating events, and the network interface device is arranged to, on receiving data from the network, store it in the memory and also store data indicating a corresponding event in the event buffer.

Preferably the protocol processing entity is arranged to perform protocol processing of data in the memory in response to signalling from an application to request whether data is available for one or more endpoints. Most preferably the said signalling is a select( ) and/or a poll( ) call.

Preferably the call is resolved by the data processing system by means of a static linkage. Alternatively the call may be resolved by the data processing system by means of a dynamic linkage.

Preferably the protocol processing entity is arranged to perform protocol processing of data in the context of the entity that signalled it to do so. The said entity may be a thread of the application.

Preferably the network protocol is TCP/IP. Alternatively it may be UDP/IP or any other suitable protocol, including non-IP protocols.

The protocol processing entity is conveniently an API.

The said signalling is preferably a function call.

The protocol processing entity preferably supports BSD, Posix or Winsock network sockets The present invention will now be described by way of example with reference to the accompanying drawings.

In the drawings:

FIG. 21 illustrates the architecture of a data processing system; and

Figure 22:
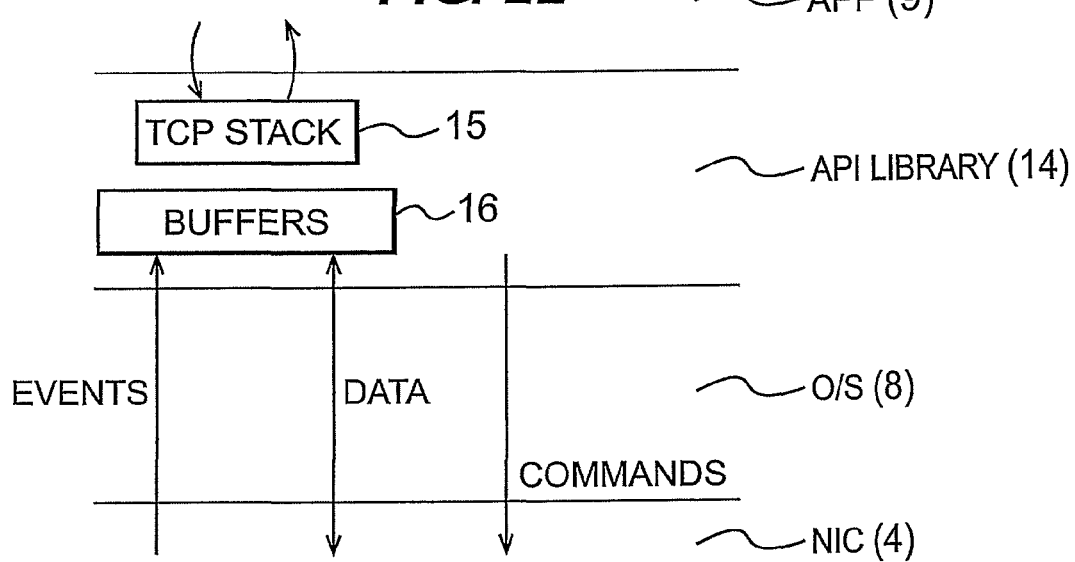
FIG. 22 illustrates protocol processing.

FIG. 22 illustrates protocol processing.

The present invention is applicable to a system of the type illustrated in FIG. 21.

FIG. 21 shows a library 14 which implements an API. The library provides a set of functions that can be called by applications. The functions include functions for transmitting and receiving data. The library is not a part of the operating system. The library runs at user level: i.e. it has user-level privileges allocated to it by the operating system.

FIG. 22 illustrates a scheme for protocol processing. In this scheme memory space storing the state of a protocol stack 15 and buffers 16 for holding data before and after protocol processing are assigned in memory 6 of the data processing system. Regions 15 and 16 are assigned by the operating system as being owned by and accessible to the library 14. The library performs protocol processing of data in the buffers 16 in accordance with the state of the stack Thus, in this system it is the API/library 14, not the operating system or the NIC that performs protocol processing. This has a number of advantages, as will be identified below.

Communication between the library and the NIC occurs in a number of ways. The buffers 16 are of two types: data buffers and event buffers. The event buffers are used by the NIC to signal to the library that events such as the receipt of data have occurred. When the NIC wishes to communicate to the library it can write received data to a data buffer and/or write an event to an event buffer. When the library wishes to communicate to the NIC it can pass a command to the NIC. Data that is to be processed can be provided to the NIC either as an operand to a command or by writing it to a buffer and issuing a command to the NIC that points it to that buffer.

In practice the data processing system may implement a number of logical endpoints for data. Typically these will be constituted by applications or threads and will be associated with a feature of the data that is received from the network for that endpoint. For instance, each endpoint may be allocated a port number in accordance with the protocol, allowing data received for that endpoint to, be identified by its port number. It is convenient to allocate a respective data buffer to each endpoint.

The operation of the system will now be described.

When data is received from the network by the NIC 4 the NIC identifies which endpoint the data is for, and writes the data to the appropriate buffer. It also writes an event to the event buffer. The event is a data unit of a predefined format that indicates to the library that data has been received. Alternatively, an application specified tag may help with upper layer demultiplexing. The event may include information such as the time when the data was received and the buffer it has been written to. The event buffer acts to provide a queue of events that can be actioned by the library when required.

During normal operation the library does not automatically process received data in response to its being written to a buffer or in response to an event being added to the event queue. The received data therefore sits in the data buffer without protocol processing being performed on it. However; when an application wishes to receive data it signals the library. Normally the application will first issue a command such as a poll( ) call to check whether there is any traffic data available for it. The poll( ) call will typically specify an endpoint for which the application is requesting data; if not it is deemed to specify all available endpoints. The poll( ) call is handled by the library 14. In response to that call the library automatically performs protocol processing on received data that could be for the specified endpoint. It returns an indication of whether any data is available or not. The application can then either request available traffic data from the library or read it directly from the appropriate buffer. Thus, for received data the protocol processing is carried out by the library 14, at user level, in response to a request or command received from an application. It is not driven by the receipt of data.

When commanded by the application the library can identify data that is to be processed in a number of ways. One option is to scan the event queue for events that indicate that data is available for the specified endpoint, and action any such events. An event is actioned by protocol processing the raw received data to which they relate, and deleting the event from the buffer. Another option is to action all events in the queue. Another option is to protocol process all raw received data in the buffer that relates to the specified endpoint.

The protocol may have explicit or implicit rules that govern timely processing of received data. For example, it may be that if received data is not acknowledged within a certain period then the transmitter will retransmit it. To comply with these rules the system may be arranged to automatically perform protocol processing if a set time limit since the last protocol processing is reached. This may be achieved by an application-level timer thread that runs on the system, or by a timer to which the operating system is responsive to signal the library to perform protocol processing. Further information on the implementation of such a system is disclosed in WO 2005/104475.

When traffic data is to be transmitted the application provides it to the library by means of a conventional transmit command. The library then writes the traffic data to a data buffer, performs protocol processing on it and signals the NIC to transmit it.

The protocol processing performed when the library is triggered by an application need not, be limited to the extraction of traffic data from raw received data. The protocol processing will preferably also deal with the handling of control data, for instance the sending of acknowledgements or retransmission requests and handling flow control data. The library may be arranged to perform protocol processing for receiving and not transmitting when it receives a request from an application for received data, or for an indication of whether received data is available for that application. Alternatively it may perform both transmit and receive protocol processing at that point.

The system described above has a number of advantages over, prior art systems.

The protocol processing (typically TCP/IP and UDP/IP protocol processing) of raw received data and of traffic data that is to be transmitted is performed in response to requests from applications rather than in response to the receipt of data. This can reduce the need for context switching both between user and kernel context or between threads in a user-level library. Multiple blocks of raw data can be received and stored in the data buffers, but protocol processing need not be performed after each one arrives. Instead, protocol processing can be performed for all those blocks together, when initiated by an application's request for data. This agglomeration of the protocol processing operations also results in a reduction in the number of transfers of data between the cache of the processor 5 and the data buffers. The system can provide these advantages whilst applying the same network protocols, packet formats and control plane protocols as would be required to communicate with the NIC in a prior art system.

Because the NIC signals the library using events on the event queue, rather than by means of interrupts, the number of interrupts raised by the system can be greatly reduced leading to improved application performance.

Since the library runs at user level, there is no need for the applications to use syscalls to communicate with it. This can result in improved cache behaviour for applications.

The API implemented by the library 14 is preferably the same as that normally used by applications to transmit and receive data in the environment in question. This avoids the need for the applications to be altered to operate with the library. This can be achieved by remapping of the standard functions that are available to an application (such as LIBC in a Linux environment) to point to the library 14, or by the interception or redirection to the library 14 of calls or functions that it needs to provide in order to implement the system described above.

The library is preferably not inherently threaded. This means that under normal circumstances, transport protocol processing will be carried out in the context of the application's thread which is calling into the transport library. This tends to result in the loading of data into the cache of the CPU which will subsequently process the data just before the processing (by the application) takes place. This means that the data tends not to make multiple traversals of the memory 10 plane and so performance can be improved.

The library preferably implements a interface of the type conventionally known as a sockets interface. The sockets interface may comply with Posix P1003.1g or the like, or may be a variant as often used on conventional operating systems such as Linux, Windows and Solaris. Examples of suitable interfaces include BSD or BSD-like interfaces and Winsock interfaces. The library is conveniently implemented as a dynamic runtime library, through a dynamic runtime linkage. In the case of Unix or Unix-like environments such as Linux the linkage environment may conveniently be adopted through a preload mechanism. In the case of Windows or Windows-like environments it may be implemented by the library registering with the system as a WSP (winsock service provider).

The network protocol could be any suitable protocol. Examples include UDP/IP and TCP/IP.

The present application should be read in conjunction with the applicant/assignee's co-pending applications.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section G
Fragmenting Data Units

This invention relates to data transfer protocols, for example protocols suitable for carrying packets over data networks.

One common example of a protocol stack for data networking involves TCP (transmission control protocol) or UDP (user datagram protocol) as a transport protocol, IP (internet protocol) as a network protocol and Ethernet as a data link protocol. In this stack traffic data that is to be transmitted is formed into one or more TCP or UDP packets, which are encapsulated in IP packets. The IP packets are sent from a source device which is identified by a source network address to a destination device which is identified by a destination network address. Each device may support one or more entities that generate or consume the traffic data. For example, a device may support multiple applications each of which is required to transmit or receive data independently of the others. These entities are identified by port numbers. The full source point or destination point of the traffic data contained in a packet is therefore specified by a network address and a port number.

Figure 23:
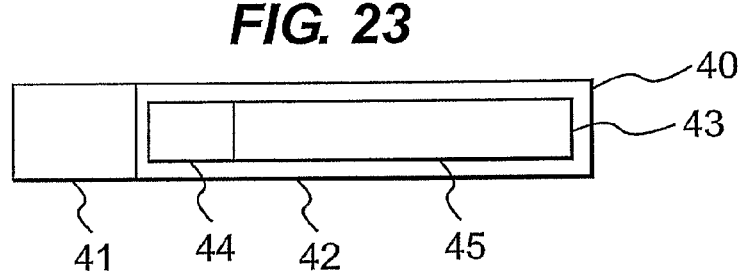
FIG. 23 shows the structure of a UDP/IP packet.

Each TCP or UDP packet has a header that includes data that indicates the port on the source device from which the traffic data carried as the payload of the packet has come ("source port"), and data that indicates the port on the destination device for which the payload of the packet is intended ("destination port"). The TCP or UDP packet is then encapsulated in an IP packet. The IP packet has a header that includes data that indicates the address of the source device ("source address"), and data that indicates the address of the destination device ("destination address"). This structure illustrated in FIG. 23. FIG. 23 shows an IP packet 40 including a header 41 and a payload 42. The payload 42 contains a UDP packet 43 having a header 44 and a payload 45. The IP packet is transmitted via Ethernet from the source device to the destination device, where the payload is extracted and applied to the appropriate entity according to the specified port number.

Figure 24:
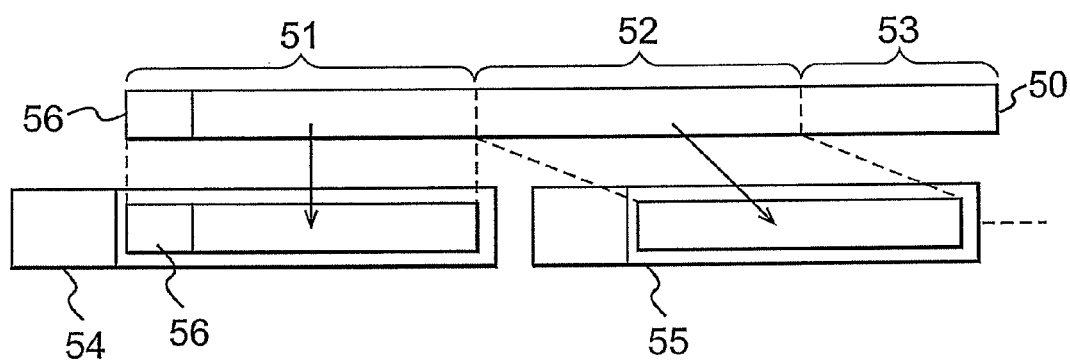
FIG. 24 shows the structure of fragmentary UDP/IP packets.

Like many other data link protocols, the Ethernet protocol specifies a maximum size of packet that can be transmitted over it. In the conventional TCP/UDP-IP-Ethernet protocol stack this limitation is handled at the IP layer. If the TCP or UDP packet that is passed to the IP layer is too large for transmission over Ethernet then it is fragmented by the IP layer into multiple IP packets. These are then recombined by the IP layer of the destination device. Each fragmentary IP packet includes an IP header. The IP header specifies the destination address and includes data that enable the destination, device to identify that the packets have been fragmented and to recombine them in the correct order. All the fragmentary packets resulting from the fragmentation of a common original packet will have a fragmentation identification field set to a common value. A series of fragmentary packets is illustrated in FIG. 24. In FIG. 24 a UDP packet 50 is split into a number of fragments 51-53 for transmission in a series of IP packets including packets 54 and 55. Only one of the IP packets (packet 54) includes the UDP header 56. The packets might not arrive at the receiver in the same order as they were sent in, and the packets might be transmitted out of order: for example Linux transmits the fragmentary packets in the reverse order, so that the fragmentary packet 54 that contains the UDP header 56 is transmitted last.

In practice, fragmentation does not happen for TCP packets because TCP also includes a mechanism for voiding over-sized packets. UDP, on the other hand, does not include such a mechanism. Nevertheless some applications generate large numbers of over-sized UDP packets which must be fragmented at the IP layer. This is particularly a problem for database applications, where the data originates from disk access: such data typically has natural size of 8 KB but may have to be sent over Ethernet with the common 1500 byte MTU (message transfer unit).

When a series of fragmented IP packets representing a single UDP packet is received at the destination the fragmentary packets must be recombined to recover the complete UDP packet, and the traffic data represented by the payload passed to the appropriate receiving entity based on the destination port indicated in the UDP packet header. This process is fundamentally straightforward, but it causes significant overhead at the receiver. The overhead may not be overwhelming for a kernel stack network. However, in the case of a user-level architecture, where transport stacks are implemented at user level, such fragmentation makes it difficult for the network interface hardware to deliver the fragments to the appropriate transport stack. This is because the delivery information (UDP port number) is only present in the first fragment and typical interface hardware would expect to see port information in each packet.

One way to solve this problem would be by means of a hash table on the network interface hardware, which allowed the hardware to map later fragments on to the appropriate transport stack. However, unless the system is able to buffer received fragments this approach would not cope with the situation where the first fragment of a UDP packet (the one that contains the UDP port number) does not arrive at the receiver before other fragments of that UDP packet. Buffering fragments until the first fragment arrived would be extremely costly in terms of hardware resources. Not buffering introduces a requirement that fragments must be delivered in order for the hardware to determine the appropriate user-level transport. For efficiency reasons it is important to ensure that all the fragments of a single IP packet are delivered either to the operating system or to the appropriate user-level transport stack. It is undesirable to deliver to the wrong user-level transport and it is highly undesirable to split a packet between the operating system and a user-level transport.

There are two ways to recombine the payloads of the fragmentary packets to form the UDP packet. First, the fragmentary packets can be buffered at the IP layer until all the fragmentary packets that go to form the fragmented UDP packet have been received. Then they can be recombined and the payload of the UDP packet directed to the entity identified as the destination port in the UDP header. This method has the disadvantage that a large amount of memory may need to be allocated to buffering the fragmentary packets, especially if multiple fragmented packets are being received at one time. An alternative method is to buffer the fragmentary packets only until the first fragmentary packet, which contains the UDP header, is received. An entry is then made in a hash table to map the fragmentation identification number of the fragmentary packets on to the destination port indicated in the UDP header. The payloads of the buffered fragmentary packets are passed to the receiving entity identified by the destination port, which takes responsibility for reordering them. When subsequent fragmentary packets arrive their fragment number is checked in the hash table to recover the destination port, and they are directed accordingly. This method has the advantage that the delivery of the data to the receiving entity can be speeded up. However, it requires all received fragmentary packets to be checked against the hash table, which introduces delay, and the facts that reordering of the IP packets is possible and Linux even transmits the IP packet that contains the UDP header last mean that it might still be necessary to, allocate memory to buffer all the fragmentary packets.

There is therefore a need to improve the handling of fragmented packets.

According to one aspect of the present invention there is provided a method of forming multiple packets of a first protocol for carrying data from a packet of a second protocol, the first and second protocols each defining a data format for packets of the respective protocol according to which each packet thereof includes a payload and control data including address data indicative of an intended recipient of the data, the method comprising: dividing the payload of the packet of the second protocol into two or more fragments; and forming two or more packets of the first protocol, each such packet including a single one of the fragments and at least some of the address data of the packet of the second protocol.

The step of forming preferably comprises setting the payload of each packet of the first protocol to include the respective one of the fragments.

Preferably the second protocol is User Datagram Protocol.

Preferably the step of forming comprises setting the control data of each packet of the first protocol to include the said some of the address data of the packet of the second protocol.

Preferably the first protocol is Internet Protocol and the step of forming comprises setting option data of each packet of the first protocol to include the said some of the address data of the packet of the second protocol.

Preferably the step of forming comprises, for each packet of the first protocol: generating intermediate packet data having the data format defined by the second protocol and including as the address data thereof at least some of the address data of the packet of the second protocol, and including as the payload, data thereof the respective fragment; and setting the payload of the respective packet of the first protocol to include the intermediate packet data.

Preferably the second protocol defines certain data content of packets formatted according to the data format of the second protocol as invalid, and the intermediate packet data is generated so as to include such invalid data.

Preferably the data content defined as invalid is certain content of a field of the control data according to the format of the second protocol.

Preferably the step of forming comprises, for each packet of the first protocol: setting the said field of the control data of the intermediate packet data to a value that is invalid according to the second protocol; and setting the control data of the respective packet of the first protocol to include data that would be included in the said field if the control data of the intermediate packet if the intermediate packet data were valid packet data according to the second protocol.

Preferably the first protocol is Internet Protocol and the step of setting the control data comprises setting option data of the respective packet of the first protocol to include data that would be included in the said field if the control data of the intermediate packet if the intermediate packet data were valid packet data according to the second protocol.

Preferably the field is the length field of the user datagram protocol.

Preferably the said some of the address data of the packet of the second protocol includes a destination port number.

Preferably the said some of the address data of the packet of the second protocol includes a source port number.

According to a second aspect of the present invention there is provided a data transmitter for forming multiple packets of a first protocol for carrying data from a packet of a second protocol, the first and second protocols each defining a data format for packets of the respective protocol according to which each packet thereof includes a payload and control data including address data indicative of an intended recipient of the data, the transmitter comprising means for: dividing the payload of the packet of the second protocol into two or more fragments; and forming two or more packets of the first protocol, each such packet including a single one of the fragments and at least some of the address data of the packet of the second protocol.

According to a third aspect of the present invention there is provided a method of receiving data from multiple packets of a first protocol each carrying data from a packet of a second protocol, the first and second protocols each defining a data format for packets of the respective protocol according to which each packet thereof includes a payload and control data including address data indicative of an intended recipient of the data, the packets of the first protocol all including a fragment of the payload of the packet of the second protocol and at least some of the address data of the packet of the second protocol; the method comprising allocating at least one memory area to each of a plurality of receiving entities, and for each packet of the first protocol: receiving the packet of the first protocol at a network processing layer; identifying the said some of the address data of the packet of the second protocol in the packet of the first protocol; in dependence on the identified address data of the packet of the second protocol directing at least some of the payload of the packet of the first protocol to a memory area allocated to an entity indicated by the identified address data.

According to a fourth aspect of the present invention there is provided a method of receiving data from multiple packets of a first protocol each carrying data from a packet of a second protocol, the first and second protocols each defining a data format for packets of the respective protocol according to which each packet thereof includes a payload and control data including address data indicative of an intended recipient of the data, the packets of the first protocol all including intermediate packet data that has the structure of a valid packet of the second protocol and that includes control data that is invalid according to the second protocol, and each packet of the first protocol including control data whereby, valid control data according to the second protocol can be generated for the intermediate packet data; the method comprising, for each packet of the first protocol: receiving the packet of the first protocol at a first protocol processing layer; extracting the intermediate packet data from the packet of the first protocol; identifying that the intermediate packet data represents an invalid packet of the second protocol; generating valid control data according to the second protocol for the intermediate packet data by means of the control data of the packet of the first protocol; and checking the integrity of the intermediate packet data based on the content of the intermediate packet data and the generated valid control data.

Preferably the step of checking the integrity comprises verifying a checksum over at least some of the intermediate packet data.

Preferably the said invalid control data is a length field for the intermediate packet data.

According to a fifth aspect of the present invention there is provided a data receiver for receiving data from multiple packets of a first protocol each carrying data from a packet of a second protocol, the first and second protocols each defining a data format for packets of the respective protocol according to which each packet thereof includes a payload and control data including address data indicative of an intended recipient of the data, the packets of the first protocol all having a payload including a fragment of the payload of the packet of the second protocol and at least some of the address data of the packet of the second protocol; the receiver comprising: a memory comprising a plurality of memory areas; a plurality of receiving entities, there being at least one memory area allocated to each receiving entity; and packet processing means configured to, for each received packet of the first protocol: receive the packet of the first protocol at a network protocol layer; identify the said some of the address data of the packet of the second protocol in the packet of the first protocol; and in dependence on the identified address data of the packet of the second protocol direct at least some of the payload of the packet of the first protocol to memory allocated to an entity indicated by the identified address data.

According to a sixth aspect of the present invention there is provided a data receiver for receiving data from multiple packets of a first protocol each carrying data from a packet of a second protocol, the first and second protocols each defining a data format for packets of the respective protocol according to which each packet thereof includes a payload and control data including address data indicative of an intended recipient of the data, the packets of the first protocol all including intermediate packet data that has the structure of a valid packet of the second protocol and that includes control data that is invalid according to the second protocol, and each packet of the first protocol including control data whereby, valid control data according to the second protocol can be generated for the intermediate packet data; the data receiver comprising packet processing means arranged to, for each packet of the first protocol: receive the packet of the first protocol at a first protocol processing layer; extract the intermediate packet data from the packet of the first protocol; identify that the intermediate packet data represents an invalid packet of the second protocol; generate valid control data according to the second protocol for the intermediate packet data by means of the control data of the packet of the first protocol; and check the integrity of the intermediate packet data based on the content of the intermediate packet data and the generated valid control data.

The present invention will now be described by way of example with reference to the accompanying drawings.

Figure 25:
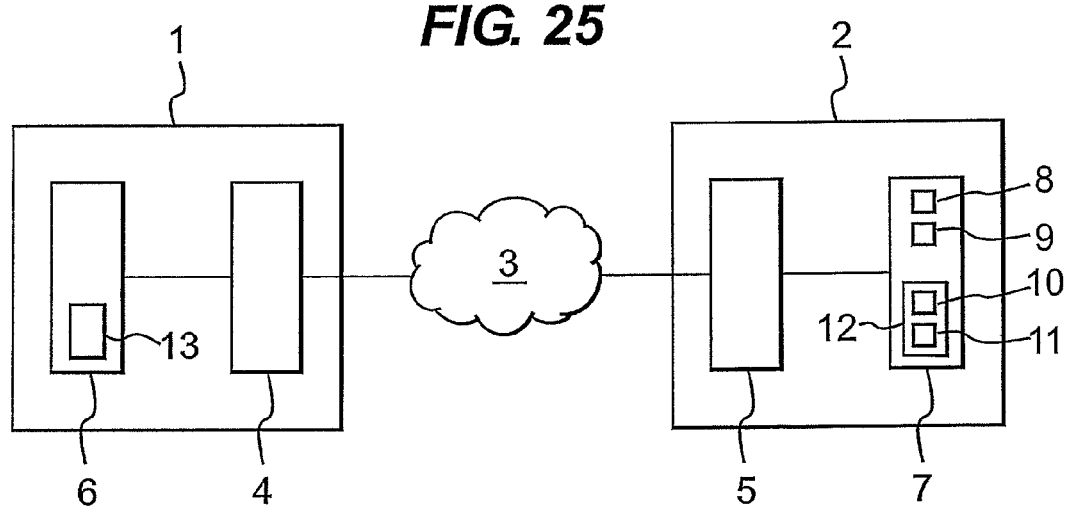
FIG. 25 shows the architecture of a network communication system.

In the drawings:

FIG. 23 shows the structure of a UDP/IP packet;

FIG. 24 shows the structure of fragmentary UDP/IP packets;

FIG. 25 shows the architecture of a network communication system; and

Figure 26:
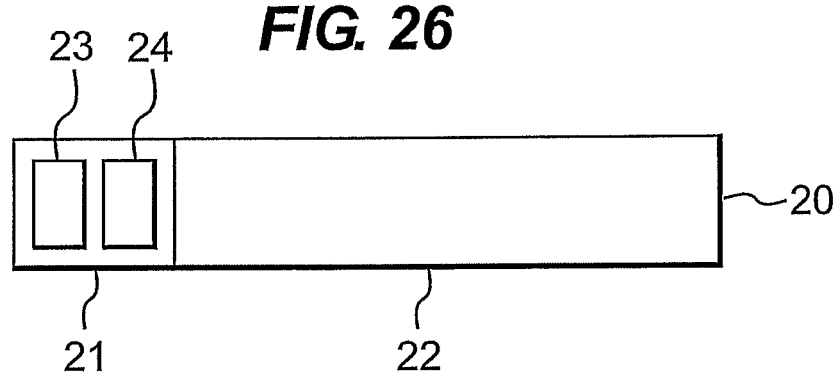
FIGS. 26 and 27 show other structures of fragmentary UDP/IP packets.
Figure 27:
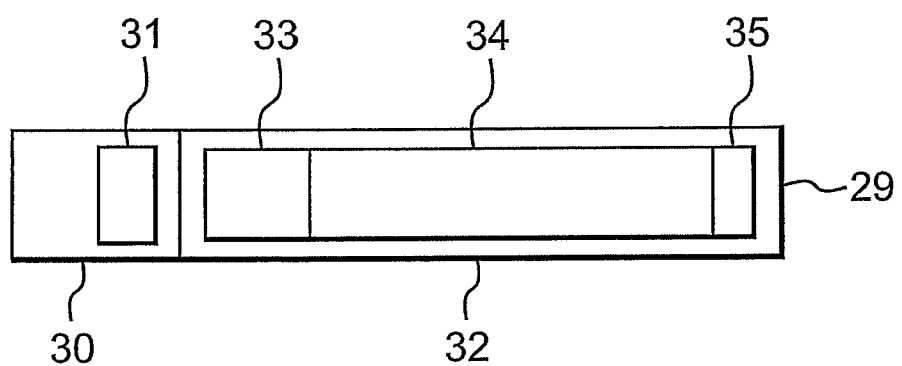

FIGS. 26 and 27 show other structures of fragmentary UDP/IP packets.

FIG. 25 shows a network communication system comprising a first communication device 1 and a second communication device 2 connected via a network 3. Each communication device comprises a network interface card (NIC) 4, 5 and a host device 6, 7. The host device could for example be a server, a personal computer or a dedicated processing or storage device. Each NIC could take the form of a peripheral card attached to the host device or could be integrated into the host device, for example as a chip or chipset on the motherboard of the host device. The NIC need not take the form of a card. The host devices 6, 7 are connected to the network 3 via the NICs 4, 5. Each host device supports a number of entities 8, 9 which can send or receive data. Each of those entities is allocated a port number by the respective host which is unique within that host. Each host has a unique network address in the network.

Protocol processing and buffering can be split between the NIC and the host as desired. In the system of FIG. 25 each entity 8, 9 has one or more buffers 10, 11 allocated to it. The buffers are located in memory 12, 13 on the host that supports the respective entity. When data is received by the NIC it writes that data as promptly as possible to the buffer on the host that corresponds to the entity that the data is intended for. This can avoid the need for significant buffering on the NIC. If the position of the received data in the fragmented packet is known then the received data may be written to a corresponding position in the buffer relative to other received fragmentary packets so that the packet is reconstructed automatically as the packets are written to the buffer.

The network of FIG. 25 is an Ethernet network, although the invention is applicable to networks that have other transport protocols.

In the system of FIG. 25 the IP protocol is used at the transport level for communications between the hosts, and UDP packets can be transmitted over it. However, in the system of FIG. 25 one or more of the protocols is arranged so that when a UDP packet has to be fragmented all of the resulting fragmentary packets includes information from the header of the UDP packet that can enable the receiving communication device to decide on receipt of each fragmentary packet which entity the fragmentary packet is intended for. In the system of FIG. 25 this allows the NIC to write the fragmentary packet immediately to the appropriate buffer on the host without buffering it on the NIC. Examples of ways in which the protocols can be arranged to achieve this will now be described.

IP Option Field

A first way uses the options field specified in IP packet headers according to RFC 791. The IP protocol allows an IP packet header to include data known as options. The format of options is specified in RFC 791, to which the reader is referred for further information. An option is used to incorporate some or all of the UDP header of the fragmented UDP packet into the header of the fragmentary packets into which it has been fragmented. The option may be an experimental option or an approved option having a designated option number. The use of the option is illustrated in FIG. 26. FIG. 26 shows a fragmentary IP packet formed by the fragmentation of a UDP packet and the encapsulation of one of the fragments in an IP packet. The IP packet 20 includes a header 21 and a payload 22. The header includes the normal IP header data 23, including the packet's source address and destination address. The IP packet also includes an option field 24 which can carry further data. The option field includes the some or all of the header of the UDP packet whose data has been fragmented.

In this method the IP layer of the transmitter and the receiver are configured to cooperate using a pre-specified IP option. When the IP layer of the transmitter is fragmenting a UDP packet it includes some or all of the header of the UDP packet in the option field of every IP packet into which the UDP packet has been fragmented. If the header of the UDP packet is in the payload of the IP packet then the header of the UDP packet could optionally be omitted from the option field of the IP packet header of that packet. The data from the UDP header preferably includes the source port and/or the destination port.

At the receiver, the payload of each IP packet can be directed to the appropriate receiving entity without the UDP packet being reconstructed, and without the IP packet whose payload includes the header of the UDP packet having been received.

UDP Tunneling

A second way to arrange the protocols is to tunnel the fragmented UDP data through another intermediate protocol layer.

One way of achieving this is as follows. An original UDP packet that is to be fragmented is split into chunks that will each be transmitted in a respective IP packet. Each of those chunks is formed into a UDP packet by the addition of the header of the original UDP packet, but with the header modified in some way that makes its content invalid. For example, the length field of the UDP packet header can be set to a value less than 8 since RFC 768 states that for the UDP length field to be valid it must be at least 8 (the length of the UDP header). These UDP packets are sent via IP to the receiver. On receipt, well-behaved protocol stacks will reject this UDP packet. However, protocol stacks that have been adapted to receive packets according this protocol can interpret it, direct it to the appropriate receiving entity based on the content of the UDP header (e.g. the destination port) and then combine the received data to reconstruct the original UDP packet.

In order to facilitate reconstruction of the UDP packet it is advantageous to include in the IP packets information ("tunneling information") that indicates which original UDP packet the fragment relates to, and its order in the fragments. This may be done by modifying the UDP header or payload or the IP header or payload in a way that is understood by the transmitter and the receiver. However, it is preferable for it to be done in a way that does not hinder the transmission of the IP packets by normal means. One way is by including the data as an IP option. FIG. 27 shows an packet formed according to this protocol. It is also best to place the tunneling information in the same relative position in the header as would be for a valid UDP packet. This enables network hardware to only need to support one algorithm for the lookup of UDP address information.

The packet 29 of FIG. 27 comprises an IP header 30 including tunneling information 31, in this case carried as IP option data; and an IP payload 32. The IP payload is made up of a UDP header 33 (which is based on the UDP header of the original UDP packet), a UDP payload 34 (which is a fragment of the original UDP packet) and a UDP checksum 35. The structure of the IP option in this example is as follows:

Option number—specifies the type of the option, and is followed by the tunneling data Option length—Specifies the real length of the fragmentary UDP packet included in this IP packet (i.e. the UDP packet consisting of header 33, payload 34 and checksum 35.

Fragmentation ID—the serial number of the fragmentary packet in the fragmentation of the original packet, starting from 0.

Flag—can be set to "FRAG_MORE" or to another value

Offset—specifies the position of the UDP payload 34 in the original. UDP Packet

The UDP header 33 is identical to the header of the original UDP packet except that its length field is set to 5 (which is invalid) and its checksum is set to 0. The UDP checksum is calculated as normal for the fragmentary UDP packet 33, 34. The UDP header 33 is added to all the fragmentary packets, including the one that contains the original UDP header itself, so that if that packet were to be delivered to an endpoint which did not understand the present tunneling protocol, it would be dropped rather than being buffered for a potentially large period of time at the receiving endpoint while that endpoints waits for the other fragmentary packets to arrive.

The fragmentary IP packets may be sent in the order in which their contents appear in the original IP packet, or in another order. They can be reassembled in the correct order based on the content of an offset field in each packet which indicates the number of bytes that the content of that packet is offset from the start of the original UDP packet.

Therefore, when a receiver receives a packet with Fragmentation ID equal to 0 it can start the process of reconstructing a new packet. Each fragment apart from the last has its flag set to "FRAG_MORE". The setting of the flag to another value indicates that that IP packet is the last to include fragments of the original packet. The receiver can begin the reconstitution of a fragmented packet whenever it receives any fragment from that packet and can abandon reconstitution if all fragments of the packet have not been received after a predetermined time, although there is no single accepted retransmission mechanism for IP fragments.

In operation, an original UDP packet that is to be fragmented is split into chunks whose size is determined by the maximum IP packet size and the required header length in the usual way. A fragmentation ID not currently in use by the transmitting entity and/or device is selected. Then each of those fragments is transmitted using an IP packet of the form shown in FIG. 27. As the IP header is valid the packet will be correctly conveyed across the network.

As the UDP length is invalid (being less than 8) well behaved stacks (including Linux 2.4 and Linux 2.6) will reject the packet as being mal-formed. This means that the packets are unlikely to be misinterpreted by a receiver that does not have knowledge of the protocol that is in use. However, a receiver that has knowledge of the protocol can use the length field in the tunneling data instead of the length field in the UDP header to decode the data as required. Accordingly, it can find the UDP checksum to be valid.

At a receiver that has knowledge of the protocol that is in use, the following steps can be performed:
1. The packet is detected as including tunneling data and is therefore rejected from the fast path if the receiver has one.
2. The packet is allocated to be processed according to the present protocol.
3. The UDP length is checked to make sure it equals 5. Otherwise, the packet is rejected. The total length given in the tunneling data is verified against the length of the UDP packet. If invalid then the packet is rejected. Otherwise the packet and the tunneling date are passed to a UDP packet processing layer.
4. The UDP packet processing layer verifies the checksum of the fragmentary UDP packet over the total length given in the tunneling data. If invalid then retransmission of the packet is requested, or the packet is not acknowledged. Otherwise the UDP packet processing layer reassembles the original UDP packet from the received fragments. The information in the tunneling data can be used to direct the payload to the appropriate receiving entity and to allow the payloads of the fragmentary packets to be arranged in order. If the flag field is not equal to "FRAG_MORE" then the original UDP packet is deemed to be completed and is passed to the application layer for processing.

In a preferred implementation steps 1 to 3 are performed on the NIC and step 4 is performed on the host.

UDP packets that are not fragmented, or that are directed to hosts that do not support the protocol are sent as normal. In this way the mechanism does not add any overhead to non-fragmented traffic but will tunnel fragmented UDP traffic. One way to arrange that the transmitting communication device transmits data in a standard manner to destinations that it does not know to support the present protocol is by it storing a look-up table of hosts known to support the protocol and checking in that table when a UDP packet is to be fragmented. If the destination host is found in the table then the packet is sent according to the present protocol; otherwise it is sent as normal.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Section H
Data Transfer

This invention relates to a system suitable for use in passing data over a network or other data channel.

When data is to be transferred between two devices over a network, each of the devices must have a suitable network interface to allow them to communicate across the channel. The devices and their network interfaces use a protocol to form the data that is transmitted over the channel, so that it can be decoded at the receiver. The data channel may be considered to be or to form part of a network, and additional devices may be connected to the network.

The Ethernet system is used for many networking applications. Gigabit Ethernet is a high-speed version of the Ethernet protocol, which is especially suitable for links that require a large amount of bandwidth, such as links between servers or between data processors in the same or different enclosures. Devices that are to communicate over the Ethernet system are equipped with network interfaces that are capable of supporting the physical and logical requirements of the Ethernet system. The physical hardware component of network interfaces are referred to as network interface cards (NICs), although they need not be in the form of cards: for instance they could be in the form of integrated circuits (ICs) and connectors fitted directly on to a motherboard.

Where data is to be transferred between cooperating processors in a network, it is common to implement a memory-mapped system. In a memory-mapped system communication between the applications is achieved by virtue of a portion of one application's virtual address space being mapped over the network on to another application or on to a region of real memory. The "holes" in the address space which form the mapping are termed apertures.

In such a system, transmitting data efficiently presents a number of problems.

One known method for presenting data to a NIC for transmission is to pass it by PIO (programmed input-output). In PIO the data processor passes the data that is to be transmitted to the NIC as the operand to a transmit command. This method is highly inefficient for the transmission of large amounts of data since all the data that is to be transmitted must first be processed by the data processor itself.

Another known method for presenting data to a NIC is by DMA (direct memory access). In DMA the NIC is informed of the physical memory location(s) from which data is to be transmitted and reads the data from there itself when required. One problem with this approach is that it is inefficient for small amounts of data since more signalling is needed to transmit that data than in the case of PIO access. Another problem is that since the NIC is accessing the memory directly the memory must be configured in a way that allows the NIC to work with it efficiently. For example, if the NIC is to transmit a block of data in the form of a single packet, the block must be stored contiguously in physical memory so that the NIC can read it from there in response to a single DMA command. Another problem is that the physical areas of memory from which the NIC can perform DMA are unlikely to be the same as those where the data is located before transmission is required. Therefore, the data must be moved or copied from the initial location(s) to areas that can be accessed by the NIC.

According to one aspect of the present invention there is provided an interface for interfacing between a receiver and a data processing system, the data processing system including a memory for storing data, the interface comprising a transmission controller responsive to instructions from the data processing system to transmit data to the receiver, the transmission controller having access to mapping data defining a mapping between a physical address space of the memory and a virtual address space and the transmission controller being: responsive to an instruction of a first type and having as an operand data to be transmitted to transmit that data to the receiver; and responsive to an instruction of a second type and having as an operand an indication of the location of data in the virtual address space to read data from the physical location in the memory that corresponds to the indicated location and transmit that data to the receiver.

Preferably the instruction of the first type is a programmed input-output instruction.

Preferably the said reading of data responsive to the second instruction is performed by direct memory access.

Preferably the transmission controller is responsive to the instruction of the second type to access the mapping data to identify the physical location in the memory that corresponds to the indicated location.

Preferably the mapping data includes an identification of an entity as being associated with a virtual address location and the controller is responsive to the instruction of the second type to verify that an entity that has sent the instruction of the second type is associated with the indicated location.

Preferably the interface is a network interface and is arranged to transmit the data to the receiver by means of a network protocol.

Preferably the network protocol is TCP/IP.

Preferably the interface is arranged to transmit the data over Ethernet.

Preferably the mapping data is stored locally to the interface.

According to a second aspect of the present invention there is provided a library for a data processing system including a memory for storing data and having access to an interface for transmitting data to a receiver, there being mapping data defining a mapping between a physical address space of the memory and a virtual address space, and the library including: a first routine capable of being called by an application program, the first routine being such as to form an instruction of a first type for the interface, the instruction of the first type having as an operand data to be transmitted; a second routine capable of being called by an application program, the second routine being such as to form an instruction of a second type for the interface, the second instruction having as an operand an indication of the location of data in the virtual address space.

Preferably the library includes a third routine capable of being called by an application program to configure the mapping data.

The library is preferably capable of operation at user level. The library is preferably capable of implementing a network protocol stack for use in protocol processing for transmission and or reception of data by the interface. The library is preferably arranged for operation at user level to implement a protocol stack for transmission of the data. The stack may be a TCP/IP stack.

According to a third aspect of the present invention there is provided a data processor having accessible thereto for execution a library as set out above.

According to a fourth aspect of the present invention there is provided a data carrier storing program data defining a library as set out above.

The present invention will now be described by way of example with reference to the accompanying drawings.

Figure 28:
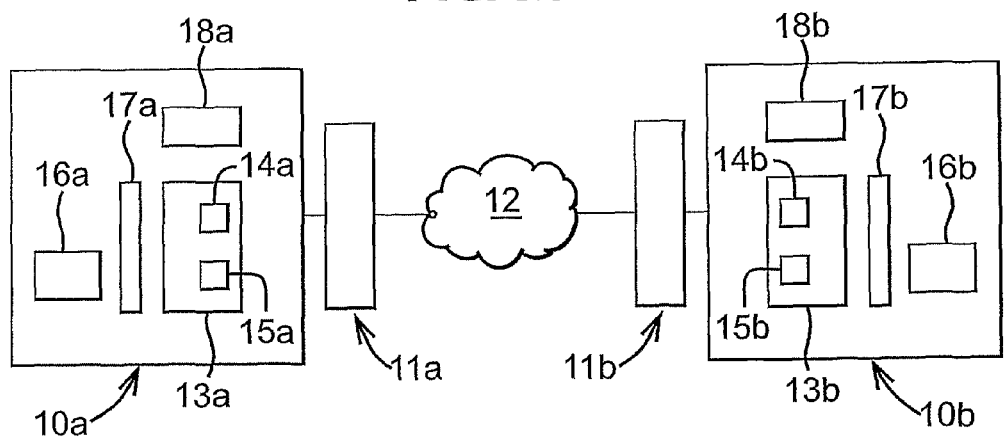
FIG. 28 shows schematically the architecture of a networked system.
Figure 29:
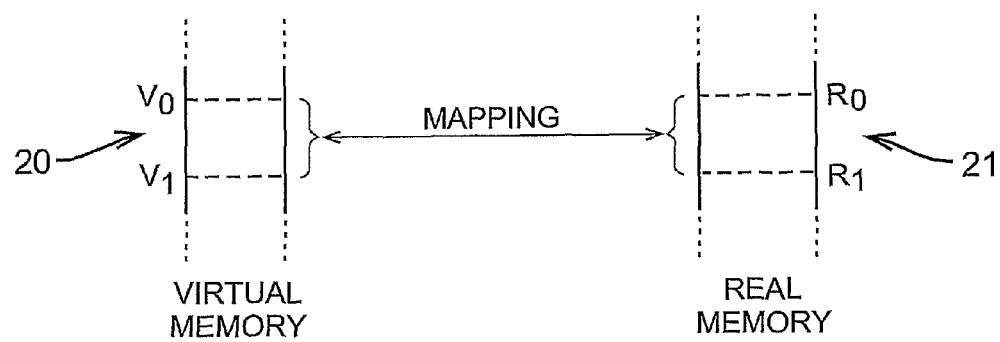
FIG. 29 illustrates mapping apertures.

In the drawings:
FIG. 28 shows schematically the architecture of a networked system;
FIG. 29 illustrates mapping apertures;
FIG. 30 shows examples of aperture and buffer tables;
FIG. 31 shows an example of a queue table; and
FIG. 32 illustrates reassignment of buffers.

FIG. 28 shows schematically the architecture of a networked system. The system comprises two data processors 10a, 10b (such as personal computers or servers), each of which has a network interface 11a, 11b (such as a NIC). The network interfaces are linked together over a data network 12. The data network could be an Ethernet network (e.g. using Gigabit Ethernet) or could employ any other suitable protocols. Each data processor has an operating system 13a, 13b which includes a kernel 14a, 14b and a device driver 15a, 15b for controlling communications between the data processor and its network interface. The operating system supports applications or processes 16a, 16b running on the data processor. A transport library 17a, 17b provides the applications/processes with routines that can be used for controlling communications over the network, and supervises communications between the applications/processes and the operating system. Each data processor has a memory 18a, 18b.

The network interfaces, the device drivers and the transport library cooperate to allow applications to map blocks of virtual memory of one of the data processors on to physical memory of the other of the data processors. The general principles behind such operation are described in WO 2004/025477 and WO2004/080005, which should be read in conjunction with the present application. When such a mapping has been established, one of the data processors can write to or read from a part of the area of virtual memory and this will have the effect of writing to or reading from the corresponding part of the area of physical memory. Such an arrangement is illustrated in FIG. 29, where a region of virtual memory 20 in a first data processing system, running from virtual memory location $V_0$ to virtual memory location $V_1$, is mapped on to a region of real memory 21 in another data processing system, running from real memory location $R_0$ to real memory location $R_1$. If the first data processing system reads from or writes to a location $V_n$ in the range from $V_0$ to $V_1$ that has the effect of reading from or writing to the corresponding location $R_n$ in the range from $R_0$ to $R_1$.

The operation of the system to support these mappings will now be described in more detail.

As is normal, the operating system of each data processor allocates a unique identifying number to each process running on that data processor. These numbers are used to secure the operation of the system, ensuring that data of one process is not read or altered by another process. The means of achieving this in the context of memory mappings will be discussed below.

If a process running on one data processor wishes to send data or read data using a mapping on to memory of the other data processor it first establishes the mapping, defining the environment in which that transfer can take place. The establishment of the mapping involves setting up entries in tables held by the data processors. Each data processor holds two tables: an aperture table and a buffer table, which are managed by its device driver 15. Together the tables define the mappings that are currently established. Examples of such tables are shown in FIG. 30.

The aperture table includes the following data for each mapping:
1. Local aperture index. This is an identifying number for the local aperture, which is allocated by the local device driver to be unique for the local data processor.
2. Local ownership. This indicates the identity of the process running on the local data processor that is entitled to access the mapping. This will typically be the process that created the mapping, but the right to access the mapping could be passed from one process to another provided preferably that that handover is performed in an authenticated manner (i.e. with the authorization of the process passing the right) so as to maintain security.
3. Remote aperture index: This is an identifying number for the aperture, which is allocated by the remote device driver to be unique for the remote data processor, and is transmitted by the remote data processor to the local data processor when the mapping is established.
4. Local buffer index(es). This indicates which of the buffers in the local buffer table are associated with the aperture. It should be noted that more than one local buffer can be associated with an aperture. Where more than one buffer is associated with an aperture, the associated buffers are listed in the entry in the aperture table strictly in the order in which they map on to the memory space represented by the aperture. Instead of explicitly listing all the buffers in an aperture a more compact encoding scheme can be used by indicating a starting; buffer and a size, it being implied that the aperture is composed of the indicated buffer and subsequent buffers in order up to the total indicated size.
5. Sequence number. This indicates the serial number of the next packet to be processed locally for the aperture.

The buffer table maps which of the processes is allocated to each buffer and holds the following information for each buffer:
1. Buffer index. This is an identifying number for the buffer, which is unique for the local data processor. The buffer is identified by this number in the buffer table index field of the local aperture table.
2. Ownership. This indicates which local process owns the buffer.
3. Physical memory address. The buffer occupies a contiguous block of physical memory, and this number indicates where that block starts.
4. Length. This indicates the length of the buffer in memory.

The size of each buffer table entry is most preferably chosen to match the page size of the host system: typically 4 kb. In that way a contiguous region of the application's virtual address space which is mapped onto a non-contiguous region of physical memory can be represented by a sequence of buffer table entries.

In the example of FIG. 30, local aperture 1 is owned by process 8 and maps on to remote aperture number 5. The local physical memory corresponding to that aperture consists of xFFF bytes starting from physical address xB000. Local aperture number 3 is owned by process number 12 and maps on to remote aperture number 1. The local physical memory corresponding to that aperture consists of xA10 bytes starting at xD000 followed by x8FF bytes starting at xA000. Thus a single aperture can be mapped on to two or more discontiguous blocks of physical memory. This provides great flexibility in the transfer of data. For example, if a contiguous block of data at the transmitting end has to be transmitted to discontiguous locations at the receiver, instead of the transmitter having to issue multiple transmit instructions to transmit each block separately, the aperture can be mapped on to discontiguous blocks at the receiver and then a single transmit instruction for the whole block of data can be issued by the transmitting process. One specific example of a situation in which this would be useful is when cooperating applications on the data processors have differently arranged memory allocations.

The entries in the tables are set up when mappings are established. The buffers allocated to an aperture can be reassigned at one end or the other without re-establishing the mapping.

The aperture and buffer tables (indicated at 19a, 19b in FIG. 28) are held in memory 18 local to the device driver that manages them. The tables are stored in a region of the memory that cannot be accessed directly by processes running on the local data processor. This is preferably achieved by using built-in access control capabilities of the operating system. The operating system is preferably capable of allocating areas of the memory 18 to processes running on the data processing system, and preventing other processes running on the same system from accessing that allocated memory. In this way direct access to the area of memory that stores the tables is preferably reserved to the local, device driver 15a, 15b (although since the operating system is in overall control it can also access the areas if required).

It will be appreciated that the tables can be set up in any suitable way, but the following is an example of a process for setting up a mapping between a process (Pa) running on a first data processor (DPa) to a process (Pb) running on a second data processor (DPb).

1. Process Pa initiates the establishment of the mapping by signalling its local device driver with details of the locations in local physical memory of the buffer(s) that are to be used for the mapping. The device driver checks that those locations are owned by Pa. If they are it sets up a row in the local buffer table for each of those buffers, and returns to the application the index allocated to each buffer. The device driver also sets up a transmit queue in local memory that can be used by the process for storing instructions defining the data it wants to transmit. The device driver informs the network interface belonging to DPa of the location of the queue and the identity of the process that owns the queue. That information is stored in a table in memory on the network interface. An example of such a table is illustrated in FIG. 31. It should be noted that since the device driver (as part of the operating, system) is trusted, the ownership of the transmit queue by the appropriate process, and the ownership data passed to the network interface in step 2 below can be trusted.

2. Process. Pa signals the device driver with the buffer index(es) of the buffers that it wants to map over the aperture, and details of the remote aperture on to which it want to map those buffers. The device driver passes that data to the local network interface, which signals with the remote aperture to establish the mapping. To allow this to be done, the process provides the following information: network address (e.g. MAC address) of the data processor providing the other side of the aperture (DPb), initial sequence number for serially numbering packets sent over the link, index number of the aperture on DPb, length of the aperture, ownership data identifying the process on DPa that is to use the aperture. The network interface on DPa then contacts DPb via the supplied network address to attempt to set up the mapping DPb checks that it has an aperture with the supplied index number and that its length matches that supplied by DPa. DPb also receives data identifying the process initiating the connection and checks with the local process identified in the ownership bits for the local aperture that it will permit that process on DPa to access the aperture. If that is permitted the network interface of DPb signals its device driver to set up the appropriate row in its aperture table by storing the initial sequence number, remote aperture and remote ownership against that aperture. The network interface of DPb then returns a success message to the network interface of DPa. The network interface of DPa informs its device driver, which sets up its aperture table by storing the initial sequence number, remote aperture and remote ownership, and signals the initiating process that the aperture has been set up successfully.

In order for process Pa to transmit data to DPa using the mapping, it can either use PIO (programmed input-output) or DMA (direct memory access). In PIO the CPU (central processing unit) of DPa executes commands to retrieve data from its local memory and supplies that data to the local network interface for transmission. The network interface receives the data pushed, to it by the CPU and transmits it in due course. In DMA the local network interface accesses the local memory directly to pull data from the memory for transmission. To achieve this the CPU transmits an instruction to the network interface which identifies an area in memory that contains data to be transmitted. In due course the network interface actions that instruction by reading the data directly from the memory and transmitting it. It then returns a message to the CPU to indicate that the transmission is complete. PIO is advantageous for the transmission of small amounts of data, since it involves simpler communication, between the CPU and the NIC. DMA is advantageous for transmission of larger amounts of data since it reduces the load on the CPU that would otherwise be involved in passing the data to the NIC. It should be noted that both these routes can be available simultaneously to a process for transmissions over a single mapping. This means that when a process wants to write to a remote location over the network it can select the most efficient means in each situation: for instance selecting PIO for transmissions of short blocks of data, and selecting DMA for transmission of longer blocks of data. It is convenient to arrange the system so that for some or all apertures not all parts of those apertures are accessible by PIO. The rest of the aperture can then be, accessed by the NIC only via DMA. This economises on IO bus space since bus space only needs to be allocated for those parts that are accessible by PIO. A preferable arrangement is for all apertures greater than a predetermined size to be treated in this way. A preferably arrangement is for apertures that are being treated in this way to have only their first page-sized region accessible by PIO.

For PIO, process Pa causes the processor of data processor DPa to pass the data for transmission from local memory to the network interface hardware. Such transferring can be implemented using conventional PIO and will not be described in more detail here. However, oh receiving data by PIO the network interface makes certain checks before sending the data to the remote data processor DPb. The data is sent by the process together with an indication of the aperture to which it is to be applied and the offset in that aperture at which, it is to be applied. Using that data the network interface checks:

a. that the process that has sent the data is identified in the aperture table as owning the aperture to which the data is to be applied;

b. that the length of the data is not so great as to overrun the end of the aperture starting from the offset point in the aperture at which it is to be written.

If those checks are satisfied then it transmits the data to the remote terminal. At the remote terminal the remote NIC looks up the address to issue on its IO bus in order to store the received data from its buffer table.

For DMA the process adds a transmit command to its transmit queue. The transmit command specifies the intended destination of the data and could also include the data itself or could include a pointer to the data in memory (e.g. if DMA (direct memory access) by the network interface is to be used to transfer the data to the interface). Here the pointer would refer to a buffer table entry and offset, and the transmitter's DMA logic can check that the process sending the transmit instruction "owns" the buffer table entry to which the instruction refers. The latter option provides an efficient way for, the process to transmit large quantities of data that is stored contiguously in physical memory. An example of the transmission and reception process will now be described.

1. Pa adds a transmit command to its transmit queue. The transmit command specifies:
   a. Destination device. The identity of the network device (DPb) to which the data is to be transmitted.
   b. Destination aperture index. The index of the aperture on DPb to which the data is to be applied.
   c. Destination offset. The offset within that aperture at which the data is to be applied.
   d. Source buffer. The index of the local buffer from which the data is to be transmitted.
   e. Source offset. The offset within that buffer from which the data is to be taken.
   f. Length. The length of data to be take from that offset point.

2. The command is taken from the transmit queue by the network interface of DPa. It could poll the queue periodically, or could be signalled with an interrupt when there is data on the queue. The network interface of DPa validates the command by checking the following data using the local buffer table:
   a. that the ownership data for the specified buffer (as stored in the local buffer table) indicate that the buffer is owned by the same process as owns the transmit queue from which the command was taken;
   b. that the source offset point lies within the buffer (i.e. source offset is not greater than the length of the buffer); and
   c. that the full length of the data to be transmitted lies within the buffer (i.e. source offset plus length is not greater than the length of the buffer.
   If these tests are satisfied then at this point the network interface can start retrieving data from the buffer and preparing it for transmission.

3. The network interface checks that the ownership data for the specified aperture as stored in the local aperture table indicate that the aperture is owned by the same process as owns the transmit queue from which the command was taken.

4. If all the tests are satisfied the network interface forms one or more packets to transmit the data to the destination. In addition to the usual packet contents each packet includes fields indicating:
   a. the identity of the process that owns the transmit queue from which the command was taken;
   b. the identity of the remote aperture to which the data is to be applied; and
   c. a sequence number specific to the aperture mapping, allotted in numerical order and incremented in the local aperture table after each packet has been transmitted.

The packet may also indicate the location in the aperture at which the data is to be applied. Alternatively the first packet in the set indicates the offset and the length of data to be sent and the payloads of the subsequent packets in the set are applied consecutively to the remote aperture following on from the payload of the first packet; and each packet in the set has a field indicating which set it belongs to.

5. At the receiver DPb the network interface looks up using its local aperture and buffer tables the physical address of the destination offset point. This might not lie in the first buffer allocated to the aperture if the destination offset is greater than the length of the first allocated buffer. Then each packet is processed in order of its sequence number, irrespective of the order in which the packets arrived. If a packet is lost then the subsequent packets in the set are held for a period of time pending retransmission of the lost packet. For each packet the following checks are made:
   a. that if the data from the packet were written to its destination point in the aperture it would not extend beyond the end of the aperture and/or the buffers allocated to it;
   b. that the ownership data in the packet matches the remote ownership data for the mapping.

Those checks are intended to ensure that the data from the packet will not be written into memory at a location that is not authorised: they verify that the ownership data in question is correct for the whole of the region where the data is to be written. If those checks are satisfied then the network interface of DPb writes the data to the memory at the locations as determined from the tables.

The buffer table could be split into two: one for use in resolving incoming data, and one for use in validating the security of outgoing data.

On transmission of data by DMA or PIO the transmitting NIC can add to the transmitted packet an indication of the process (e.g. thread or application) that has caused the data to be transmitted. That can then be verified at the receiver against data in its aperture table to check that the transmitting process corresponds to the receiving aperture.

If there is a block of data in the memory which a process wants to transmit to a remote data processor then the process could copy that data into a previously allocated buffer and then issue a command to transmit that data from the buffer. However, if the block of data is large then it may be more efficient to reallocate the process's buffer(s) so that one of the buffers encompasses the block of data that is to be transmitted. This involves an overhead of reallocating the buffers by causing the device driver to remap the relevant rows of the buffer table and/or the aperture table, but it omits the step of copying the data from one part of memory to another. The use of separate buffer and aperture tables allows this to be done in an efficient way, since the other parts of the aperture can be left mapped on to the same parts of memory as before the reallocation. On reallocation of the buffers for an active aperture the data is synchronised by the network interface under the control of the device driver between the two ends. This is illustrated in FIG. 32.

Figure 32A:
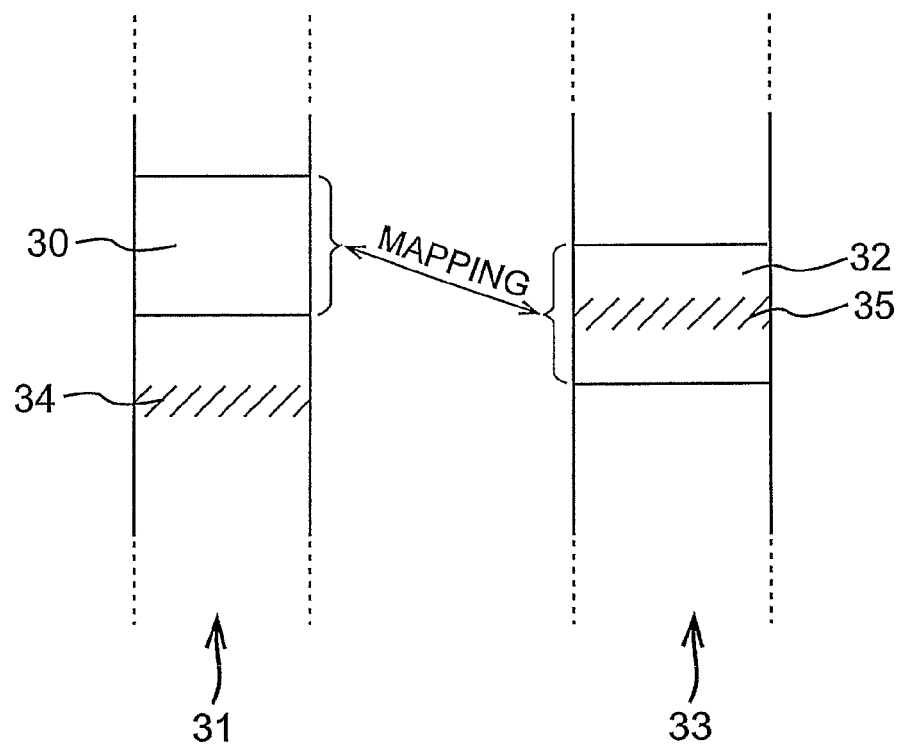
FIGS. 32a and 32b illustrate reassignment of buffers.
Figure 32B:
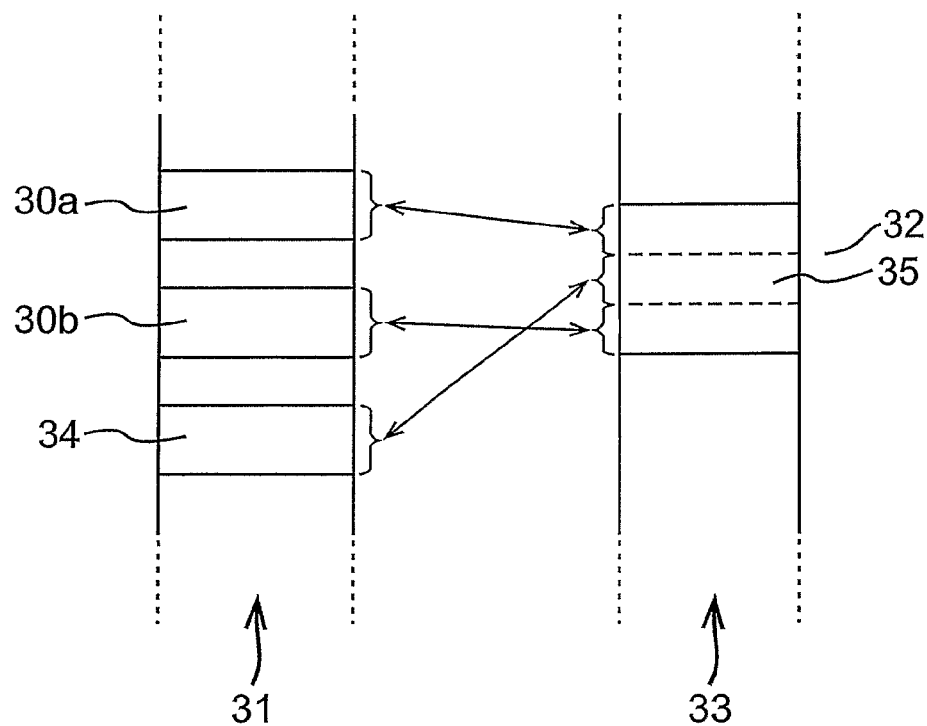

FIG. 32a shows an initial situation, before reallocation of buffers. In FIG. 32a a buffer 30 in memory space 31 is mapped on to an aperture 32 in memory space 33. Suppose it is desired to transfer a block of data at a location indicated by shading at 34 in memory 31 to a location 35 in memory 33. This could be done by copying that data into buffer 30. Alternatively, it could be done by reallocating the buffers as shown in FIG. 32b. In FIG. 32b the buffers in memory space 31 have been reassigned so that the aperture 32 excluding space 35 maps on to the same parts of memory 31 as before, but space 35 now maps on to a buffer at location 34. This involves mapping aperture 32 on to three separate buffers 30a, 30b and 34 in memory space 31.

The buffer tables are valuable when used in a non-memory-mapped system (i.e. one in which local memory and remote memory are not mapped on to each other via apertures).

First, the buffer tables can be used to allow data to be transmitted without being copied from one memory location to another to allow transmission to take place. If data that is to be transmitted is stored at a set of contiguous locations in memory then instead of copying that data to the region of memory that is occupied by a pre-existing buffer table, one or more buffer tables can be defined that encompass the locations where the data is currently stored. Then the NIC can be commanded to transmit the data from those buffer tables. This makes the transmission of data more efficient.

Second, buffer tables are useful when data is received in the form of packets of a data length greater than the page size of the system that is in use. Usually, contiguous memory must be allocated to the receiving process in order for such packets to be written to memory. However, such packets can be written to two or more consecutive buffer tables, avoiding the need for the receiving process to be allocated contiguous blocks of memory larger than the page size. This is especially useful in situations when the receiver might not know in advance that such large packets will be received.

Third, buffer tables are useful for permissions validation on transmission of data. When a buffer table is allocated, the NIC can store a record of which process, application or thread that buffer table is allocated to. Then when the NIC receives an instruction to transmit from that buffer table it can verify that the instruction has come from the same entity as that to which the table is allocated. Since the buffer table was set up by the driver, rather, than the application, it can be trusted. The identity of the process, application or thread can be identified from; for instance, the DMA queue that it uses to command transmission. In contrast, if a NIC is commanded to transmit data from a memory region that has not previously been defined to the NIC the NIC cannot check that the process commanding the transmission is authorised to access that region.

On DMA transmission a command can be sent to the NIC to transmit data of a certain length starting from a certain location in a buffer. If that length would go beyond the extend of the buffer then the NIC could ignore that subsequent data. However, instead it preferably continues from the next buffer in sequence that is allocated to the same process, thread or application as the buffer in which the start point is located. In that way the DMA command can be simplified and blocks of data greater than the buffer size can readily be transmitted in single packets. Two routes can be used to transfer the data in the reassigned buffer(s) to the destination. After the reallocation has been made the process responsible for the reallocation can issue a command to cause data from the newly assigned buffer (34 in FIG. 32a) to be transmitted to the remote data processor. Alternatively, the device driver could be arranged to automatically synchronise the aperture after a reassignment has been made, with one end of the aperture taking priority so that its data overwrites that at the corresponding locations at the other end of the mapping.

The present invention can be implemented in data processing systems such as personal computers and servers, and also in other equipment that need to transmit and/or receive data such as dedicated network appliances and multimedia terminals.

The techniques described above are not limited to use with network interfaces. For example, the above technique of reassigning buffers using a buffer table could be used to facilitate transferring data to other devices such as video or sound cards.

The tables could be stored in the same or in different physical memory as each other and as other user-level data in the system. One or more of the tables could be held in physical memory on the network interface hardware.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system for receiving data from a network, and processing that data in accordance with a network protocol to extract traffic data therefrom, the data processing system having:
   a memory;
   a network interface for receiving the data from the network and storing the data in the memory;
   an operating system for supporting one or more applications;
   an application supported by the operating system; and
   a protocol processing entity providing an application programming interface (API) configured to process the received data in accordance with a network protocol to extract traffic data therefrom, the protocol processing entity being arranged to perform protocol processing of the received data in the memory in response to signaling from a thread of the application to request whether data is available for one or more endpoints of the data processing system.

2. The data processing system as claimed in claim 1, wherein the protocol processing entity is a software entity that runs at a higher level than the operating system.

3. The data processing system as claimed in claim 2, wherein the protocol processing entity runs at user level.

4. The data processing system as claimed in claim 2, wherein the protocol processing entity is constituted by a function library.

5. The data processing system as claimed in claim 1, wherein the memory comprises a plurality of buffers each associated with a respective endpoint of the data processing system.

6. The data processing system as claimed in claim 1, wherein the memory comprises a buffer for storing data indicating events, and the network interface device is arranged to, on receiving data from the network, store it in the memory and also store data indicating a corresponding event in the event buffer.

7. The data processing system as claimed in claim 1, wherein the said signaling is a select( )and/or a poll( )call.

8. The data processing system as claimed in claim 7, wherein the call is resolved by the data processing system by means of a static linkage.

9. The data processing system as claimed in claim 7, wherein the call is resolved by the data processing system by means of a dynamic linkage.

10. The data processing system as claimed in claim 1, wherein the protocol processing entity is arranged to perform protocol processing of data in the context of the thread that signaled the protocol processing entity to do so.

11. The data processing system as claimed in claim 1 wherein the network protocol is TCP/IP.

12. The data processing system as claimed in claim 1, wherein the protocol processing entity supports BSD, Posix or Winsock network sockets.

* * * * *

UNITED STATES PATENT AND TRADEMARK OFFICE
CERTIFICATE OF CORRECTION

PATENT NO. : 8,645,558 B2  
APPLICATION NO. : 11/916973  
DATED : February 4, 2014  
INVENTOR(S) : Steven Leslie Pope et al.

Page 1 of 1

It is certified that error appears in the above-identified patent and that said Letters Patent is hereby corrected as shown below:

Item (56) References Cited:

Title Page 2, Col. 2 (Other Publications), Line 12, Delete "Internation" and insert -- International --

Title Page 3, Col. 2 (Other Publications), Line 8, Delete "Architechture" and insert -- Architecture --

Title Page 4, Col. 1 (Other Publications), Line 49-50, Delete "communciation" and insert -- communication --

In the Claims:

Column 66, Line 18, In Claim 7, delete "select( )and/or a poll( )call." and insert -- select( ) and/or a poll( ) call. --

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,645,558 B2 | Page 1 of 1 |
| APPLICATION NO. | : 11/916973 | |
| DATED | : February 4, 2014 | |
| INVENTOR(S) | : Pope et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1629 days.

Signed and Sealed this
Sixteenth Day of June, 2015

Michelle K. Lee
*Director of the United States Patent and Trademark Office*